(12) United States Patent
Stay et al.

(10) Patent No.: US 11,927,950 B2
(45) Date of Patent: Mar. 12, 2024

(54) SYSTEM AND METHOD OF COMMUNICATING SAFETY DATA OVER HIGH AVAILABILITY INDUSTRIAL CONTROL SYSTEMS

(71) Applicant: Rockwell Automation Technologies, Inc., Mayfield Heights, OH (US)

(72) Inventors: Nicholas L. Stay, Milwaukee, WI (US); Anthony G. Gibart, Milwaukee, WI (US); Mark A. Flood, Mayfield Heights, OH (US); Chandresh R. Chaudhari, Mayfield Heights, OH (US); Chad J. Bohl, Milwaukee, WI (US); Sivaram Balasubramanian, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 105 days.

(21) Appl. No.: 17/515,265

(22) Filed: Oct. 29, 2021

(65) Prior Publication Data
US 2022/0050451 A1 Feb. 17, 2022

Related U.S. Application Data

(63) Continuation-in-part of application No. 17/226,339, filed on Apr. 9, 2021, now Pat. No. 11,327,472, and
(Continued)

(51) Int. Cl.
*G06F 11/00* (2006.01)
*G05B 19/418* (2006.01)
*G05B 23/02* (2006.01)

(52) U.S. Cl.
CPC ... *G05B 23/0291* (2013.01); *G05B 19/41835* (2013.01); *G05B 19/41845* (2013.01); *G05B 19/41855* (2013.01)

(58) Field of Classification Search
CPC .................................................. G05B 23/0294
(Continued)

(56) References Cited

U.S. PATENT DOCUMENTS 6,549,034 B1 4/2003 Pietrzyk et al.
7,885,196 B2 2/2011 Takeuchi
(Continued)

OTHER PUBLICATIONS

Park Hyungbae et al: "Toward Control Path High Availability for Software-Defined Networks"; 2015 11th International Conference on the Design of Reliable Communication Networks (DRCN), IEEE, Mar. 24, 2015, pp. 165-172, XP033170503, DOI: 10.1109/DRCN.2015.7149008 (retrieved on Jul. 2, 2015)—(8) pages.
(Continued)

*Primary Examiner* — Sarai E Butler
(74) *Attorney, Agent, or Firm* — Boyle Fredrickson, S.C.

(57) ABSTRACT

A system for communicating between redundant devices balances the desired attributes of a high availability (HA) control system and a safety control system. The system includes concurrent connections as a fault tolerant mechanism for industrial protocol connections at the transport layer. The concurrent connections establish multiple paths for redundancy from a data producer to a data consumer. Concurrent connections increase availability of the HA control and safety instrumented systems. More specifically, concurrent connections and architectural redundancies eliminate a single point of failure within the control system and further reduce safety connection timeouts during fault detection and/or recovery. Concurrent connections may be used to keep a HA system operational or to provide detection of a failure in a safety system. The industrial control network may be configured to function as a HA control system, as a safety control system, or with certain degrees of both HA and safety-related operation.

20 Claims, 26 Drawing Sheets

Related U.S. Application Data a continuation-in-part of application No. 17/226,322, filed on Apr. 9, 2021, and a continuation-in-part of application No. 16/277,285, filed on Feb. 15, 2019, now Pat. No. 11,221,612, said application No. 17/226,339 is a continuation-in-part of application No. 16/277,285, filed on Feb. 15, 2019, now Pat. No. 11,221,612, said application No. 17/226,322 is a continuation-in-part of application No. 16/277,285, filed on Feb. 15, 2019, now Pat. No. 11,221,612.

(60) Provisional application No. 62/703,986, filed on Jul. 27, 2018.

(58) Field of Classification Search
USPC .................................................... 714/1–57
See application file for complete search history.

(56) References Cited

U.S. PATENT DOCUMENTS

| | | | |
|---|---|---|---|
| 9,942,107 B2 | 4/2018 | Kim et al. | |
| 2003/0118042 A1 | 6/2003 | Nishida et al. | |
| 2003/0224729 A1 | 12/2003 | Arnold | |
| 2004/0039938 A1 | 2/2004 | Katz et al. | |
| 2004/0117498 A1 | 6/2004 | Hashimoto et al. | |
| 2004/0153716 A1* | 8/2004 | Baker | H04J 3/0632 714/4.1 |
| 2005/0047326 A1* | 3/2005 | Puon | H04L 45/00 370/216 |
| 2005/0060606 A1 | 3/2005 | Kalan et al. | |
| 2005/0081117 A1* | 4/2005 | Gibart | G05B 9/02 714/47.2 |
| 2005/0249121 A1 | 11/2005 | Matsunaga | |
| 2006/0156070 A1* | 7/2006 | Swoboda | G01R 31/318566 714/38.1 |
| 2007/0006025 A1* | 1/2007 | Onozuka | H04L 1/0046 714/11 |
| 2007/0041350 A1 | 2/2007 | Famolari | |
| 2007/0116285 A1 | 5/2007 | Nakai et al. | |
| 2007/0242614 A1* | 10/2007 | Buettner | H04L 1/0061 370/248 |
| 2007/0268938 A1* | 11/2007 | Dowd | H04J 3/0697 370/509 |
| 2008/0144624 A1* | 6/2008 | Marcondes | H04L 43/0864 370/503 |
| 2008/0181259 A1* | 7/2008 | Andreev | H04L 65/80 370/519 |
| 2008/0232358 A1 | 9/2008 | Baker et al. | |
| 2008/0294784 A1 | 11/2008 | Wang | |
| 2009/0063891 A1 | 3/2009 | Arimilli et al. | |
| 2010/0023595 A1 | 1/2010 | McMillian et al. | |
| 2010/0023797 A1* | 1/2010 | Atluri | G06F 11/0727 714/2 |
| 2010/0238917 A1* | 9/2010 | Silverman | H04J 3/0667 375/354 |
| 2010/0329248 A1 | 12/2010 | Eggert et al. | |
| 2011/0038358 A1 | 2/2011 | Wang et al. | |
| 2011/0107157 A1 | 5/2011 | Okamoto et al. | |
| 2012/0030769 A1 | 2/2012 | De Laet | |
| 2012/0110372 A1 | 5/2012 | Borgendale et al. | |
| 2012/0330452 A1 | 12/2012 | Guenther et al. | |
| 2013/0136102 A1 | 5/2013 | Macwan et al. | |
| 2013/0286820 A1 | 10/2013 | Angst et al. | |
| 2013/0346809 A1* | 12/2013 | Kazi | G06F 11/1068 714/48 |
| 2014/0359374 A1 | 12/2014 | Shirlen et al. | |
| 2015/0067455 A1* | 3/2015 | Lee | H04L 1/24 714/807 |
| 2015/0186216 A1 | 7/2015 | Lee | |
| 2015/0207880 A1 | 7/2015 | Jin et al. | |
| 2015/0323910 A1 | 11/2015 | McLaughlin et al. | |
| 2015/0363252 A1 | 12/2015 | Singh et al. | |
| 2016/0044199 A1 | 2/2016 | Nago | |
| 2016/0149804 A1 | 5/2016 | Mirza | |
| 2016/0226776 A1 | 8/2016 | Lee | |
| 2016/0323175 A1 | 11/2016 | Liu et al. | |
| 2016/0352800 A1 | 12/2016 | Mulcahy et al. | |
| 2017/0097624 A1 | 4/2017 | Viste | |
| 2017/0139388 A1* | 5/2017 | Sachs | H04L 1/00 |
| 2017/0223045 A1 | 8/2017 | Claes | |
| 2018/0048591 A1 | 2/2018 | Sellappa et al. | |
| 2018/0278522 A1 | 9/2018 | Asati et al. | |
| 2019/0012286 A1 | 1/2019 | Benedict et al. | |

OTHER PUBLICATIONS

Advait Dixit et al: "Towards an Elastic Distributed SDN Controller", Hot Topics in Software Defined Networking, ACM, 2 Penn Plaza, Suite 701 New York, NY 10121-0701 USA, Aug. 16, 2013, pp. 7-12, XP058030691, DOI: 10.1145/2491185.2491193; ISBN: 978-1-4503-2178-5—(6) pages.

Extended European Search Report dated Dec. 18, 2019; Application No./Patent No. 19188033.5-1204—(12) pages.

European Examination Communication dated May 27, 2021; Application No. 19 188 033.5-1202—(6) pages.

Industrial Communication Networks; "High availability automation networks—Part 3: Parallel Redundancy Protocol (PRP) and Hight-availability Seamless Redundancy (HSR)", EIC 62439-3:2016 RLV, IEC, Mar. 31, 2016, pp. 1-540, XP082002757—(544) pages.

Clemens Hoga: "Seamless communication redundancy of IEC 62439", Advanced Power System Automation and Protection (APAP), 2011 International Conference On, IEEE, Oct. 16, 2011, pp. 489-494, XP032162391, DOI: 10.1109/APAP.2011.6180451, ISBN: 978-1-4244*—9622-8—(6) pages.

Araujo J A et al.: "Duplicate and circulating frames discard methods for PRP and HSR (IEC62439-3)", IECON 2013—39th Annual Conference of the IEEE Industrial Electronics Society, IEEE, Nov. 10, 2013, pp. 4451-4456, XP032539536, ISSN: 1553-572X, DOI: 10.1109/IECON. 2013.6699852—(6) pages.

\* cited by examiner

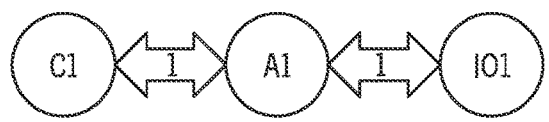
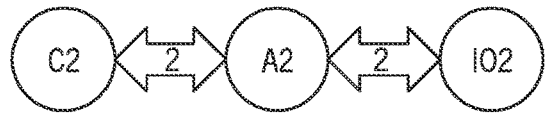
FIG. 22
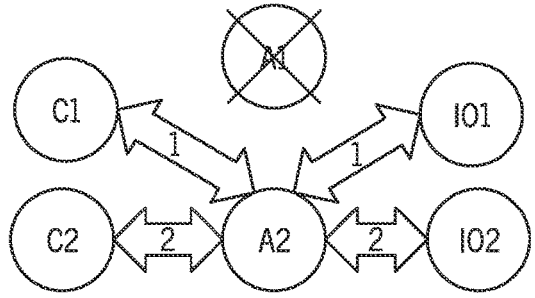
FIG. 23
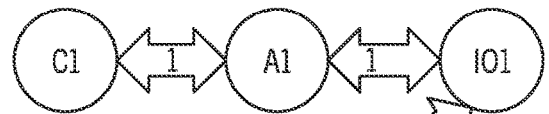
FIG. 24
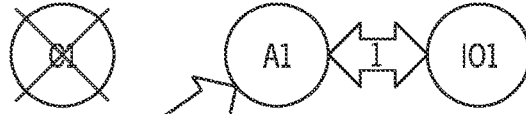
FIG. 25
FIG. 26
FIG. 27
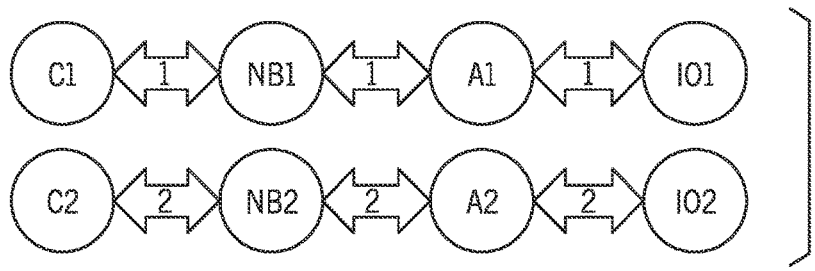
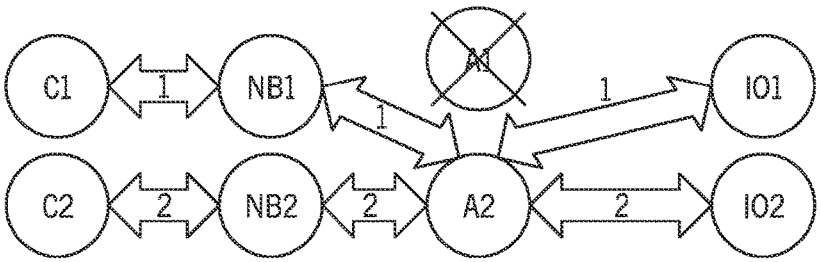

SYSTEM AND METHOD OF COMMUNICATING SAFETY DATA OVER HIGH AVAILABILITY INDUSTRIAL CONTROL SYSTEMS

CROSS-REFERENCE TO RELATED APPLICATIONS

This application is a continuation-in-part and claims the benefit of U.S. patent application Ser. No. 17/226,322, filed on Apr. 9, 2021 and entitled "System and Method of Communicating Unconnected Messages Over High Availability Industrial Control Systems." This application is a continuation-in-part and claims the benefit of U.S. patent application Ser. No. 17/226,339, filed on Apr. 9, 2021 and entitled "System and Method of Connection Management During Synchronization of High Availability Industrial Control Systems." This application is a continuation-in-part and claims the benefit of U.S. patent application Ser. No. 16/277,285, filed on Feb. 15, 2019 and entitled "System and Method of Communicating Data Over High Availability Industrial Control Systems," which, in turn, claims the benefit of provisional U.S. Patent Application No. 62/703,986, entitled "System and Method of Communicating Data Over High Availability Industrial Control Systems," filed on Jul. 27, 2018. The contents of each application identified above is incorporated herein by reference.

BACKGROUND INFORMATION

The subject matter disclosed herein relates to safety and high availability (HA) industrial control systems. More specifically, the subject matter disclosed herein relates to systems and methods of communicating safety data over an industrial control network in a high availability industrial control system.

As is known to those skilled in the art, industrial controllers are specialized electronic computer systems used for the control of industrial processes or machinery. An example industrial controller is a programmable logic controller (PLC) used in a factory environment. Industrial controllers differ from conventional computers in a number of ways. Physically, they are constructed to be substantially more robust against shock and damage and to better resist external contaminants and extreme environmental conditions. The processors and operating systems of industrial controllers are optimized for real-time control and execute languages allowing ready customization of programs to comport with a variety of different controller applications. Industrial controllers may have an operator interface for accessing, controlling, and/or monitoring the industrial controller. An example operator interface can include a locally connected terminal having a keyboard, mouse, and display. Industrial controllers may be used in general purpose control systems or in more specialized control systems such as a HA control system or a safety control system.

A HA control system attempts to maintain operation of the control system even in the event of a failure within the system. In order to maintain operation, a HA control system typically includes redundant subsystems such as redundant industrial controllers, redundant backplanes, redundant bridges, redundant adapters, redundant input/output (IO) modules, redundant motor drives, and/or redundant communication networks. Physical redundancy is provided in each subsystem such that if a single failure occurs in one of the elements in the subsystem, operation of the subsystem can continue via the redundant element(s). For example, if one of the redundant controllers fails, operation can continue using the other controller(s). Similarly, if a failure occurs on one network, backplane, bridge, adapter or IO module, the operation can continue via one or more redundant networks, backplanes, bridges, adapters, or IO modules.

During operation, a HA control system may utilize one component as an active component and the other component as a back-up component. The back-up component receives the same input signals, generates the same output signals, and/or performs the same operations as the active component such that the status of the backup-up component is identical to the status of the active component. However, actual control of the controlled system is performed by the active component. Upon failure of the active component, switches, for example, may disconnect the active component and connect the back-up component to maintain operation of the controlled system. A brief switchover time occurs as one component is disconnected and the other component is connected. Some applications, however, are so highly dependent on continuous operation that any delay, or switchover time, in the HA control system in the event of a failure in some subsystem is a detriment to the application. For example, a power plant performing a generating operation requires utmost continuous operation during the generating operation. Any delay in an HA control system due to a failure in some subsystem can be a significant detriment to the power plant.

A safety control system is primarily concerned with protection, such as protecting the equipment being controlled, the environment, or a human interacting with the controlled system. While it is understood that it is desirable to control equipment generally in a safe manner, such as safe operating speeds, controlled acceleration and deceleration, or preventing unintended motion, as used herein, a safety control system refers to a control system configured to operate at a desired level of safe operation. Levels of safe operation are defined, for example, in Safety Integrity Levels (SIL) set forth in industrial standards prepared by the International Electrotechnical Commission (IEC). Each safety level indicates with a differing degree of certainty that the system will operate as intended. Considered from a different perspective, each safety level provides an indication of the reduction of risk of a failure occurring. A rating level of SIL 1, for example, requires that the risk of a system failure is reduced by a factor between ten and one hundred (10-100) as a result of the safety measures implemented. A rating level of SIL 2, for example, requires that the risk of a system failure is reduced by a factor between one hundred and one thousand (100-1000) as a result of the safety measures implemented. A risk analysis is performed on the system to determine the benefit of the safety measures and each safety level indicates an order of magnitude improvement in safety over the prior level.

During operation, a safety control system is configured to monitor one or more input signals to verify that the controlled system is operating in a safe manner. When used to protect a person interacting with the controlled system, the input signal may be a proximity switch monitoring whether a gate is open or closed. Optionally, the input signal may be from a pressure mat or light curtain indicating the presence of the person on the mat or crossing through the light curtain into a restricted area. The safety control system monitors each input signal and executes a safety function in response to receiving the input signal. The safety function may, for example, bring a portion of the controlled system to a stop, reduce speed of the controlled system, or prevent one or more actions from occurring while the input signal is active.

Similar to a high availability system, it is desirable that a single failure does not prevent the safety function from occurring. If, for example, the sensor fails in a manner such that the input signal always indicates there is no person present, the potential exists for a person to enter a restricted area and the controlled system does not enter the safe operating state. Thus, redundant sensors, wiring, input channels and the like may be provided and the status of each input signal may be compared to each other to verify that the signals are in the same state. Unlike HA systems, however, if the state of the signals is different or if a primary input signal fails, the safety control system is configured to enter a safe operating state. The safe operating state entered upon the failure of a hardware components may be the same operating state used when a person is detected or the safe operating state may take a different action. In either case, the safer operating state will alert a technician to the failure of the component and will execute to prevent a hazardous operating condition rather than attempting to maintain constant operation, as would a HA system.

Whether using a HA control system or a safety control system, each utilizes redundant components. Communication between components requires each component establish a connection with the other component. If every component establishes separate connections with every other component, the bandwidth of communication networks or communication busses could be exceeded.

Thus, it would be desirable to provide an improved system for communicating between redundant devices.

It would further be desirable to provide an improved communication system which balances the desired attributes of a HA control system and a safety control system.

BRIEF DESCRIPTION

The subject matter disclosed herein describes an industrial control network having concurrent connections to provide an improved system for communicating between redundant devices and to balance the desired attributes of a HA control system and a safety control system. A concurrent connection is the name given to the fault tolerant mechanism for industrial protocol connections at the transport layer. Concurrent connections differ from network fault tolerant mechanisms such as device level ring (DLR) and parallel redundancy protocol (PRP) that provide fault tolerance at the network layer. Concurrent connections are created by a connection open service that sets up multiple paths for redundancy from the connection originator module to the connection target module. Concurrent connections increase availability of the HA control and safety instrumented systems. More specifically, concurrent connections and architectural redundancies eliminate a single point of failure within the control system and further reduce safety connection timeouts during fault detection and/or recovery. Concurrent connections may be used to keep a HA system operational or to provide detection of a failure in a safety system. The industrial control network may be configured to function as a HA control system, as a safety control system, or with certain degrees of both HA and safety-related operation.

In one embodiment of the invention, a system of communicating data over an industrial control network includes a first producer, a second producer, a first consumer, and a second consumer. The first producer is configured to generate a first data packet for transmission over a connection in the industrial control network, and the a second producer is configured to generate a second data packet for transmission over a connection in the industrial control network. The first and second data packets each include safety data and a connection identifier. The first and second consumers are each configured to receive the first data packet and the second data packet via the industrial control network. The first consumer and the second consumer both receive the first data packet and/or the second data packet. The first consumer extracts first safety data from either the first data packet or the second data packet which was received, and the second consumer extracts second safety data from either the first data packet or the second data packet which was received. The first safety data and the second safety data are identical during a successful transmission. When the first safety data and the second safety are different, at least one of the first consumer and the second consumer cause the system to enter a safe operating state.

In another embodiment of the invention, a method for communicating data over an industrial control network includes generating a first data packet for transmission over a connection in the industrial control network with a first producer and generating a second data packet for transmission over a connection in the industrial control network with a second producer The first and second data packets each include safety data and a connection identifier. At least one of the first data packet and the second data packet are received with a first consumer via the industrial control network, and the first consumer extracts first safety data from either the first data packet or the second data packet received at the first consumer. At least one of the first data packet and the second data packet are received with a second consumer via the industrial control network, and the second consumer extracts second safety data from either the first data packet or the second data packet received at the second consumer. The first safety data and the second safety data are identical during a successful transmission. When the first safety data and the second safety are different, entering a safe operating state with either the first consumer or the second consumer.

In still another embodiment of the invention, a method for communicating data over an industrial control network includes generating a safety data packet for transmission over a connection in the industrial control network with a first producer and a second producer at a first time interval and generating a time coordination data packet for transmission over the connection in the industrial control network with the first producer and the second producer at a second time interval. The first data packet includes a connection identifier and safety data. The second data packet includes the connection identifier and a time update request, and the second time interval is greater than the first time interval. The safety data packet is received with a first consumer and a second consumer via the industrial control network at the first time interval, and the time update request is received with the first consumer and the second consumer via the industrial control network at the second time interval. The safety data is extracted from the safety data packet with the first consumer and the second consumer at the first time interval, and a time coordination response data packet is generated for transmission over the connection in the industrial control network with the first consumer and the second consumer at the second time interval. The time coordination response data packet is transmitted from the first consumer and the second consumer to the first producer and the second producer. These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 22 is a block diagram representation of one embodiment of a dual redundancy system communicating data over an industrial control network in an industrial control system according to another embodiment of the invention;

FIG. 23 is a block diagram representing the dual redundancy system of FIG. 22 with a single adapter module faulted;

FIG. 24 is a block diagram representing the dual redundancy system of FIG. 22 with a single IO module faulted;

FIG. 25 is a block diagram representing the dual redundancy system of FIG. 22 with a single controller faulted;

FIG. 26 is a block diagram representation of another embodiment of a dual redundancy system communicating data over an industrial control network in a high availability industrial control system according to another embodiment of the invention;

FIG. 27 is a block diagram representing the dual redundancy system of FIG. 26 with a single adapter module faulted;

Figure 1:
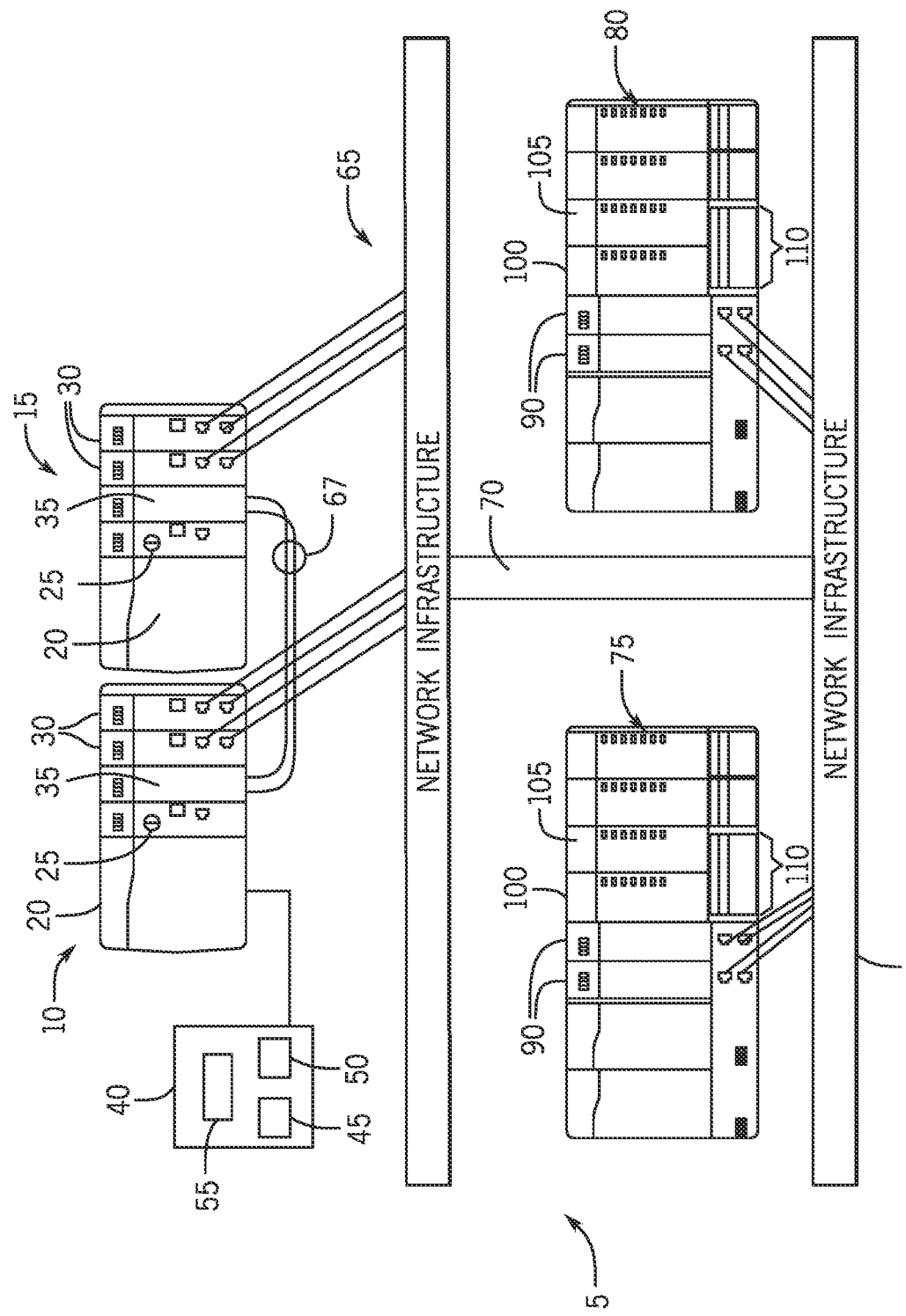
FIG. 1 is a block diagram of one embodiment of an industrial control system.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Figure 2:
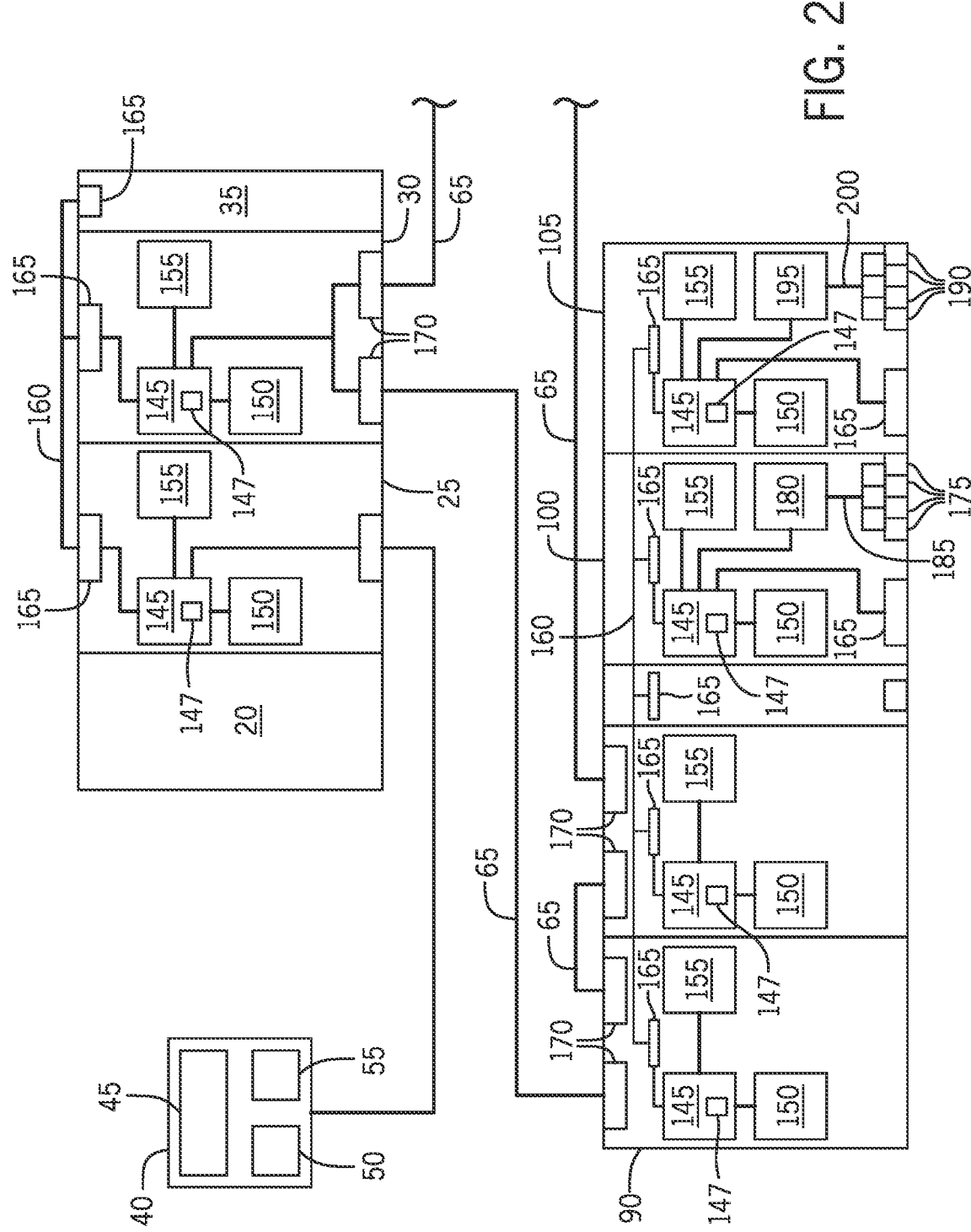
FIG. 2 is a block diagram further representing aspects of the industrial control system of FIG. 1.
Figure 51:
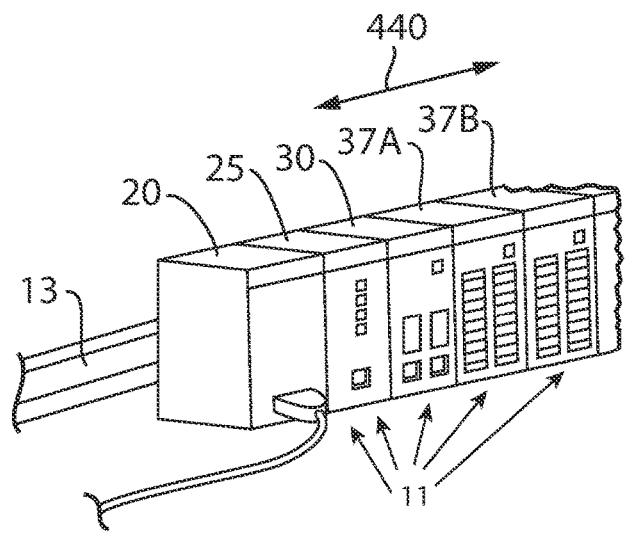
FIG. 51 is a perspective view of an exemplary DIN rail mounted industrial controller configured to incorporate embodiments of the present invention.

Turning first to FIG. 1 and FIG. 2, an exemplary industrial control system 5 with redundant subsystems is illustrated. The industrial control system 5 includes a first controller chassis 10 and a second controller chassis 15. As illustrated, the first and second controller chassis 10 and 15 are modular and may be made up of numerous different hardware modules. Additional hardware modules may be added or existing hardware modules removed and the first and second controller chassis 10 and 15 reconfigured to accommodate the new configuration. Optionally, either the first controller chassis 10 and/or the second controller chassis 15 may have a predetermined and fixed configuration. According to still another embodiment, as illustrated in FIG. 51, each industrial controller may be made up of separate modules 11 mounted adjacent to each other in a control cabinet using, for example, a DIN rail 13. Connectors extend between adjacent modules allowing one module 11 to be communicatively coupled to each adjacent module. The first and second controller chassis 10 and 15 may have a single backplane or dual backplanes to facilitate communication between modules in the chassis. For modules 11 mounted on a DIN rail 13 a single backplane or dual backplanes may be established via the connectors between adjacent modules. In the exemplary system shown in FIG. 1, both the first and second controller chassis 10 and 15 include a power supply module 20, a controller module (or also referred to as simply "controller") 25, and network bridge modules 30. Each controller chassis 10 and 15 is further shown with an additional module 35 that may be selected according to the application requirements. For example, the additional module 35 may be an analog or digital input or output module, which will be referred to herein generally as an IO module. Optionally, each chassis may be configured to have multiple additional modules 35 according to the application requirements. For ease of illustration, a single additional module 35 is illustrated and the additional module 35 shown is a redundancy module to facilitate dual chassis controller redundancy.

An operator interface 40 is shown connected to the industrial control system. The operator interface 40 can include a processing device 45 and an input device 50. The input device 50 can include, but is not limited to, a keyboard, touchpad, mouse, track ball, or touch screen. The operator interface can further include an output device 55. The output device 55 can include, but is not limited to, a display, a speaker, or a printer. It is contemplated that each component of the operator interface 40 may be incorporated into a single unit, such as an industrial computer, laptop, or tablet computer. It is further contemplated that multiple operator interfaces can be distributed about the industrial control system 5. The operator interface 40 may be used to display operating parameters and/or conditions of the controlled machine or process, receive commands from the operator, or change and/or load a control program or configuration parameters. An interface cable connects the operator interface 40 to the controller 25 on the first controller chassis 10.

The first and second controller chassis 10 and 15 are connected to other devices by a network 65 according to the application requirements. A redundant network topology is established by connecting the network bridge modules 30 of the controller chassis 10 and 15 to a redundant network infrastructure 70 by a suitable network of cables. The network infrastructure 70 connects to a first remote chassis 75 and a second remote chassis 80. It is contemplated that the network cables may be custom cables configured to communicate via a proprietary interface or may be any standard industrial network, including, but not limited to, Ethernet/IP, DeviceNet, or ControlNet. The network bridge modules 30 and the network 70 are configured to communicate according to the protocol of the network to which it is connected and may be further configured to translate messages between two different network protocols. Dedicated interface cables 67 connect the redundancy modules 35 in each chassis to each other, providing a dedicated communication channel between the controller modules 25.

The first and second remote chassis 75 and 80 are positioned at varying positions about the controlled machine or process. As illustrated, the first and second remote chassis 75 and 80 are modular and may be made up of numerous different modules connected together in a chassis or mounted on a rail. Additional modules may be added or existing modules removed and the remote chassis 75 or 80 reconfigured to accommodate the new configuration. Optionally, the first and second remote chassis 75 and 80 may have a predetermined and fixed configuration. The first and second remote chassis 75 and 80 may have a single backplane or dual backplanes to facilitate communication between modules in the chassis. As illustrated, the first and second remote chassis 75 and 80 each includes a pair of network adapter modules 90, an input module 100, and an output module 105. Each network adapter module 90 is connected to the redundant network infrastructure 70 by a suitable network of cables. Each of the input modules 100 is configured to receive input signals from controlled devices, and each of the output modules 105 is configured to provide output signals to the controlled devices. Optionally, still other modules may be included in a remote chassis. Dual or triple redundant input modules 100 and/or output modules 105 may be included in a remote and/or controller chassis. It is understood that the industrial control network, industrial controller, and remote chassis may take numerous other forms and configurations without deviating from the scope of the invention. It should also be understood that an input module 100 and an output module 105 can form an IO module 110.

Referring next to FIG. 2, a portion of the exemplary industrial control system of FIG. 1 is illustrated in block diagram form. It is contemplated that each of the modules in the system may include a processor 145 and a memory 150. The processors 145 are configured to execute instructions and to access or store operating data and/or configuration parameters stored in the corresponding memory 150. The processors 145 are suitable processors according to the node requirements. It is contemplated that the processors 145 may include a single processing device or multiple processing devices executing in parallel and may be implemented in separate electronic devices or incorporated on a single electronic device, such as a field programmable gate array (FPGA) or application specific integrated circuit (ASIC). The processors 145 include random access memory 147 for processing runtime data. The memory devices 150 are non-transitory storage mediums that may be a single device, multiple devices, or may be incorporated in part or in whole within the FPGA or ASIC. Each of the modules also includes a clock circuit 155, and each clock circuit 155 is preferably synchronized with the other clock circuits 155 according to, for example, the IEEE-1588 clock synchronization standard. Each clock circuit 155 generates a time signal configurable to report the present time accurate to either microseconds or nanoseconds. Communication between modules mounted in the same chassis or contained within a single housing occurs via a backplane 160. The backplane 160 may be a single backplane or dual backplanes and include a corresponding backplane connector 165. Modules communicating via network media include ports 170 configured to process the corresponding network protocol. The input module 100 includes input terminals 175 configured to receive the input signals from the controlled devices. The input module 100 also includes any associated logic circuitry 180 and internal connections 185 required to process and transfer the input signals from the input terminals 175 to the processor 145. Similarly, each output module 105 includes output terminals 190 configured to transmit the output signals to the controlled devices. The output module 105 also includes any associated logic circuitry 195 and internal connections 200 required to process and transfer the output signals from the processor 145 to the output terminals 190.

In operation, a connection is the transport layer mechanism in an industrial protocol to transfer bi-directional data between two end points typically at a given periodic interval. Some connection types do not transfer data at periodic interval, but instead, transfer data either on occurrence of an event or in response to a programmatic request/response mechanism. Some connections transfer data in only one direction while in the reverse direction only a heartbeat indication is sent to keep the connection alive. But, in general, connections transfer data in both directions.

A connection is opened by a connection open service request from a connection originator module to a connection target module through zero or more intermediate modules via messages sent over backplane(s) and/or network(s). An originator is a hardware module generating the connection open service request. A target module is a hardware module receiving the connection open service request. The connection originator module is usually a controller module in a controller chassis or a human machine interface (HMI). The connection target module may be, for example, an IO module, a motor drive module, another controller module, network adapter module, or a network bridge module in the same chassis as controller module or in a remote chassis. The intermediate modules may be one or more of a network bridge module and/or network adapter module. The connection open request message contains parameters defining the connection such as a connection type, data size to transfer in each direction, a duration of a periodic interval at which the message is transmitted, a connection timeout duration, connection path data, defining an end-to-end path from the originator module to the target module through intermediate modules, and the like. These parameters are used to allocate resources (e.g., CPU bandwidth, memory, and network bandwidth) to service the connection at runtime on a module associated with the connection. When resources are successfully allocated on the modules associated with a connection, a success response is conveyed back from the target module to the originator module in a reverse direction from the connection open request, and the connection is operational for runtime data transfer. If the resources cannot be allocated on one of the modules associated with a connection or if one of the modules cannot communicate the connection open request message to the next module in the path, then a failure response is returned to the originator module from the module at which the connection open request failed.

Once a connection is opened, it can be closed either through a connection close service request from the originator module to the target module of the connection through any intermediate modules that are part of the connection. Optionally, the connection may also be closed through a runtime connection timeout mechanism. During runtime, every module that is part of a connection monitors data reception from its upstream module(s) in one or both directions as appropriate for an end module or an intermediate module, respectively, and when data is not received in the monitored direction for a length of time equal to the connection timeout duration, the module at which the connection timeout occurred will close the connection to recover allocated resources. A connection timeout may happen as a result of a module failure or of a communication failure in a network or a backplane.

Figure 3:
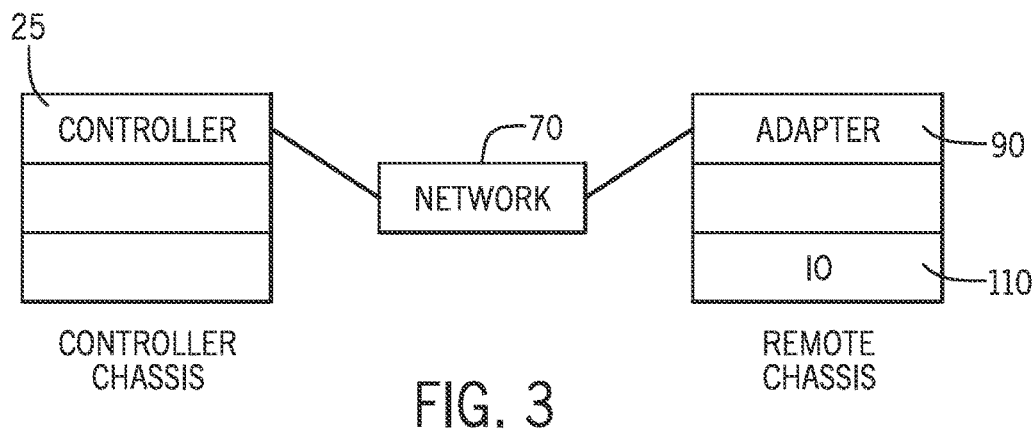
FIG. 3 is a block diagram representing one embodiment of an exemplary industrial control system in which the present invention may be incorporated.

Turning next to FIG. 3, a first embodiment of a control system includes a controller module 25 in a controller chassis and a network adapter module 90 and an IO module 110 in a remote chassis, where the controller chassis and the remote chassis are connected via a network infrastructure 70. The controller module 25 is capable of directly communicating on the network and is connected to network infrastructure 70 through a network cable. Similarly, the network adapter module 90 on the remote chassis is connected to the network infrastructure 70 through a network cable and communicates with an IO module 110 on the same chassis over a backplane within the chassis. A connection is opened from the controller module 25, acting as a connection originator module, to the IO module 110, acting as a connection target module, by sending a connection open request message over the network infrastructure 70 to the network adapter module 90 on the remote chassis, where the network adapter module is acting as an intermediate module. The network adapter module 90 in turn sends the connection open message to the IO module 110 over the backplane in the chassis. A success response is returned from the IO module 110 to the controller module 25 in the reverse direction via the network adapter module 90 and the network infrastructure 70 and the connection is now open to transfer data.

Once the connection has been established, the modules are no longer referred to as an originator module and a target module, as used during the open/close process. Rather, the terms producer and consumer are used to identify a runtime data producer and data consumer in a connection. A producer is a hardware module generating a message or data packet for transmission. A consumer is a hardware module receiving the message or data packet being transmitted. Since the data transfer is bidirectional in general, the controller module 25 may be a producer, P(c), a consumer C(c), or both a producer and a consumer depending on the source and direction of the data flow(s). Similarly, the IO module 110 may be a producer, P(io), a consumer, C(io), or both a producer and a consumer depending on the source and direction of the data flow(s).

Figure 4:
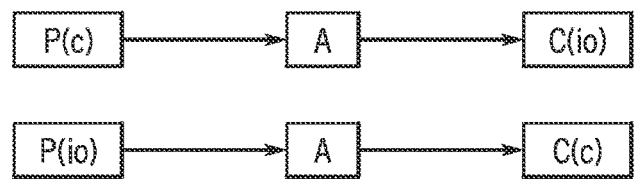
FIG. 4 is a runtime data flow diagram representation of a prior art connection established in the control system of FIG. 3.

With reference to FIG. 4, a representation of the bidirectional data flow in a prior art connection is illustrated. A runtime data flow model corresponding to the modules in FIG. 3 is shown with block A representing the network adapter module 90. Previously, a connection established a single end-to-end path for bidirectional data flow. As illustrated, data flows in one direction from P(io) to C(c) when the IO module 110 is generating data and sending the data to the controller module 25 via the connection, and data flows in the other direction from P(c) to C(io) when the controller module 25 is generating data and sending the data to the IO module 110. The prior art connection, however, has only one end-to end path identified between the originator module and the target module with bi-directional runtime data flow capability when the connection is established.

The present invention provides for multiple end-to-end paths in a single connection, improving the reliability of a HA control system or facilitating detection of a single failure in a safety control system. Both HA and safety control systems typically include several redundant subsystems such as redundant industrial controllers, redundant backplanes, redundant bridges, redundant adapters, redundant input/output (IO) modules, redundant motor drives, and/or redundant communication networks. For a HA control system, physical redundancy is provided in each subsystem such that if a failure occurs in one of the elements in a subsystem the operation can continue via the other element(s). For a safety control system, operation of redundant components may be compared to each other. When each component in a redundant pair is operating normally, operation should be identical within acceptable tolerances for manufacturing, propagation delay, and the like. If a one component in a redundant pair fails, it may no longer change state, measured values may be different, or other such differences may be detected by comparing operation of the two components and, thereby, detecting the failure of one component.

Figure 5:
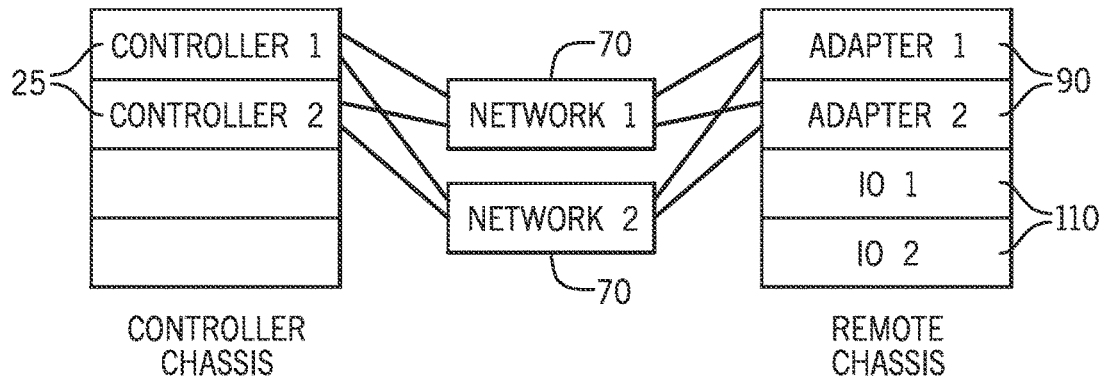
FIG. 5 is a block diagram representing another embodiment of an industrial control system incorporating the present invention.

With reference next to FIG. 5, one embodiment of an industrial control system with redundant subsystems is illustrated. The illustrated embodiment includes two controllers 25, Controller 1 and Controller 2, in the controller chassis. The controllers 25 communicate with each other through a dual backplane in the controller chassis. Each of the controllers 25 is connected to two network infrastructures 70, Network 1 and Network 2, through network cables. The remote chassis contains two IO modules 110, IO 1 and IO 2, and two network adapter modules 90, Adapter 1 and Adapter 2. The IO modules 110 and network adapter modules 90 on the remote chassis communicate with each other through dual backplanes within the remote chassis. The network adapter modules 90 are each connected to the two network infrastructures 70 through network cables. The IO modules 110 have a limited number of IO terminal points, for example, eight IO terminals, which can be connected to controlled devices. Each corresponding IO terminal on both redundant IO modules 110 on the remote chassis is wired to same controlled device for redundancy. Although illustrated with a single pair of redundant IO modules 110 and eight IO terminals, a typical industrial control system has thousands of such redundant IO terminal points wired to controlled devices throughout the controlled machine or process.

In either a HA industrial control system or a safety industrial control system, a concurrent connection is used for bi-directional data transfer between redundant end modules, for example, between the redundant controllers 25 and redundant IO modules 110 shown in FIG. 5. A concurrent connection is the fault tolerant transport layer mechanism to transfer bi-directional data between multiple redundant end points in the industrial control system at periodic intervals, responsive to events triggering a transfer, or responsive to a request/response transfer. A concurrent connection sets up and manages bi-directional data transfer between redundant end modules over multiple redundant end-to-end paths using the physical redundancies in each subsystem such that one or more failures in different subsystems will not affect data transfer so long as at least one end module is available at each end and at least one end-to-end path is available for data transfer between the modules at each end of the connection. Concurrent connections have architectural flexibility to deal with varying levels of physical redundancy in each subsystem. For example, a concurrent connection can handle subsystems with no, or with varying levels of redundancy, such as a single controller, dual redundant adapters, and triple redundant IO modules. A typical industrial control system has thousands of concurrent connections between redundant controllers and redundant IO modules, between redundant controllers and other redundant controllers, between redundant controllers and a human machine interface (HMI), or a combination thereof.

Figure 6:
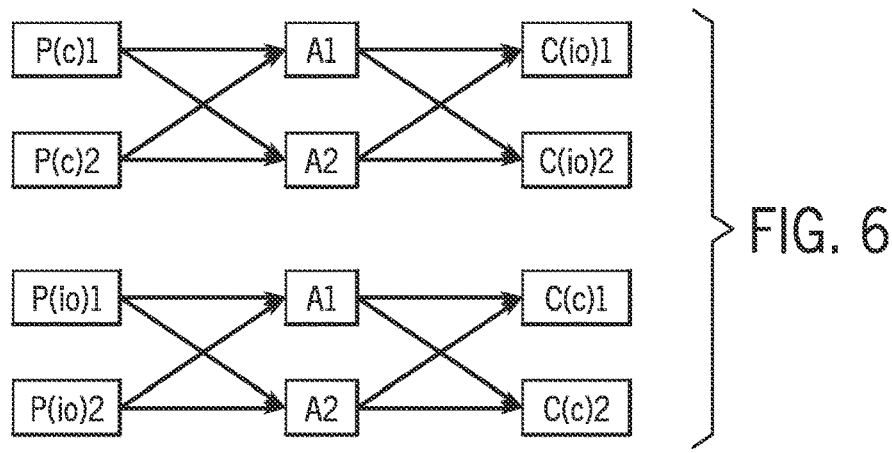
FIG. 6 is a runtime data flow diagram representation of one embodiment of a concurrent connection established in the industrial control system of FIG. 5.

A single concurrent connection has multiple end-to-end data paths between redundant end modules. With reference next to FIG. 6, a runtime data flow model is illustrated for a single concurrent connection in the exemplary industrial control system from FIG. 5. In a first direction of data flow, the IO modules 110 may both be producers, P(io)1 and P(io)2, and the controllers 25 may both be consumers, C(c)1 and C(c)2. In the other direction of data flow, the controllers 25 may both be producers, P(c)1 and P(c)2, and the IO modules 110 may both be consumers, C(io)1 and C(io)2. The two network adapter modules 90 are represented by A1 and A2. According to the illustrated flow model, there are three module stages (i.e. a controller stage, an adapter stage, and an IO module stage) with dual redundancy in each stage.

As will be discussed in more detail below, functionally equivalent data is transmitted from each producer to each consumer in tandem via redundant data packets along the different end-to-end paths in a single concurrent connection. According to one embodiment, the functionally equivalent data is identical data. According to another embodiment, the functionally equivalent data may, for example, transmit the same data in different configurations, such that there is not bitwise equivalence, but rather content equivalence. According to yet another embodiment, the functionally equivalent data may allow for some small variation between data, for example, with each producer using its own timestamp, where the consumer will verify that the two timestamps are within an acceptable range of each other. There are eight end-to-end paths that can be used for bi-directional data transfer of the same data. End-to-end paths may be defined on a per-hop basis or, in other words, with a string of devices starting with the source device, including each intermediate device, and ending with the target device. Examples of end-to-end paths are P(c)1:A1:C(io)1; P(c)2:A1:C(io)1; and etc. with their corresponding reverse paths. So long as at least one controller module 25 and one IO module 110 and one of the end-to-end data paths between them are working, data is communicated between the modules and control can be maintained.

Figure 7:
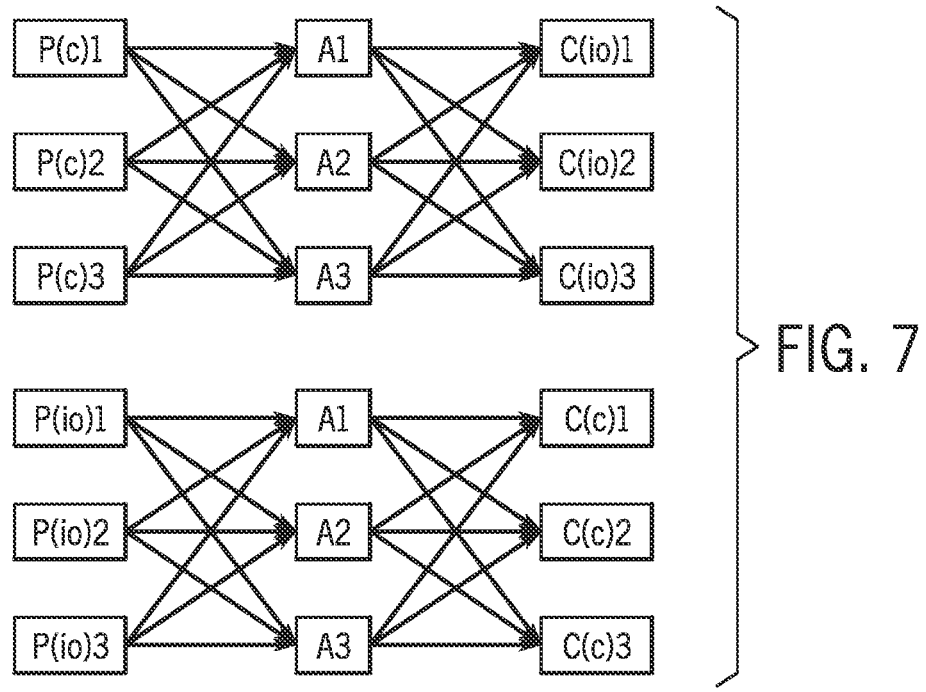
FIG. 7 is a runtime data flow diagram representation of another embodiment of a concurrent connection established in an industrial control system with triple redundancy.

With reference next to FIG. 7, another runtime data flow model is illustrated for a concurrent connection established in an industrial control system with three stages and triple redundancy in each stage. In other words, the controller chassis includes three redundant controllers 25, the remote chassis includes three redundant IO modules 110 and three redundant network adapter modules 90. Similarly, a triple redundant network infrastructure 70 is established between the controller chassis and the remote chassis. In the illustrated embodiment, there are twenty-seven end-to-end paths that can be used for data transfer in the single concurrent connection.

Figure 8:
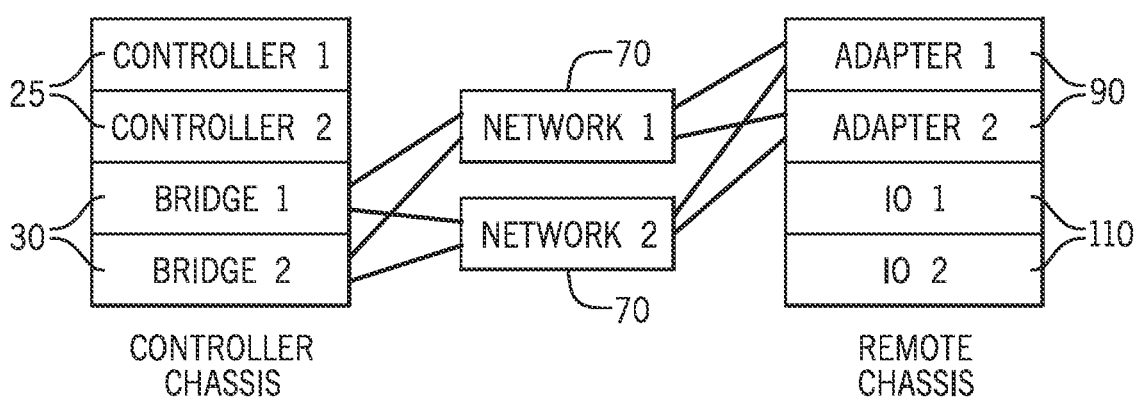
FIG. 8 is a block diagram representing another embodiment of an industrial control system incorporating the present invention.
Figure 9:
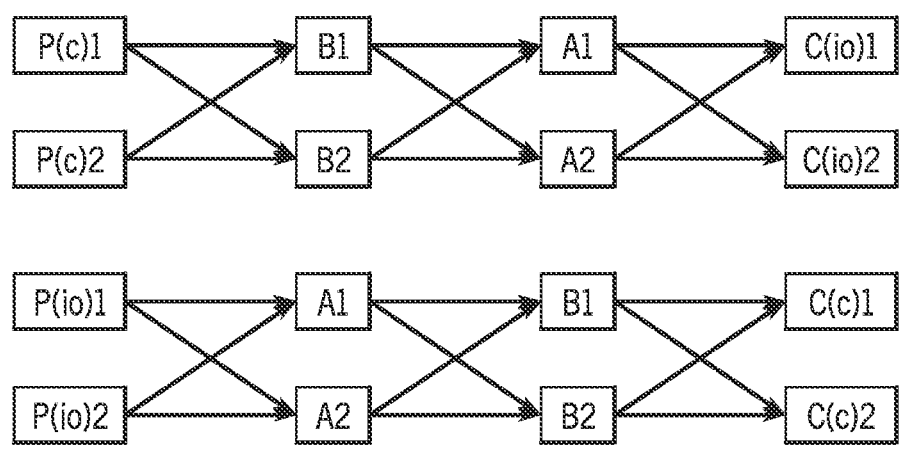
FIG. 9 is a runtime data flow diagram representation of one embodiment of a concurrent connection established in the industrial control system of FIG. 8.

With reference also to FIG. 8, another embodiment of an industrial control system with network bridge modules 30 included is illustrated, and FIG. 9 shows the runtime data flow model for a concurrent connection established in the industrial control system of FIG. 8. The bridge modules 30 are represented by B1 and B2 in the data flow model. There are four stages (i.e. a controller stage, a bridge stage, an adapter stage, and an IO module stage) and dual redundancy in each stage. In this case there are sixteen end-to-end paths that can be used for data transfer.

Figure 10:
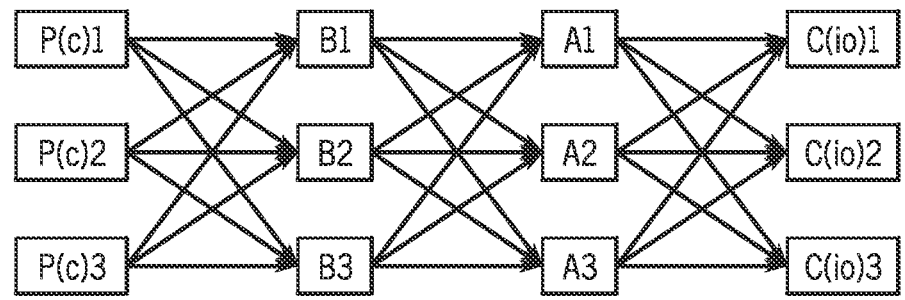
FIG. 10 is a runtime data flow diagram representation of another embodiment of a concurrent connection established in an industrial control system with triple redundancy.
Figure 10:
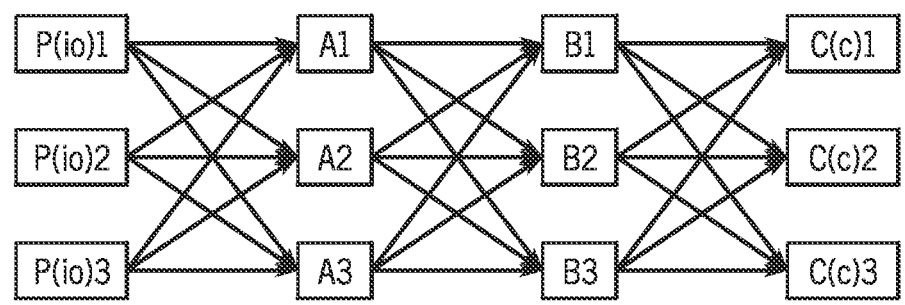

FIG. 10 shows another runtime data flow model for a concurrent connection established in an industrial control system with four stages and triple redundancy in each stage. In other words, the controller chassis includes three redundant controllers 25 and three redundant network bridge modules 30. The remote chassis includes three redundant IO modules 110 and three redundant network adapter modules 90. Similarly, a triple redundant network infrastructure 70 is established between the controller chassis and the remote chassis. In this case, there are eighty-one end-to-end paths that can be used for data transfer. In general, if there are "n" stages, R1 is the number of redundant modules in stage 1, R2 is the number of redundant modules in stage 2, and Rn is the number of redundancy in stage n, then the total number of end-to-end paths in the HA control system is equal to R1×R2× . . . ×Rn. For the specific case in which all "n" stages have the same number of redundant modules, then this expression simplifies to $R^n$. In other words, the number of end-to-end paths available for data transfer grows exponentially with the number of stages and the number of redundant modules in each stage.

One aspect of establishing a concurrent connection is the establishment of redundant end-to-end data paths between end modules in a single connection. If a similar operation were desired using the prior art connections of FIG. 3, significant extra resources would be required. With reference, for example, to the system illustrated in FIG. 8, each controller 25 as an originator module would need to first identify all end-to-end paths available between itself and the target modules. In the illustrated embodiment, each controller 25 will then be required to open eight standard connections from itself to the IO modules 110 as target modules, resulting in sixteen standard connections between the redundant controllers 25 and redundant IO modules 110.

Implementing multiple standard connections to create redundant communication paths includes a number of drawbacks. Assuming that all of the modules and end-to-end paths are active along the sixteen standard connections, each end module needs to allocate eight sets of resources, where one set of resources corresponds to each of the eight standard connections. Each end module needs to transmit or receive eight data packets, where one data packet is transmitted on each of the eight standard connections, for each data production cycle. Each intermediate module needs to receive and transmit all of the data packets passing through that intermediate for each data production cycle as well.

Finally, each consumer end module needs to identify and drop up to seven duplicate data packets for every data production cycle.

On the other hand, using multiple standard connections to create redundant communication paths allows all available end-to-end data paths to be opened and all resources allocated as part of connection open process so there is no risk of runtime failure to allocate resources. In general, the number of resources required and the number of data packets that need to be processed at runtime to create redundant communication paths using multiple standard connections are dependent on both the number of stages and the number of redundant modules in each stage.

In contrast, one concurrent connection encompasses all sixteen of the end-to-end paths defined in these standard connections. Establishing the concurrent connection to encompass each of these end-to-end paths will be discussed again with respect to the system illustrated in FIG. 8. In contrast to the standard connection, which defines end-to-end data paths, the concurrent connection defines per hop connections. Per hop connections are identified and opened by all modules which are part of a concurrent connection on a hop-by-hop basis. A per hop connection refers to the connection on the local data path from an upstream module to an immediate downstream module. Controller 1 will open per hop connections to Bridge 1 and Bridge 2, Bridge 1 will open per hop connections to Adapter 1 and Adapter 2, and so on. A total of twelve per hop connections are opened on local data paths compared to sixteen standard connections for end-to-end paths as previously discussed. All twelve per hop connections form part of a single concurrent connection identified with a single concurrent connection serial number.

In contrast to the eight sets of resources required for separate end-to-end connections, each module needs to allocate only one set of resources with some minor additional overhead. In addition, each module needs to send and/or receive only two data packets per data production cycle. For example, referring to FIG. 9, each controller 25 as a producer sends two copies of the same data packet to each of the two network bridge modules 30 at the end of the hop. Only the first non-erroneous data packet received by a network bridge module 30 is forwarded on to each of the two network adapter modules 90 in a downstream hop. Any duplicate data packets received by the network bridge module are dropped at a low level without consuming a lot of CPU bandwidth. In the data flow model of FIG. 9, only two redundant modules exist per stage. Therefore, the network bridge module 30 will forward the first non-erroneous data packet received and drop the second packet received as duplicative. In the data flow model of FIG. 10, three redundant modules exist per stage. Therefore, the network bridge module 30 would forward the first non-erroneous data packet received and drop the second and third packets received as duplicative.

Similarly, only the first non-erroneous data packet received by a network adapter module 90 is forwarded on to each of the two IO modules 110 as consumer modules in still another downstream hop. Any duplicate data packets received by a network adapter module 90 are dropped at a low level without consuming a lot of CPU bandwidth. Similarly, only the first non-erroneous data packet received by each of the IO modules 110 is processed. Any duplicate data packets received by the IO module 110 are dropped at a low level without consuming a lot of CPU bandwidth. Data flow in the reverse direction is also handled in a similar manner with the IO modules 110 becoming the producer modules and the controllers 25 becoming the consumer modules. In short, each module in FIG. 8 needs to process only two data packets if a concurrent connection defines the redundant communication paths in comparison to eight data packets processed per module if separate end-to-end connections define the redundant communication paths.

The concurrent connection enjoys the advantages of separate end-to-end connections without the associated drawbacks. All possible end-to-end data paths are active to transmit data in the absence of faults with the per hop configuration just as with separate end-to-end connections. When a fault happens in a local data path, only the associated hop connection needs to be closed. While multiple data paths between the producer and consumer may be affected because of a single, local data path fault (i.e., due to closing the per hop connection), the impact is the same as if the same fault occurred with separate end-to-end connections defined. However, if multiple separate end-to-end connections are defined, multiple connections would need to be closed. When a fault happens in a module, multiple upstream and/or downstream hop connections may need to be closed. However, as long as one controller 25, one IO module 110, and one data path between them are active, control can be maintained on a concurrent connection.

Figure 11:
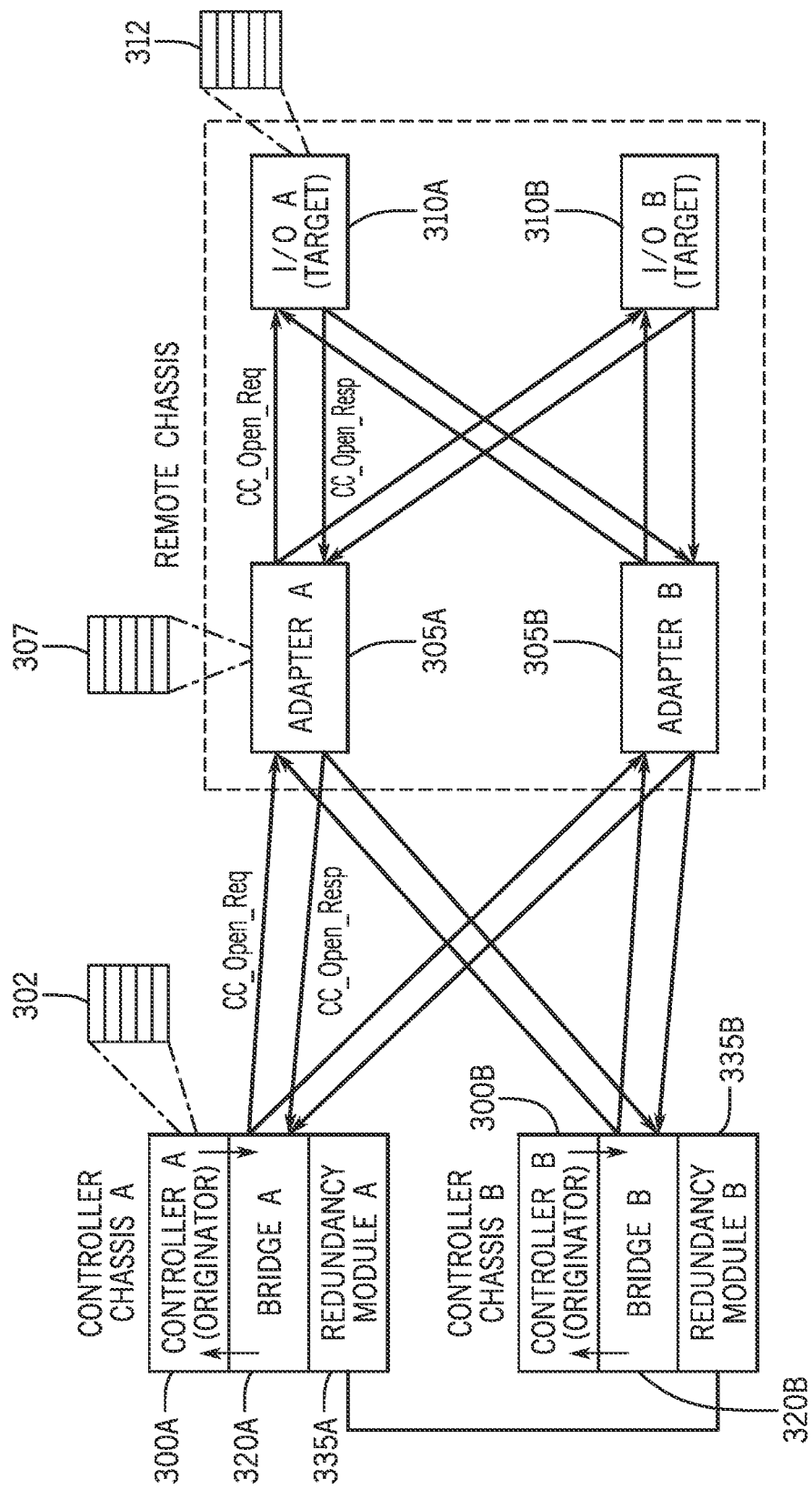
FIG. 11 is flow diagram illustrating message flow between modules for a concurrent connection open process in an exemplary high availability control system.

A more detailed description of the concurrent connections will now be provided. FIG. 11 shows the message flow model for a concurrent connection open process in an exemplary HA control system for a single concurrent connection. It should be noted that FIG. 11 only shows message flow and not all physical arrangements such as network infrastructure, backplanes, and the like. According to the illustrated embodiment, two controller chassis, Controller Chassis A and Controller Chassis B, are configured in a dual chassis redundancy mode. Each controller chassis includes a controller 300, a bridge module 320, and a redundancy module 335. Controller Chassis A contains Controller A 300A and Bridge A 320A. Controller Chassis B contains Controller B 300B and Bridge B 320B. There is a remote chassis with two adapter modules 305, Adapter A 305A and Adapter B 305B, and two IO modules 310, IO module A 310A and IO module B 310B. In addition, there are two redundancy modules, Redundancy Module A 335A and Redundancy Module B 335B, where one redundancy module is located in each controller chassis. The redundancy modules 335 are provided to facilitate communication between Controller A 300A and Controller B 300B. Each controller 300 includes a stored user control program which contains information such as control tasks to be executed, user routines that are part of those tasks, and the information for all concurrent connections that need to be created. The stored information for a concurrent connection includes parameters such as connection type, data size to transfer in each direction, duration of a periodic interval at which the message is to be transmitted, connection timeout duration, and logical path information for all modules that are part of the concurrent connection. For this discussion, the two controllers 300 are connection originators and are establishing a concurrent connection with the two IO modules 310, which are connection targets during the concurrent connection open process.

The two controllers 300 open concurrent connections as part of a startup process for the user control program stored in each controller. Before opening a concurrent connection, the two controllers 300 exchange connection information with each other and generate a globally unique concurrent connection serial number for each concurrent connection.

The unique serial numbers for each concurrent connection are stored in each controller and are utilized during the connection open request.

To open a concurrent connection, each of the two controllers 300 first allocate resources for a per hop connection from the controller 300 to the bridge 320 on their respective chassis. The information about those allocated resources is stored along with concurrent connection parameters into a per concurrent connection control data structure (e.g., the table identified by reference numeral 302 for Controller A 300A). Then the two controllers, Controller A 300A and Controller B 300 B, each send a concurrent connection open request message, CC_Open_Req, to Bridge A 320A and Bridge B 320B, respectively, over the backplane to the bridge module 320 located on the respective controller chassis.

Figures 12, 13:
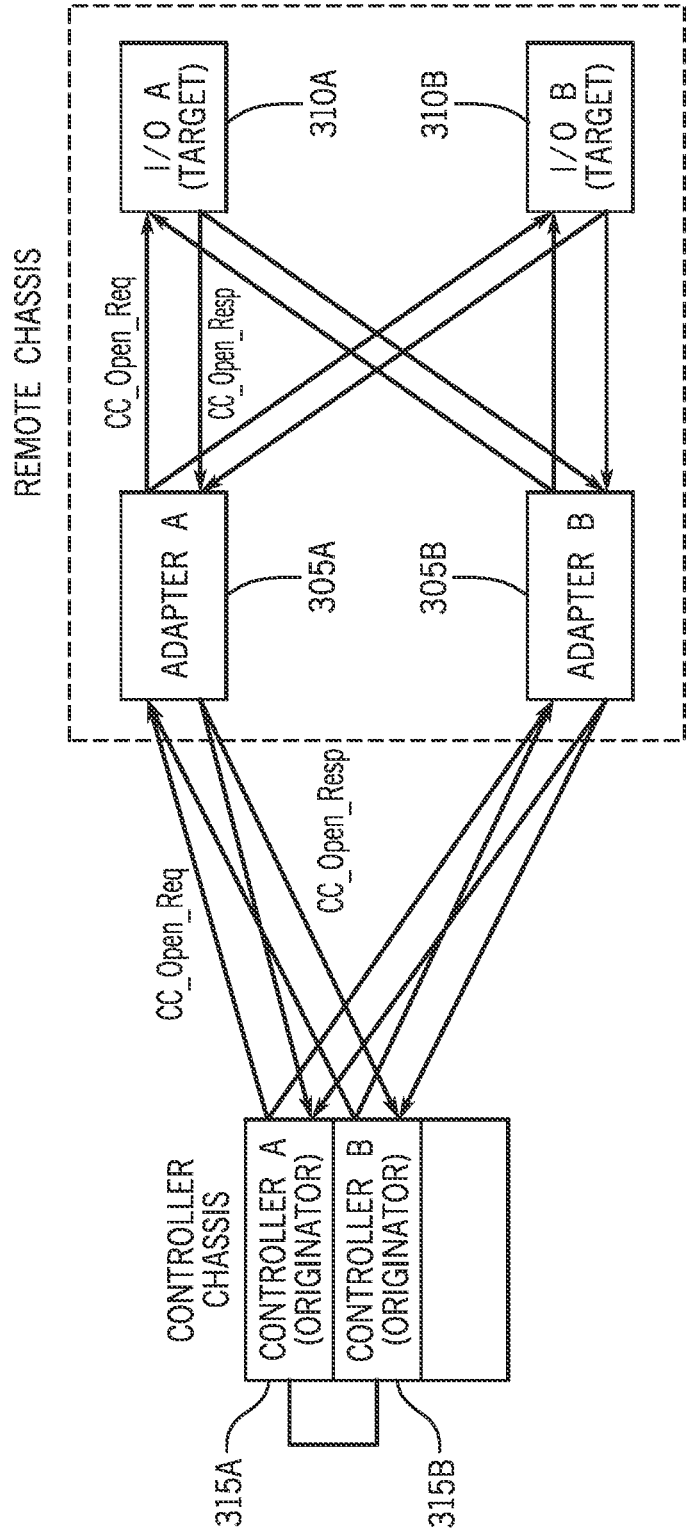
FIG. 12 is a block diagram representation of a data message format for a concurrent connection open request according to one embodiment of the invention.
FIG. 13 is flow diagram illustrating message flow between modules for a concurrent connection open process in another exemplary high availability control system.

FIG. 12 shows the message format for a concurrent connection open request. The message packet contains one or more backplane or network specific header(s) as required for the communication mediums over which the message packet is transmitted. The backplane or network specific headers are followed by an industrial protocol header, which includes message type information indicating, for example, that the message packet is a concurrent connection open request. The message packet then includes connection parameters and a packet CRC. The connection parameters include information such as the globally unique concurrent connection serial number, connection type, data size to transfer in each direction, duration of a periodic interval at which the message is to be transmitted, connection timeout duration, and the logical path defining each of the modules that are part of connection. Table 1, included below, provides exemplary logical path information to downstream modules that may be encoded in the connection parameters for the concurrent connection open request. Each controller 300 includes a complete set of addresses for which per hop connections are to be established in a concurrent connection. In addition to the information included below, the controller 300 would also have parameters defining whether bridge modules 320 are included and, if so, how many and at what logical address they are located. The controller 300 establishes the per hop connection to each bridge module 320 and passes the information for the adapter modules 305 and the IO modules 310 to the bridge modules in the concurrent connection open request message. Each bridge module 320 will establish the per hop connection to each adapter module 305 and passes the information for the IO modules 310 to the adapter modules in the concurrent connection open request message. Thus, as each per hop connection is established, information for the subsequent per hop connections are passed along in the concurrent connection open request message.

TABLE 1

Exemplary Logical Path Information for a
Concurrent Connection Open Request

| Module | Encoded Logical Addresses | Description |
|---|---|---|
| Adapter | 2: | Number of adapters: |
|  | 192.168.1.101; | Network address of adapter A; |
|  | 192.168.1.201 | Network address of adapter B |
| IO | 2: | Number of IO modules: |
|  | 5; | Backplane slot address of IO A; |
|  | 6 | Backplane slot address of IO B; |

Referring back to FIG. 11, when each of the two bridge modules 320 receive the concurrent open request message from the respective controller 300, each bridge module 320 will save information about the sender of the message and all connection parameters, including the unique concurrent connection serial number, that were part of the message into a per concurrent connection control data structure within the bridge module. Each bridge module 320 will then allocate resources for per hop connections to the upstream controllers 300 and for per hop connections to the two downstream adapter modules 305. The information for each of these allocated resources will be saved into the per concurrent connection control data structure. Each bridge module 320 will then send a concurrent open request message to the two downstream adapter modules 305 over the network to establish the next per hop connection.

Each adapter module 305 will, in turn, receive two concurrent connection open request messages, one from each upstream bridge module 320. Due to the serial transmission nature of network communication, the two concurrent connection open request messages will be received by each adapter module 305 at different times. When each adapter module 305 receives the first concurrent open request message from an upstream bridge module 320, it will save information about the sender of the message and all connection parameters, including the unique concurrent connection serial number, that were part of the message into a per concurrent connection control data structure (e.g., the table identified by reference numeral 307 for Adapter A 305A). Each adapter module 305 will then allocate resources for a per hop connection to the upstream bridge modules 320 and for per hop connections to the two downstream IO modules 310. The information for each of these allocated resources will be saved into the per concurrent connection control data structure. Each adapter module 305 will then send a concurrent open request message to the two downstream IO modules 310 over the backplane on the remote chassis to establish the next per hop connection.

When each adapter module 305 receives the second concurrent open request message from the upstream bridge modules 320, the adapter module 305 compares the globally unique concurrent connection serial number in the second open request message received with the concurrent connection serial number from the first open request message that has been saved in the per concurrent connection control data structure. When the concurrent connection serial number matches a previously stored serial number, the adapter module 305 identifies this message as a redundant message, and the adapter module 305 will join the second connection open request message to the saved concurrent connection information in the per concurrent connection control data structure by adding the second sender information to the concurrent connection information and will use the resources already allocated for upstream and downstream per hop connections. Thus, as each module receives redundant concurrent connection open requests from upstream modules, the module will identify each upstream hop to which it is connected but will only forward a single concurrent connection open request (rather than forwarding each of the concurrent connection open requests) to each of the further downstream modules to which the module is to establish a downstream hop connection.

Each IO module 310 will next receive two concurrent connection open request messages, one from each upstream adapter module 305. Due to the serial transmission nature of backplane communication, the two concurrent connection open request messages will be received by each IO module 310 at different times. When each IO module 310 receives the first concurrent open request message from an upstream adapter module 305, it will save information about the sender of the message and all connection parameters, including the unique concurrent connection serial number, that were part of the message into a per concurrent connection control data structure (e.g., the table identified by reference numeral 312 for IO Module A 310A). Note, only three concurrent connection control data structures are illustrated for convenience. Nevertheless, it is understood that each module within the concurrent connection will maintain its own concurrent connection control data structure. Each IO module 310 will then allocate resources for a per hop connection to the upstream adapter modules 305 and save information about those resources into a per concurrent connection control data structure. Each IO module 310 will then mark the concurrent connection status as open and will mark the hop path from the first upstream adapter module 305 as open. After establishing the concurrent connection as open, each IO module 310 will generate and send a concurrent connection open response message with a success status to the first upstream adapter module 305 from which it received the connection open request over the backplane on the remote chassis.

When each IO module 310 receives the second concurrent open request message from the upstream adapter modules 305, the IO module 310 compares the globally unique concurrent connection serial number in the second open request message received with the concurrent connection serial number from the first open request message that has been saved in the per concurrent connection control data structure. When the concurrent connection serial number matches a previously stored serial number, the IO module 310 identifies this message as a redundant message, and the IO module 310 will join the second connection open request message to the already open concurrent connection by adding the second sender information to the saved information in the per concurrent connection control data structure. The IO module 310 will use the resources already allocated for the upstream per hop connection to the first adapter module 305 and will mark the hop path from second upstream adapter as open. The IO module 310 will then send a concurrent connection open response message with a success status to the second upstream adapter module 305 from which it received the connection open request over the backplane on the remote chassis.

When an upstream adapter module 305 receives the first concurrent connection open response message with a success status from a first of the two downstream IO modules 310, the adapter module 305 will mark the concurrent connection status as open and will mark the hop path from that downstream IO module 310 as open. The adapter module 305 will then, in turn, send a concurrent connection open response message with a success status to both upstream bridge modules 320 over the network infrastructure. When the adapter module 305 receives the second concurrent connection open response message with a success status from the second downstream IO module 310, the adapter module 305 will mark the hop path from that downstream IO module 310 as open.

When an upstream bridge module 320 receives the first concurrent connection open response message with a success status from a first of the two downstream adapter modules 305, the bridge module 320 will mark the concurrent connection status as open and will mark the hop path from that downstream adapter module 305 as open. The bridge module 320 will then, in turn, send a concurrent open response message with a success status to the upstream controller, over the backplane within the respective chassis. When the bridge module 320 receives the second concurrent connection open response message with a success status from the second downstream adapter module 305, the bridge module 320 will mark the hop path from that downstream adapter module 305 as open.

When an upstream controller 300 receives a concurrent connection open response message with a success status from a downstream bridge module 320, the controller 300 will mark the concurrent connection status as open and will mark the hop path from that downstream bridge module 320 as open. The concurrent connection is thus now open and is ready to transfer data.

FIG. 13 shows the message flow model for a concurrent connection open process in another exemplary HA control system for a single concurrent connection. It should be noted that FIG. 13 only shows message flow and not all physical arrangements such as network infrastructure, backplanes, and the like. In the embodiment shown in FIG. 13, the two controllers 315, Controller A 315A and Controller B 315B, are in single chassis redundancy mode. The two controllers are capable of directly communicating with each other via a backplane and directly communicating with the adapter modules 305 on the network rather than utilizing bridge modules. The rest of the HA control system is configured similar to the one shown in FIG. 11 and described above. The two controllers 315 are connection originators and are establishing a concurrent connection with the two IO modules 310, which are connection targets during the concurrent connection open process. In this embodiment, the controllers 315 will directly send a concurrent connection open request message to each of the two adapter modules 305 as the first hop. The connection open process proceeds in same way to the IO Modules 310 and back as described earlier with respect to FIG. 11 except that a concurrent connection open response message will be sent directly from the adapter modules 305 to the controllers 315. When an upstream controller 315 receives a first concurrent connection open response message with a success status from one of the downstream adapter modules 305, it will mark the concurrent connection status as open and will mark the hop path from that downstream adapter module as open. When an upstream controller 315 receives a second concurrent connection open response message with a success status from the other of the downstream adapter modules 305, it will mark the hop path from that downstream adapter module as open. The concurrent connection is thus now open and is ready to transfer data.

When a module receiving the concurrent connection open request cannot allocate resources for the request or cannot open the connection for any other reason, the module at which the concurrent connection open request failed will send a concurrent connection open response message with a failure status to the upstream module that sent the concurrent connection open request message. When an upstream module receives a concurrent connection open response message with a failure status from a downstream module, it will mark the hop path from that downstream module as failed.

All modules start a concurrent connection open request message timer with an appropriate timeout duration when they send a concurrent connection open request message to another module along a hop path. If a concurrent connection response message is not received from the downstream module with either a success or a failure status, the request message timer on the upstream module that sent the open request message will eventually time out. The upstream module will then mark the hop path from that downstream module as failed.

When a module identifies that all downstream hop paths for a concurrent connection are marked as failed, it will send concurrent connection open response message with a failure status to all of its immediate upstream modules. The module that identified the failed downstream hop paths will then close the concurrent connection, free the allocated resources, and delete all information stored in the per concurrent connection data structure for the failed concurrent connection. When per hop connections are open on at least one path between each end of the concurrent connection, the concurrent connection will stay open. As long as the concurrent connection is open, it is the responsibility of an upstream module to periodically try to open a per hop connection on a failed or closed hop path using the saved connection parameters. When a concurrent connection is not open it is the responsibility of a controller to periodically try to open a concurrent connection using the saved connection parameters.

Figure 14:
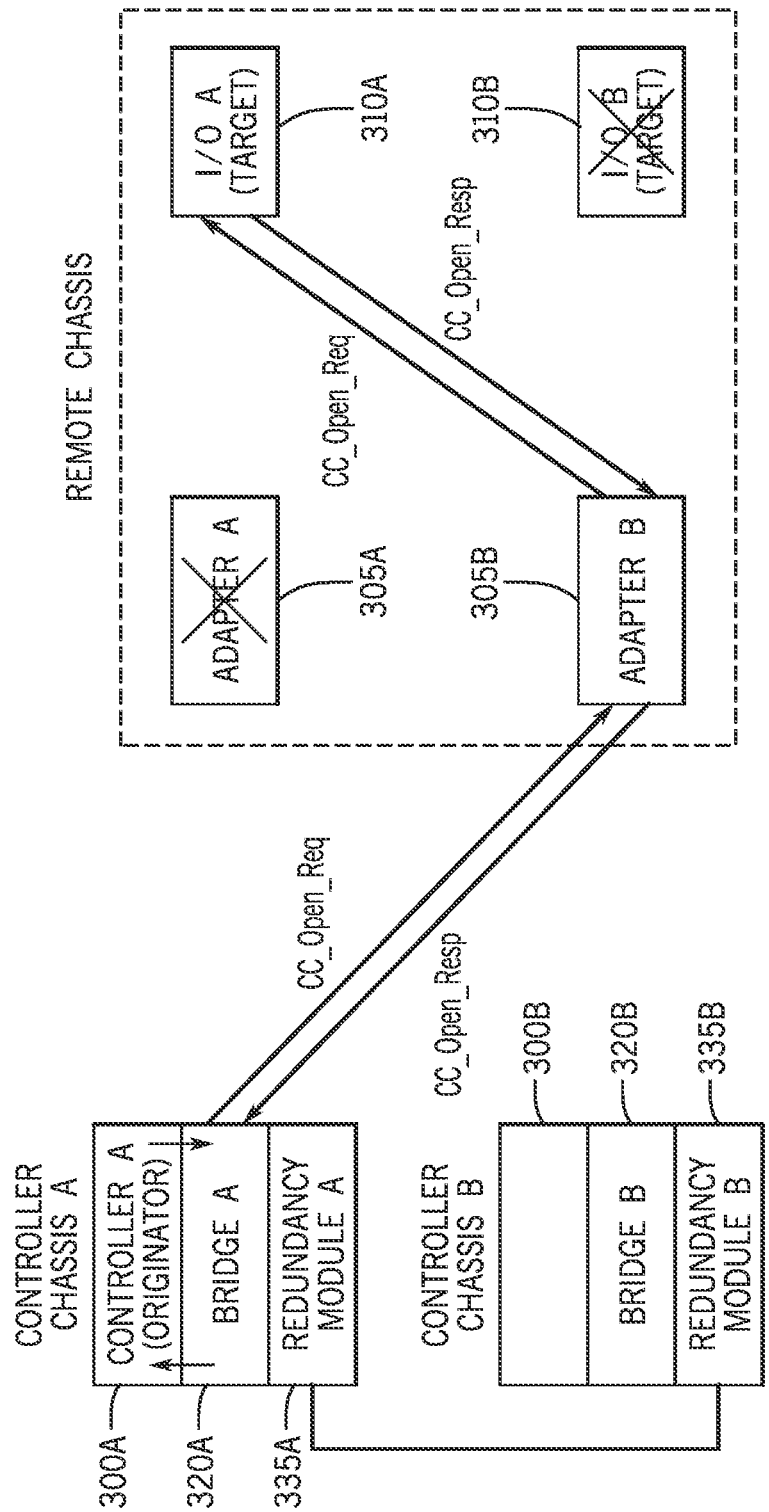
FIG. 14 is a flow diagram illustrating message flow between modules for a concurrent connection open process in the exemplary high availability control system of FIG. 11 when a portion of the modules have failed or are missing.

Turning next to FIG. 14, a message flow model of an exemplary concurrent connection open request message is shown in a HA control system with multiple failures. The HA control system illustrated in FIG. 14 is identical to the system illustrated in FIG. 11; however, Controller B 300B, Adapter A 305A, IO module B 310B have either failed or are not present during the concurrent connection open process. The concurrent connection open process proceeds as described above with respect to FIG. 11 with some changes to accommodate the failed modules, which will now be described.

In the absence of Controller B 300B, Controller A 300A will generate a globally unique concurrent connection serial number for a concurrent connection by itself and will provide the unique serial number to Controller B 300B when it comes online later. Because Controller B 300B is absent or has failed, the concurrent connection open request message will not be sent from Controller B to Bridge B 320B or to any other downstream paths from the absent controller B. Similarly, since Adapter A 305A is absent, it will not send the concurrent connection open request messages to either of the two downstream IO modules 310. While Bridge A 320A will send the concurrent connection open request messages to each of the two adapter modules 305, Bridge A 320A will not receive a concurrent connection open response message from Adapter A 305A because the adapter module is absent. Similarly, Adapter B 305B will send the concurrent connection open request messages to each of the two IO modules 310, but Adapter B 305B will not receive a concurrent connection open response message from the absent IO module B 310B. Eventually the concurrent connection open request message timer, described above, on Bridge A 320A and Adapter B 305B will generate a timeout indication for the hop paths they attempted to establish but for which the concurrent response message is not received. This will result in Bridge A 320A and Adapter B 305B marking those hop paths as failed. However, the concurrent connection open response message with a success status will be received by Adapter B 305B from IO module A 310A, by Bridge A 320A from Adapter B 305B, and by Controller A 300A from Bridge A 320A, resulting in those per hop connections to be open. The concurrent connection is able to open on one active path between the originator and the target and is ready to transfer data. When any of the missing modules come online later, the upstream modules will retry opening the per hop connections to the immediate downstream modules as described earlier, and these per hop connections will be added to the existing concurrent connection. As individual modules and the resulting per hop paths are restored, additional paths of the concurrent connection become active.

Though the description with respect to FIG. 14 focused only on module failures, communication failure due to faults in network infrastructure 70 and backplanes will also result in similar behavior since the concurrent connection open request message will not reach a downstream module. To the module sending the concurrent connection open request, a failure in a module or a failure in the transmission medium will appear the same. A failure in the transmission medium appears as an absent module from either communication direction. For example, from a downstream module perspective, a failure in the transmission medium appears the same as when an upstream module is absent. Similarly, from an upstream module perspective the communication failure will look the same as when a downstream module is absent. Eventually the concurrent connection open request message timer described earlier will generate a timeout indication on an upstream module attempting to establish a hop path in which a concurrent response message is not received, and the upstream module will mark that hop path as failed.

Figure 53:
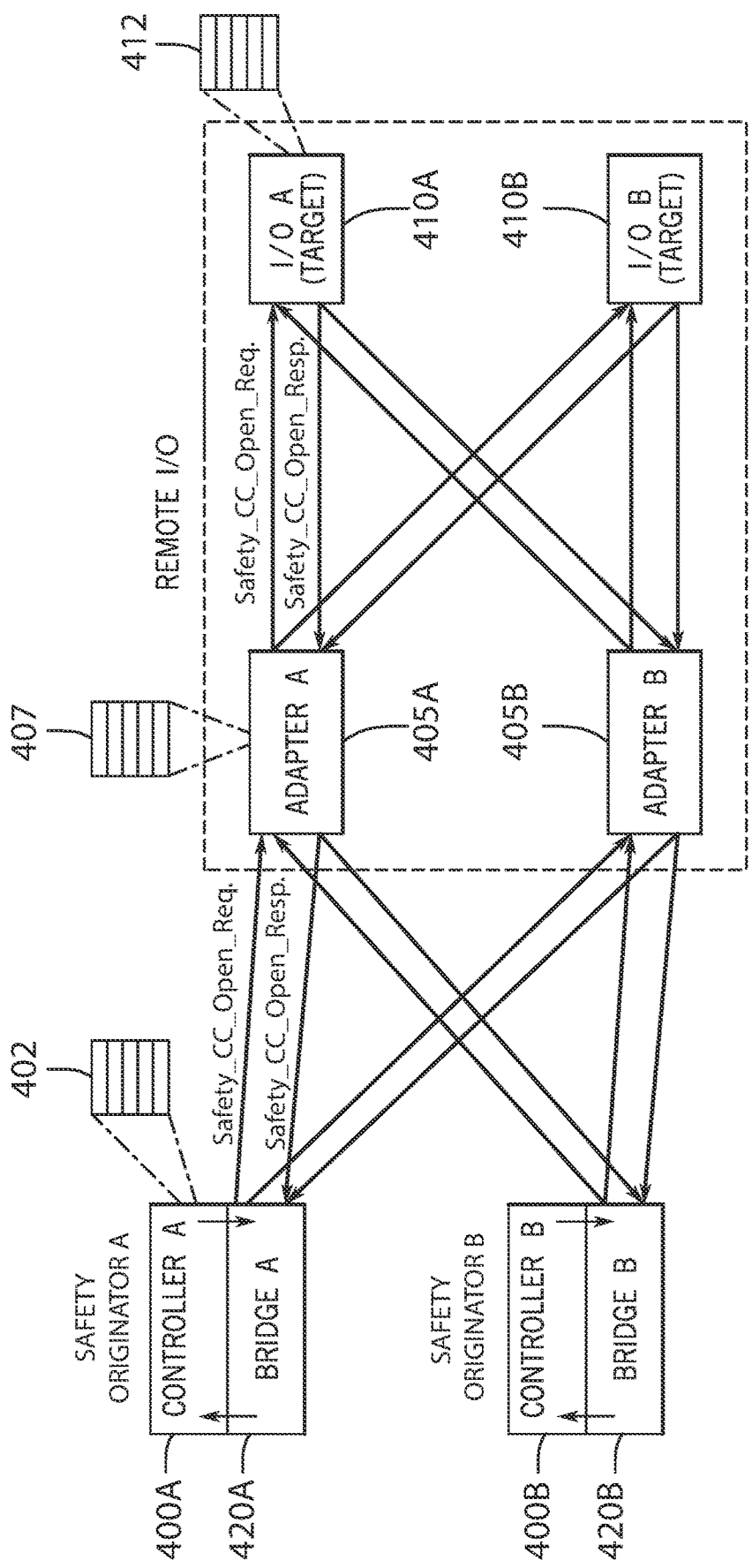
FIG. 53 is flow diagram illustrating message flow between modules for a concurrent connection open process in an exemplary safety control system.

Referring next to FIG. 53, a similar flow model for a concurrent connection open process in an exemplary safety control system for a single concurrent connection is illustrated. It should be noted that FIG. 53 only shows message flow and not all physical arrangements such as network infrastructure, backplanes, and the like. According to the illustrated embodiment, two industrial controllers, Safety Originator A and Safety Originator B are configured to operate in a redundant manner. Each industrial controller includes at least a controller module 400 and a bridge module 420. Safety Originator A contains Controller A 400A and Bridge A 420A. Safety Originator B contains Controller B 400B and Bridge B 420B. There is Remote IO with two adapter modules 405, Adapter A 405A and Adapter B 405B, and two IO modules 410, IO module A 410A and IO module B 410B. Each controller 400 includes a stored user control program which contains information such as control tasks to be executed, user routines that are part of those tasks, and the information for all concurrent connections that need to be created. The stored information for a concurrent connection includes parameters such as connection type, data size to transfer in each direction, duration of a periodic interval at which the message is to be transmitted, connection timeout duration, and logical path information for all modules that are part of the concurrent connection. For this discussion, the two controllers 400 are connection originators and are establishing a concurrent connection with the two IO modules 410, which are connection targets during the concurrent connection open process.

The two controllers 400 open concurrent connections as part of a startup process for the user control program stored in each controller. Before opening a concurrent connection, the two controllers 400 exchange connection information with each other and generate a globally unique concurrent connection identifier for each concurrent connection. The unique serial numbers for each concurrent connection are stored in each controller and are utilized during the connection open request. Within a safety industrial controller, it is desirable to verify that data packets received at a target, or later at a data consumer, are generated by a known originator or later by a known producer. In order to provide the verification, the connection identifier may include an identifier or serial number from the originator. In the illustrated system, however, there are two controllers, Controller A 400A and Controller B 400B, each having their own serial number, but an identical connection identifier is to be included in the connection open request from each originator. As a result, Controller A 400A and Controller B 400B initially determine which identifier or serial number to include in the connection identifier. Resolution may be set by a parameter stored in one or both controllers 400, where the identifier or serial number may come from Controller A 400A, Controller B 400B, or a combination thereof. For discussion, it will be assumed that a Vendor ID and a Serial Number of Controller A 400A will be included in the connection identifier. The vendor identifier and serial number are combined with an additional identifier for the connection. Thus, each connection identifier may be used by the target both to verify that the originator is the expected source of the connection open request and to provide a unique identifier for each connection.

In addition to identifying the source of a concurrent connection, each originator must know the intended target, or targets when redundant targets are present, for the concurrent connection. An identifier for the target and for each intermediate hop in the concurrent connection is also included within the connection parameters for the concurrent open request. The identifiers may define the per hop structure of the concurrent connection and ensure that each originator sends their respective concurrent connection open request along the same path.

To open a safety related concurrent connection, each originator sends a concurrent connection open request and waits for a concurrent connection open response. In a safety control system, it may be desirable for the two originators to issue the connection open requests sequentially and, by having two separate originators verify a successful response message is received, ensure that the network between the originator and target are operating properly. Controller A 400A is configured to transmit a safety concurrent connection open request first, and controller B 400B sends the safety concurrent connection open request after Controller A has received a successful safety concurrent connection open response. Before each controller 400 sends the safety concurrent connection open request, resources are allocated for a per hop connection from the controller 400 to their respective bridge 420. The information about those allocated resources is stored along with concurrent connection parameters into a per concurrent connection control data structure (e.g., the table identified by reference numeral 402 for Controller A 400A).

Figures 55, 56:
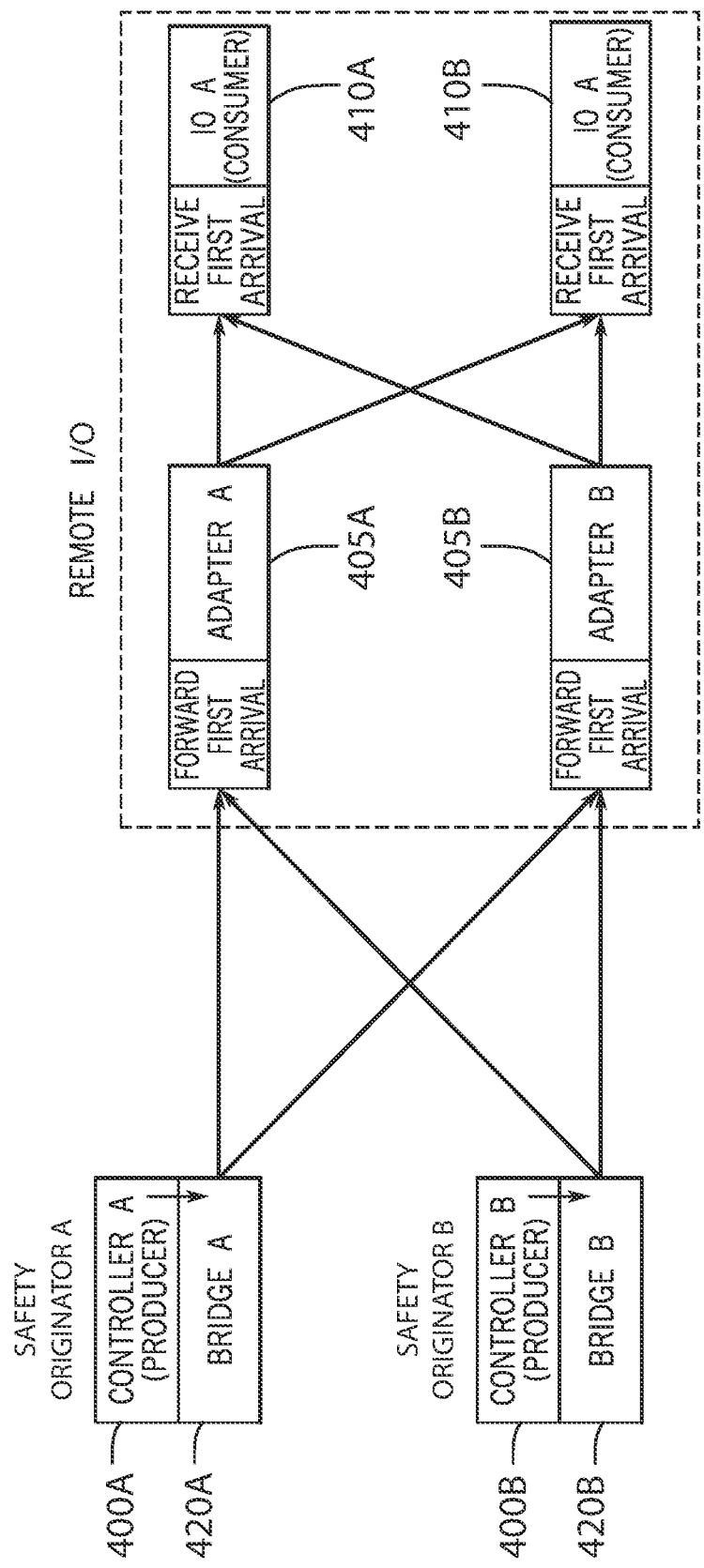
FIG. 55 is a flow diagram illustrating message flow in a second direction for modules in the safety control system of FIG. 53 during run time operation utilizing a concurrent connection according to one embodiment of the invention, where the second direction is opposite the direction shown in FIG. 54.
FIG. 56 is a block diagram representation of a data message format for a concurrent connection open request in a safety control system according to one embodiment of the invention.

Controller A 400A sends an initial safety concurrent connection open request to the remote IO. The message format for the safety concurrent connection open request is similar to that discussed above for the HA control system and illustrated in FIG. 12. The safety concurrent connection open request may alter an existing field or include one or more additional fields related to safety and for validation of the initial open request. An exemplary safety concurrent connection open request is illustrated in FIG. 56. The message packet contains one or more backplane or network specific header(s) as required for the communication mediums over which the message packet is transmitted. The backplane or network specific headers are followed by an industrial protocol header, which includes message type information indicating, for example, that the message packet is a concurrent connection open request. The message packet then includes connection parameters and a packet CRC. The connection parameters include information such as the concurrent connection identifier, connection type, data size to transfer in each direction, duration of a periodic interval at which the message is to be transmitted, connection timeout duration, and the logical path defining each of the modules that are part of connection. Controller A 400A establishes the per hop connection to its bridge module 420A and passes the information for the adapter modules 405 and the IO modules 410 to the bridge modules in the safety concurrent connection open request message. The bridge module 420A will establish the per hop connection to each adapter module 405 and passes the information for the IO modules 410 to the adapter modules in the concurrent connection open request message. Thus, as each per hop connection is established, information for the subsequent per hop connections are passed along in the safety concurrent connection open request message. The safety concurrent connection open request will pass through intermediate modules from the originator module to the target module in the same manner as that discussed above with respect to a HA control system.

When the initial safety concurrent connection open request from Controller A is received at the targets 410, each target will generate a safety concurrent connection open response. Each IO module 410 reads the target identifier present in the safety concurrent connection open request and verifies it is the intended recipient of the concurrent connection open request.

The target modules in a safety control system may similarly provide a response identifier or serial number from the target for use by the originator to verify that the safety concurrent connection open response message is from the expected target. Just as with the originators, there are two target modules 410 and an identical reply identifier may be included in the safety concurrent connection open response from each originator. The two targets, IO Module A 410A and IO Module B 410B, determine which identifier or serial number to include in the reply identifier. Resolution may again be set by a parameter stored in one or both IO Modules 410, where the identifier or serial number may come from IO Module A 410A, IO Module B, 410B, or a combination thereof. For discussion, it will be assumed that a Vendor ID of Safety Originator A and a Serial Number of IO Module A 410A will be included in the response connection identifier. The vendor identifier and serial number are combined with the additional identifier for the connection. Thus, the response connection identifier may be used by the originator both to verify that the target is the expected source of the connection open response and to include the unique identifier for each connection.

Each target module 410 generates a safety concurrent connection open response message and transmits the response message back IO Controller A 400A. Controller A 400A will utilize the first response message received to verify that the connection has been established between Controller A 400A and each of the targets 410. After Originator A has received the safety concurrent connection open response message, Controller B 400B next transmits a safety concurrent connection open request that is identical to the request message transmitted by Controller A 400A. The request message may be delivered to each target 410 if there are no intermediate hops. Each target 410 recognizes the unique concurrent connection identifier in the second open request message and uses the response message previously generated for Controller A for transmission to Controller B. Alternately, if there is an intermediate hop, the intermediate hop may recognize the unique concurrent connection identifier in the second open request message and drop the redundant message, as discussed in more detail below. The intermediate hop may then respond with the response message previously transmitted to Controller A. Controller B 400B verifies that the response message received at Controller B corresponds to the response message received by Controller A 400A and establishes the connection with each target 410.

Figure 15:
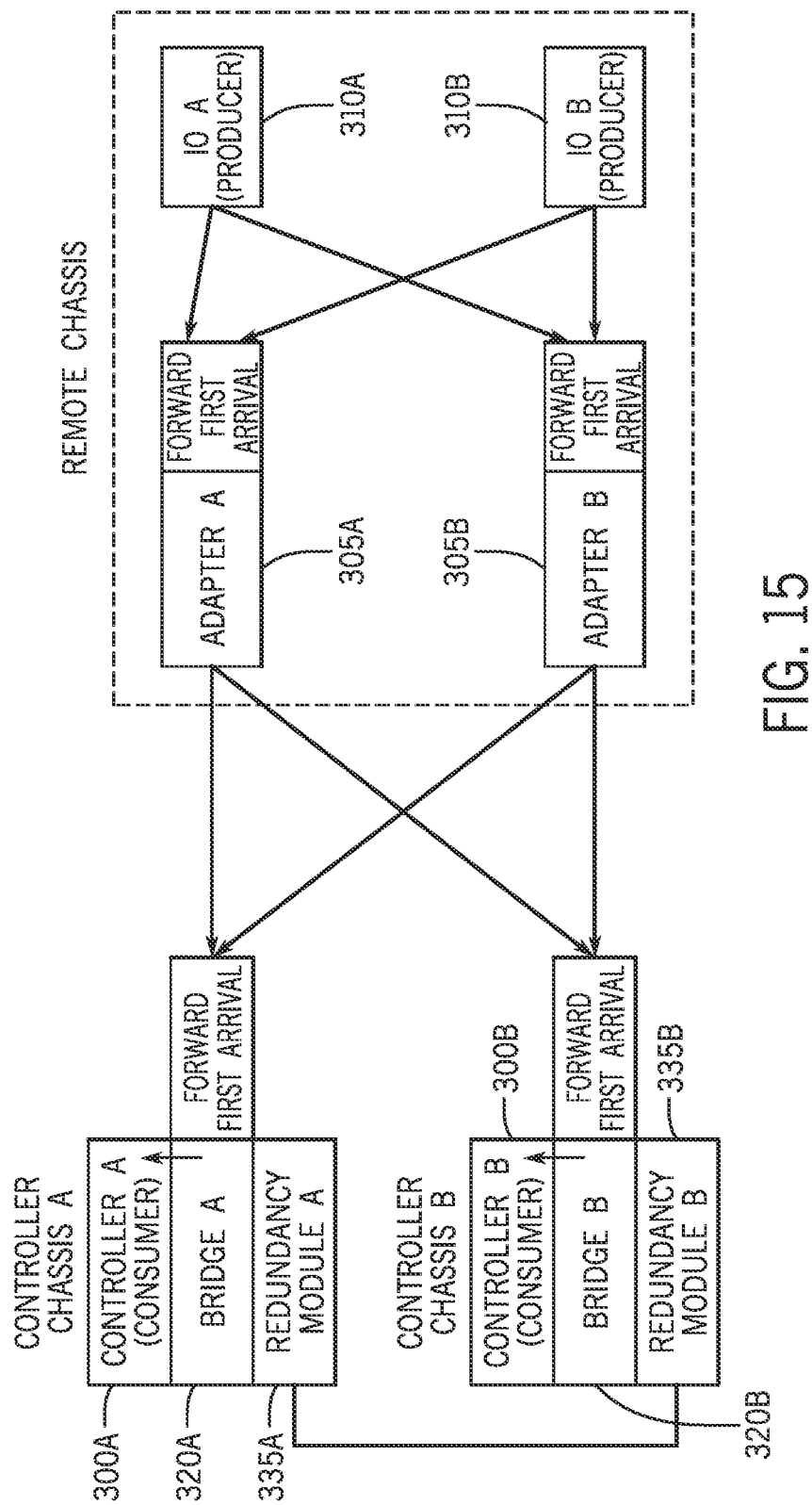
FIG. 15 is a flow diagram illustrating message flow in a first direction for modules in the high availability control system of FIG. 11 during run time operation utilizing a concurrent connection according to one embodiment of the invention.
Figure 16:
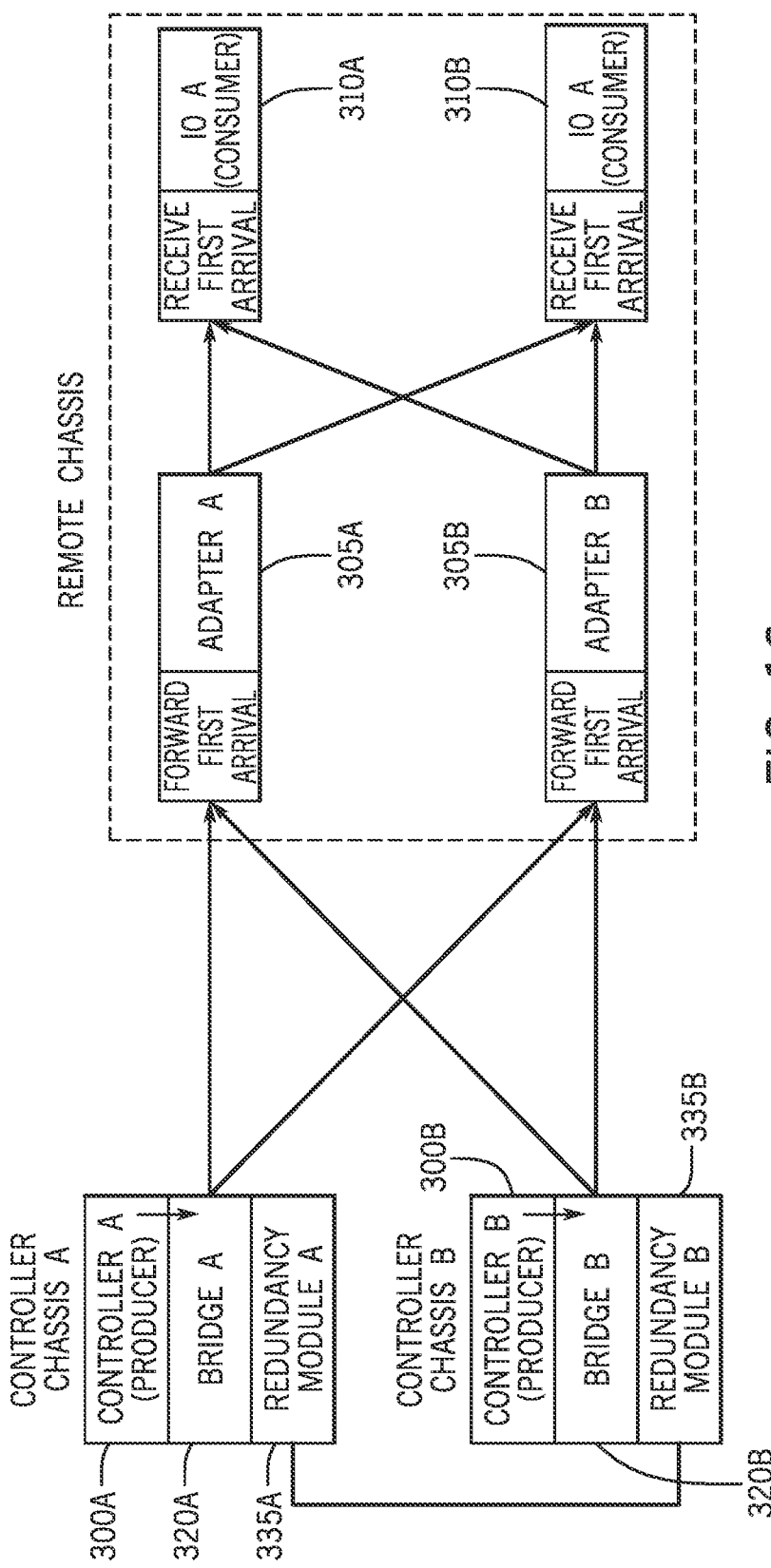
FIG. 16 is a flow diagram illustrating message flow in a second direction for modules in the high availability control system of FIG. 11 during run time operation utilizing a concurrent connection according to one embodiment of the invention, where the second direction is opposite the direction shown in FIG. 15.

The runtime behavior of concurrent connections will now be described. FIGS. 15 and 16 together show bidirectional data flow model in a single concurrent connection during runtime in a HA control system with dual chassis controller redundancy. FIG. 15 shows the HA control system discussed above with respect to FIG. 11 and further illustrates data flow to transfer input signals of controlled devices received at the input modules 310 to the controllers 300 in one direction of the concurrent connection previously opened. FIG. 16 shows data flow from the controllers 300 to transfer output signals for controlled devices to the IO modules 310 in the other direction of the concurrent connection. It should be noted that FIGS. 15 and 16 only show data flow and not all physical arrangements such as the network infrastructure, backplanes, and the like. FIG. 15 shows the IO modules 310 acting as data producers and the controllers 300 acting as data consumers for data flow in one direction, and FIG. 16 shows the controllers 300 acting as data producers and the IO modules 310 acting as data consumers for data flow in the other direction. For discussion herein, it will be assumed that the concurrent connection type is cyclical, meaning data will be produced by both the IO modules 310 and the controllers 300 at periodical intervals for transmission in both directions.

It should be noted that in the following description for the data flow model discussed with respect to runtime operation the terms upstream and downstream are used with respect to the direction of data flow from a producer to a consumer and will not always match with use of those terms in the concurrent connection open process from an originator to a target as discussed above. Referring now to FIG. 15, for every data production cycle, an IO application layer task executing on each of the redundant IO modules 310, IO module A 310A and IO module B 310B, on the remote chassis will sample input signals from the controlled devices. The IO application layer task executing on each of the redundant IO modules 310 will then exchange sampled input data with each other and reach an agreement on data to produce and an associated data sequence number to use during the current data production cycle. The IO application layer task in each redundant IO module 310 will then provide the same agreed upon data and sequence number to a concurrent connection layer executing on the redundant IO module 310 along with the unique concurrent connection identifier for data production. The concurrent connection layer on a redundant IO module 310 will use the unique concurrent connection identifier for each concurrent connection to find the per concurrent connection control data structure stored on that module.

Figure 17:
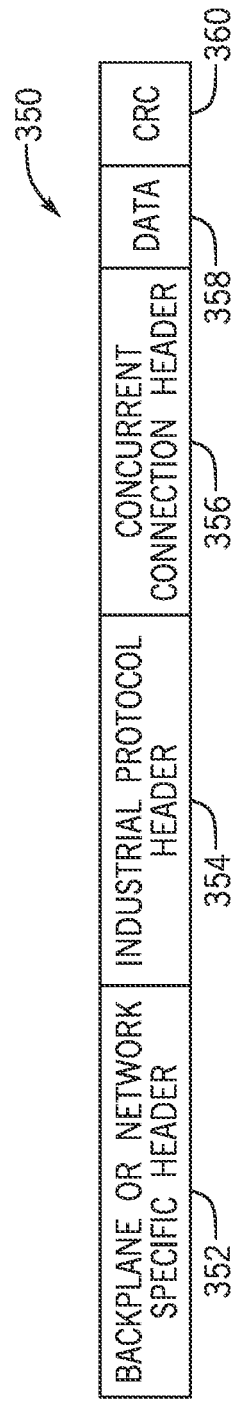
FIG. 17 is a block diagram representation of an extended network segment format of a data message for use in a concurrent connection according to one embodiment of the invention.

The concurrent connection layer will then build a concurrent connection data packet for the given concurrent connection and send it to downstream adapter modules 305, Adapter A 305A and Adapter B 305B, over the backplane in the remote chassis. FIG. 17 shows the format of a concurrent connection data packet 350 according to one embodiment of the invention. The concurrent connection data packet 350 contains one or more backplane or network specific header(s) 352, as required for the communication medium on which the data packet 350 is to be transmitted, followed by an industrial protocol header 354, which includes information such as the packet type, a hop connection identifier, and the like. The protocol header 354 is followed by a concurrent connection header 356, data 358, and, lastly, a packet CRC 360. The concurrent connection header 356 includes information such as the unique concurrent connection serial number, the data sequence number generated by the application layer task, and a separate CRC determined as a function of the data in the concurrent connection header 356 and the data payload 358. This separate CRC in the concurrent connection header is used to ensure integrity of the concurrent connection header and the data from producer to consumer. The final, packet CRC 360 is used during communication on a network or a backplane on a hop-by-hop basis.

Referring back to FIG. 15, when an adapter module 305 receives a concurrent connection data packet 350 from an upstream IO module 310 over the backplane, the adapter module 305 will verify the separate CRC present in the concurrent connection header 356 is valid. If the CRC check on the separate CRC fails, the adapter module 305 will drop the concurrent connection data packet 350. If the separate CRC check passes, then the adapter module 305 will use the hop connection identifier and concurrent connection serial number in the data packet 350 to identify the hop connection from which it received the data packet and the corresponding per concurrent connection control data structure stored on the adapter module 305. The adapter module 305 will then check if the data sequence number in the data packet 350 is newer than a value of a data sequence number stored in the concurrent connection control data structure. If the sequence number is a duplicate to the stored value or is older than the stored value, the adapter module 305 will drop the data packet 350. If the sequence number is newer than the prior stored value, the adapter module 305 will store that the new sequence number in the concurrent connection control data structure, and build data packets for transmission to each of the two downstream bridge modules 320 over the network.

This procedure defines a forward first arrival scheme for the adapter module 305. In other words, the adapter module 305 will only forward the first concurrent connection data packet 350 received from each IO module with the same data. The adapter module 305 is indifferent whether the data packet 350 is received from IO Module A or IO Module B, but rather is only concerned that the first packet of the two packets is retransmitted to the next hop, while the second, or any additional redundant data packets are dropped.

When a bridge module 320 receives a concurrent connection data packet 350 from an upstream adapter module 305 over the network, the bridge module 320 will follow the same process as described above for the adapter modules 305 receiving a concurrent connection data packet from the IO modules 310. If all checks pass in the bridge module 320, then the bridge module 320 will, in turn, build and send concurrent connection data packets to the downstream controller 300, over the backplane in the local chassis.

When a controller module 300 receives a concurrent connection data packet 350 from an upstream bridge module 320, the controller module 300 will follow the same process as described above for receiving a concurrent connection data packet from an upstream module. If all checks pass, then the controller module 300 will provide the data and sequence number to an application layer task executing in the controller 300. The application layer tasks in each of the two controllers 300 will exchange the data and sequence number received by one controller with the other controller and will arrive at an agreed upon input data to use for a user control program executing on the controller 300.

The user control program is executing on each controller 300 and produces output data to send to the IO Modules 310. The application layer tasks executing in each of the two controllers 300 will exchange the output data produced on each controller with the other controller and will arrive at agreed upon output data and a sequence number for the output data to send to the IO Modules 310. The application layer task in each redundant controller 300 will then provide the same agreed upon data and sequence number to the concurrent connection layer along with the unique concurrent connection identifier for the concurrent connection by which the output data is to be transmitted to the IO Modules 310.

With reference next to FIG. 16, a concurrent connection data packet will be generated and transmitted from the controllers 300 as producers to the IO Modules 310 as consumers in a manner similar to that described above for the reverse direction of data transfer shown in FIG. 15. The concurrent connection layer on a redundant controller module will use the unique concurrent connection identifier to find the per concurrent connection control data structure stored on that module build a concurrent connection data packet 350 for the given concurrent connection, and send the data packet to the downstream bridge modules 320 over backplane. When a bridge module 320 receives a concurrent connection data packet 350 from an upstream controller 300, the bridge module 320 will follow the same process as described above for the forward first arrival scheme, accepting the first concurrent connection data packet 350 with a particular sequence number and dropping any redundant data packet. If all checks pass, then the bridge module 320 will build and send concurrent connection data packets to each of the two downstream adapter modules 305 over the network. When an adapter module 305 receives a concurrent connection data packet from an upstream bridge module 320 over the network, the adapter module 305 will also follow the forward first arrival scheme, accepting the first concurrent connection data packet 350 with a particular sequence number and dropping any redundant data packet. If all checks pass, then the adapter module 305 will build and send concurrent connection data packets to each of the two downstream IO modules 310 over the backplane. When an IO module 310 receives a concurrent connection data packet from an upstream adapter module 305 over the backplane, the IO module 310 will similarly follow the receive first arrival scheme, accepting the first concurrent connection data packet 350 with a particular sequence number and dropping any redundant data packet. If all checks pass, then each IO Module 310 will provide the data and sequence number to an application layer task executing in the IO module. The application layer tasks in each IO module 310 will exchange the data and sequence number received at that IO module with the data and sequence number received at the other IO module and will arrive at agreed upon output data to use for providing output signals to each of the controlled devices. The application layer tasks in each of the redundant IO modules 310 will then apply the agreed upon output data to terminals of the IO modules as output signals to control operation of the controlled devices. Thus, the process of bidirectional data transfer is carried out for each production cycle.

Figure 18:
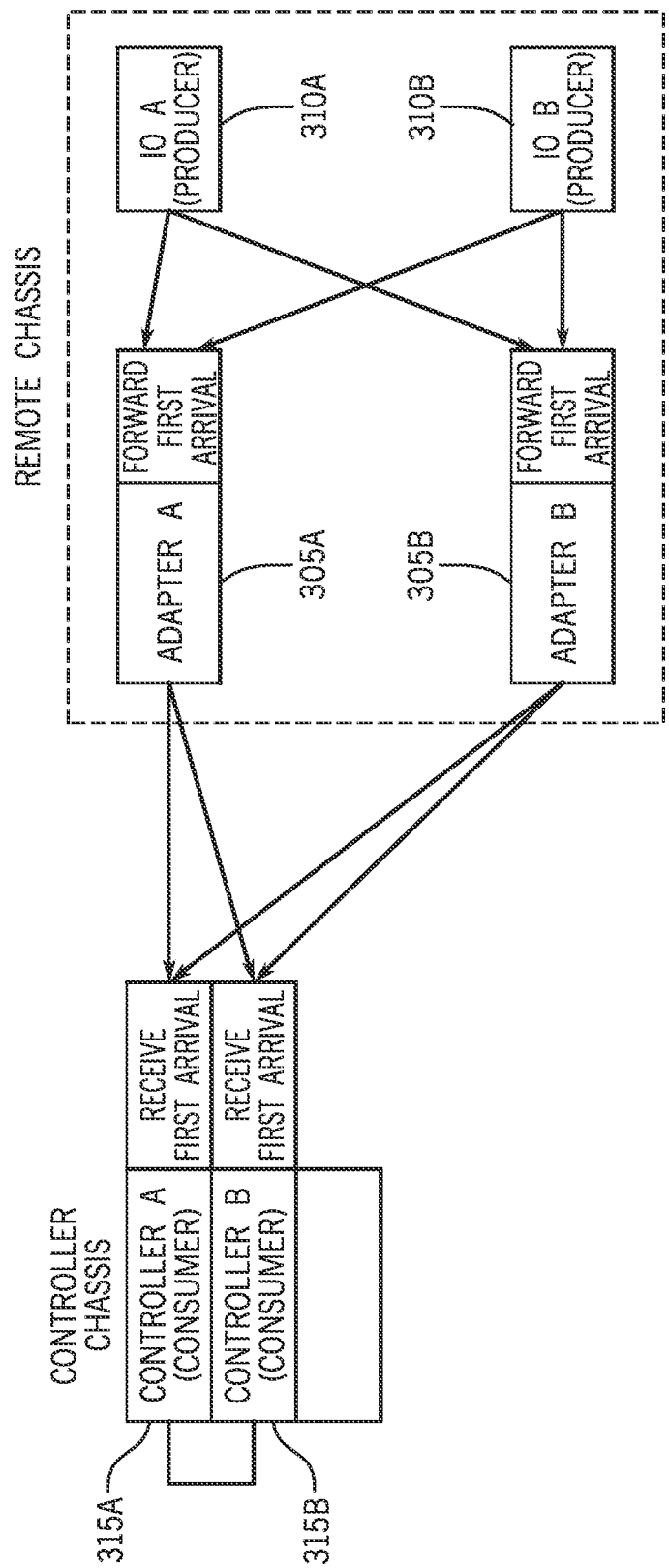
FIG. 18 is a flow diagram illustrating message flow in a first direction for modules in the high availability control system of FIG. 13 during run time operation utilizing a concurrent connection according to one embodiment of the invention.
Figure 19:
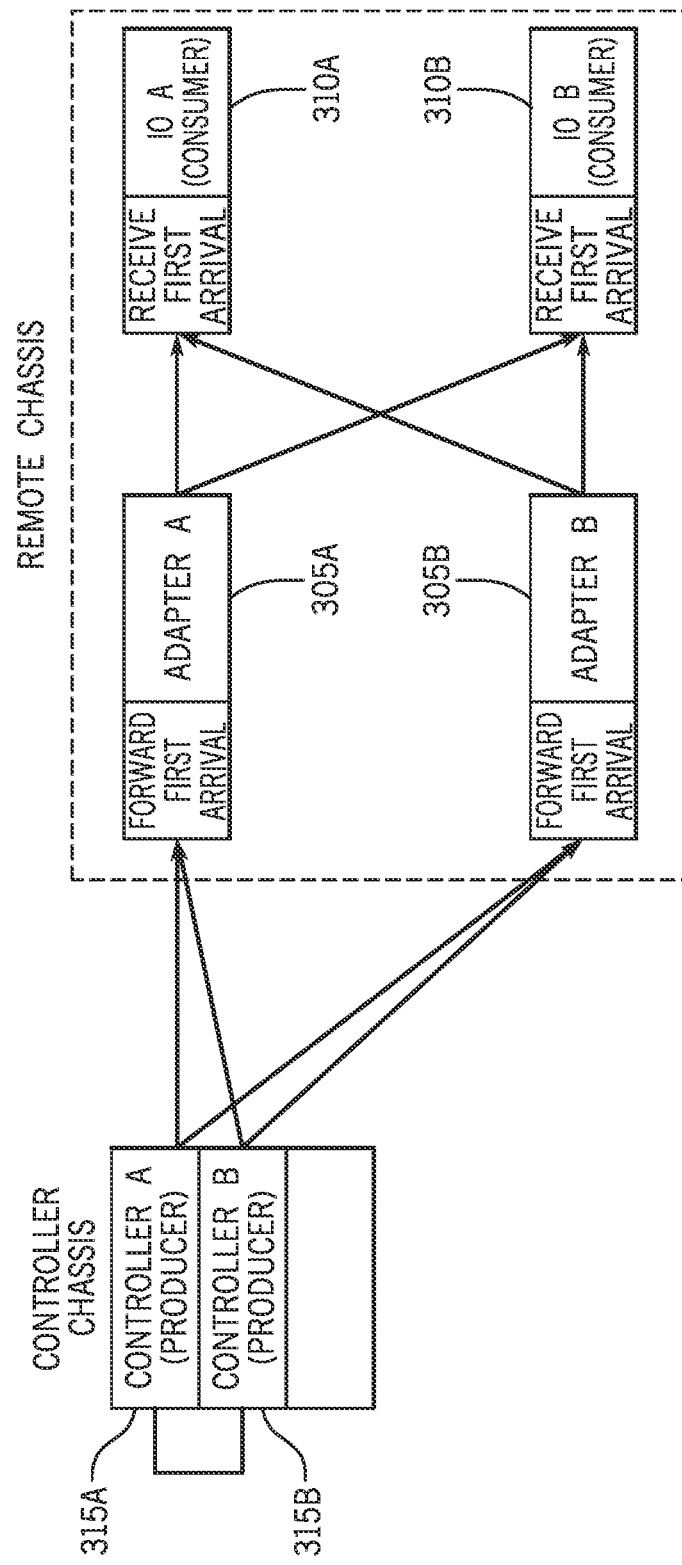
FIG. 19 is a flow diagram illustrating message flow in a second direction for modules in the high availability control system of FIG. 13 during run time operation utilizing a concurrent connection according to one embodiment of the invention, where the second direction is opposite the direction shown in FIG. 18.

FIGS. 18 and 19 together show bidirectional data flow model in a single concurrent connection during runtime in the HA control system with single chassis controller redundancy previously discussed in FIG. 13. FIG. 18 shows data flow from IO Modules 310 receiving input signals of controlled devices to controllers 315 in one direction and FIG. 19 shows data flow from controllers 315 providing output signals to the IO Modules 310 to control operation of the controlled devices in the other direction. It should be noted that FIGS. 18 and 19 only show data flow and not all physical arrangements such as the network infrastructure, backplanes, and the like. FIG. 18 shows the IO modules 310 acting as data producers and the controllers 315 acting as data consumers for data flow in one direction. FIG. 19 shows the controllers 315 acting as data producers and the IO modules 310 acting as data consumers for data flow in the other direction. The bidirectional data transfer process proceeds in the same manner as described above for the dual chassis redundancy case illustrated in FIGS. 15 and 16. In this embodiment, controllers 315 directly transmit concurrent connection data packets 350 to or receive the data packets from adapter modules 305 over the network. Otherwise, the process of bidirectional data transfer is carried out for each production cycle in the same manner as dual chassis redundancy case.

All modules use a per hop connection receive timer to monitor data packet reception from an upstream module on an open per hop connection. This timer is started when a per hop connection is first opened. The timer executes with a connection timeout duration that is received as part of connection parameters. Whenever a valid concurrent connection data packet is received on a per hop connection, the per hop connection receive timer is restarted. When a valid concurrent connection data packet is not received on a per hop connection for a time equal to or greater than the connection timeout duration, the per hop connection timer will generate a time out event and the module executing the timer marks that per hop connection as closed. As described earlier it is the responsibility of an upstream module (from the perspective of the concurrent connection open process) to periodically try to reopen closed per hop connections. When a module identifies that all per hop connections from upstream modules are marked as closed, then it will close the concurrent connection, free the resources allocated for it, and delete all information stored in the per concurrent connection data structure.

Figure 20:
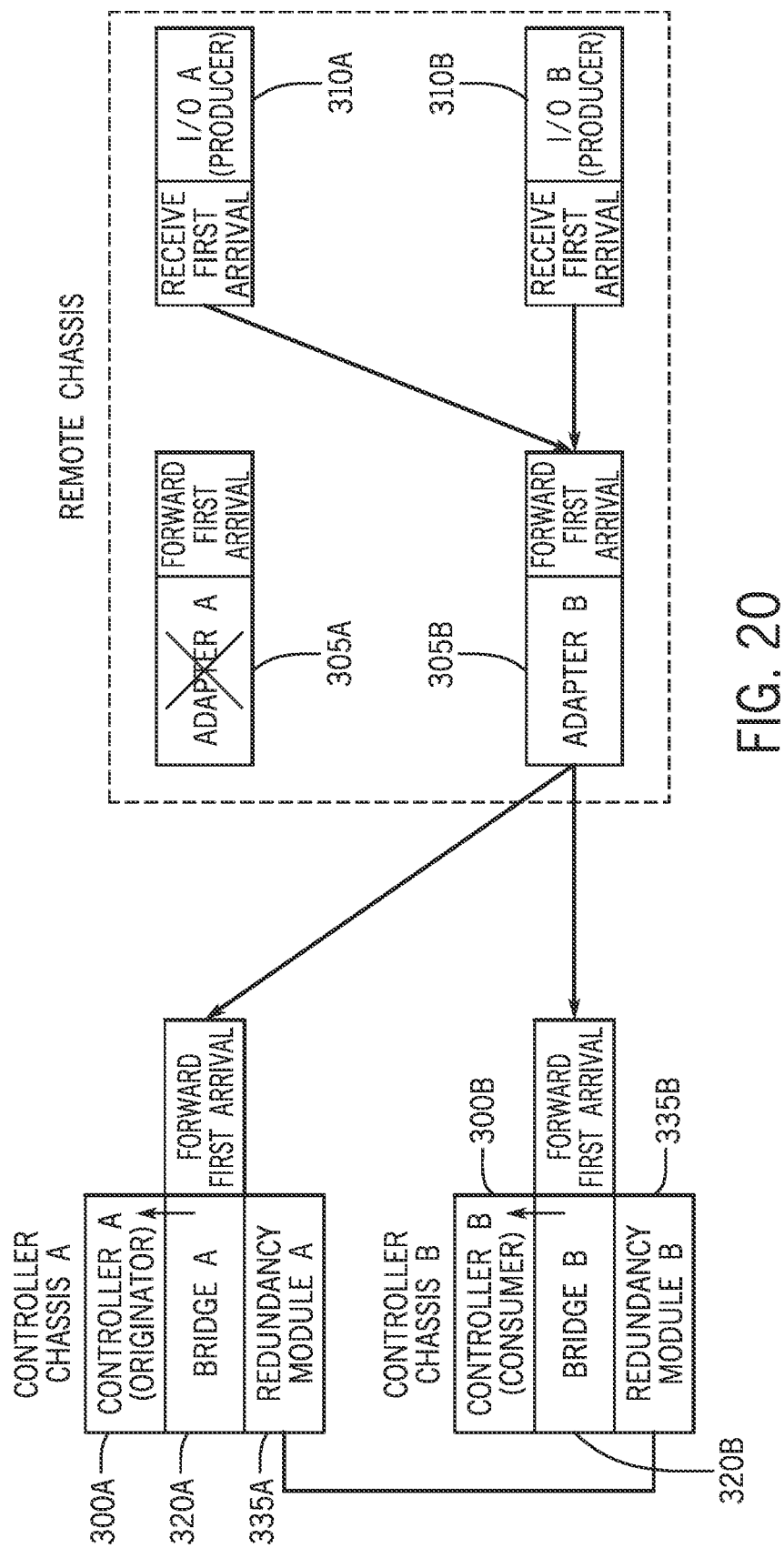
FIG. 20 is a flow diagram illustrating message flow in the first direction for modules in the high availability control system of FIG. 15 during run time operation utilizing a concurrent connection according to one embodiment of the invention with one of the adapter modules failed or removed.
Figure 21:
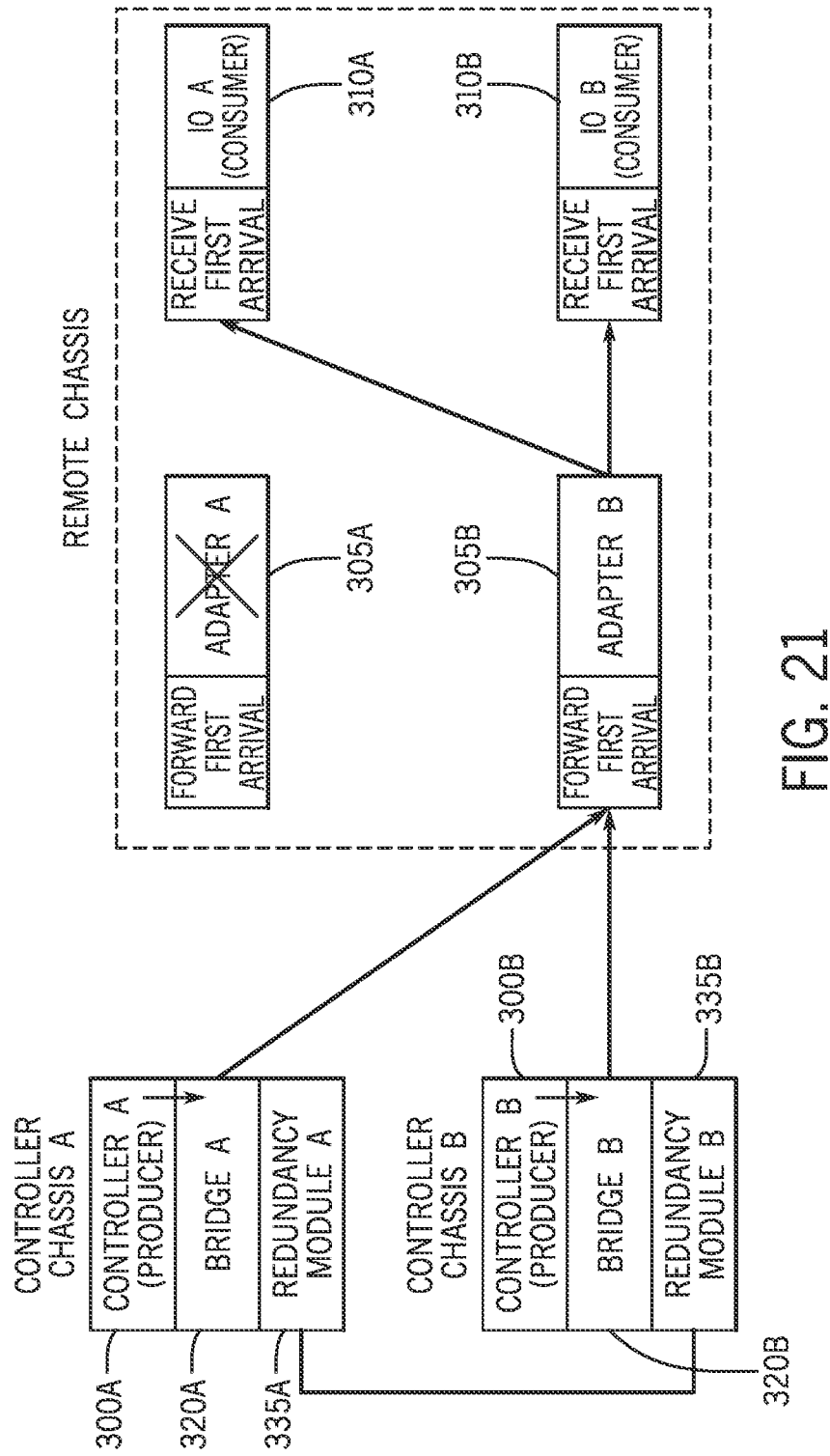
FIG. 21 is a flow diagram illustrating message flow in the second direction for modules in the high availability control system of FIG. 16 during run time operation utilizing a concurrent connection according to one embodiment of the invention with one of the adapter modules failed or removed.

FIGS. 20 and 21 show the same data flow model for a dual chassis redundancy HA control system as shown and discussed above with respect to FIGS. 15 and 16 except with the addition of a runtime fault in Adapter A 305A. Referring now to FIG. 20, when Adapter A 305A fails during runtime, the per hop connection receive timer on Bridge A 320A for concurrent connection data packets received via the per hop connection from adapter A 305A will timeout due to non-reception of the concurrent connection data packets from adapter A, and Bridge A 320A will close the per hop connection to Adapter A 305A. Similarly, Bridge B 320B will also experience a timeout on the per hop connection receive timer for concurrent connection data packets received from Adapter A 305A via its respective per hop connection and close the per hop connection to adapter A. Referring now to FIG. 21, IO module A 310A and IO module B 310B will similarly experience timeouts on their respective per hop connection receive timers for concurrent connection data packets received from Adapter A 305A in the other communication direction and close their respective per hop connections to Adapter A. Since Bridge A 320A and Bridge B 320B closed their respective per hop connections to Adapter A 305A, each bridge module 320 will stop sending data packets To Adapter A 305A. Similarly, since IO module A 310A and IO module B 310B closed their respective per hop connections to Adapter A, 305A each IO module 310 will stop sending data packets to Adapter A. The concurrent connection will, however, remain open and continue bidirectional data transfer through the remaining per hop paths. When Adapter A 305A comes back online, Bridge A 320A and Bridge B 320B will each reopen their respective per hop connection paths to Adapter A 305A via a concurrent connection open request. Successfully re-establishing the per hop connections between the bridge modules 320 and Adapter A 305A will, in turn, cause Adapter A 305A to reopen per hop connections to each of the IO modules 310, thus completing the recovery of concurrent connection.

Though the description above with respect to FIGS. 20 and 21 focused only on a module failure, communication failure due to faults in network infrastructure and backplanes will result in similar behavior. The modules affected by communication failure between them will experience a timeout in a per hop connection receive timer and will close the per hop connection to a module on the other side of the communication failure. The concurrent connection will continue to stay open and carrying out bidirectional data transfer through remaining per hop paths. When the communication failure disappears the upstream module with respect to the concurrent connection request process will attempt to reestablish and reopen the hop connection completing the recovery of concurrent connection.

The concurrent connection close process is done on a hop-by-hop basis in a manner similar to the concurrent connection open process. The concurrent connection originator, usually a controller, starts the concurrent connection close process by sending a concurrent connection close request message to one or more downstream modules depending on number of open per hop connections to downstream modules. The controller will then close the concurrent connection, freeing the resources allocated for it and deleting all information stored in the per concurrent connection control data structure for that connection. An intermediate module receiving a concurrent connection close request message from an upstream module will send a concurrent connection close response message with a success status to the upstream module and will, in turn, close the per hop connection to that upstream module. If the closed per hop connection was the last open upstream per hop connection, the intermediate module will also send a concurrent connection close request message to one or more downstream modules depending on number of open per hop connections to the downstream modules. The intermediate module will then close the concurrent connection, freeing the resources allocated for it and deleting all information stored in the per concurrent connection control data structure for that connection. A concurrent connection target module receiving a concurrent connection close request message from an upstream module will send a concurrent connection close response message with a success status to the upstream module and will close the per hop connection to that upstream module. If the closed per hop connection was the last open upstream per hop connection, the target module will close the concurrent connection, freeing the resources allocated for it and deleting all information stored in the per concurrent connection control data structure for that connection.

Figure 54:
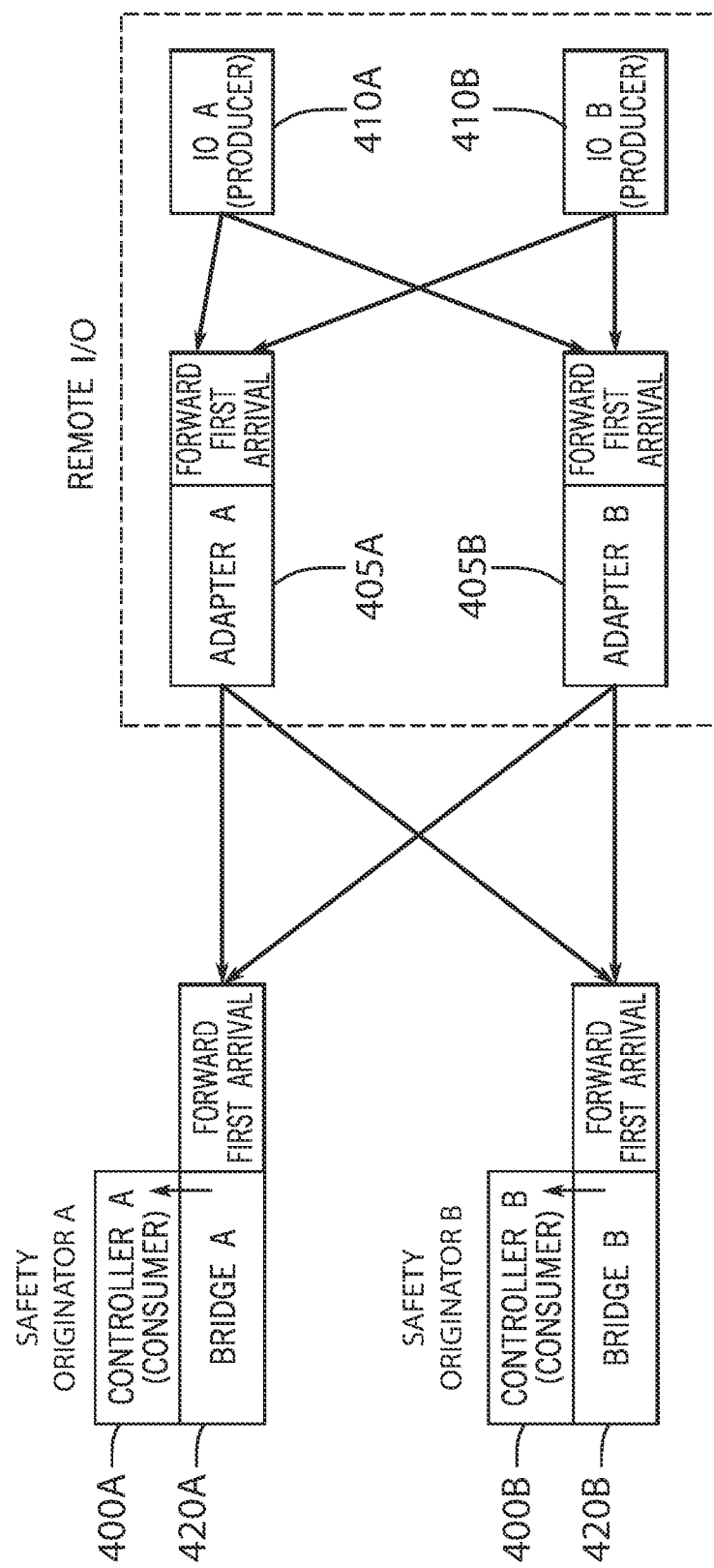
FIG. 54 is a flow diagram illustrating message flow in a first direction for modules in the safety control system of FIG. 53 during run time operation utilizing a concurrent connection according to one embodiment of the invention.

With reference next to FIGS. 54 and 55, the runtime behavior of concurrent connections in a safety control system will now be described. FIGS. 54 and 55 together show bidirectional data flow model in a single concurrent connection during runtime in a safety control system with dual controller redundancy. FIG. 54 shows the safety control system discussed above with respect to FIG. 53 and further illustrates data flow to transfer input signals of controlled devices received at the input modules 410 to the controllers 400 in one direction of the concurrent connection previously opened. FIG. 55 shows data flow from the controllers 400 to transfer output signals for controlled devices to the IO modules 410 in the other direction of the concurrent connection. It should be noted that FIGS. 54 and 55 only show data flow and not all physical arrangements such as the network infrastructure, backplanes, and the like. FIG. 54 shows the IO modules 410 acting as data producers and the controllers 400 acting as data consumers for data flow in one direction, and FIG. 55 shows the controllers 400 acting as data producers and the IO modules 410 acting as data consumers for data flow in the other direction.

Figure 52:
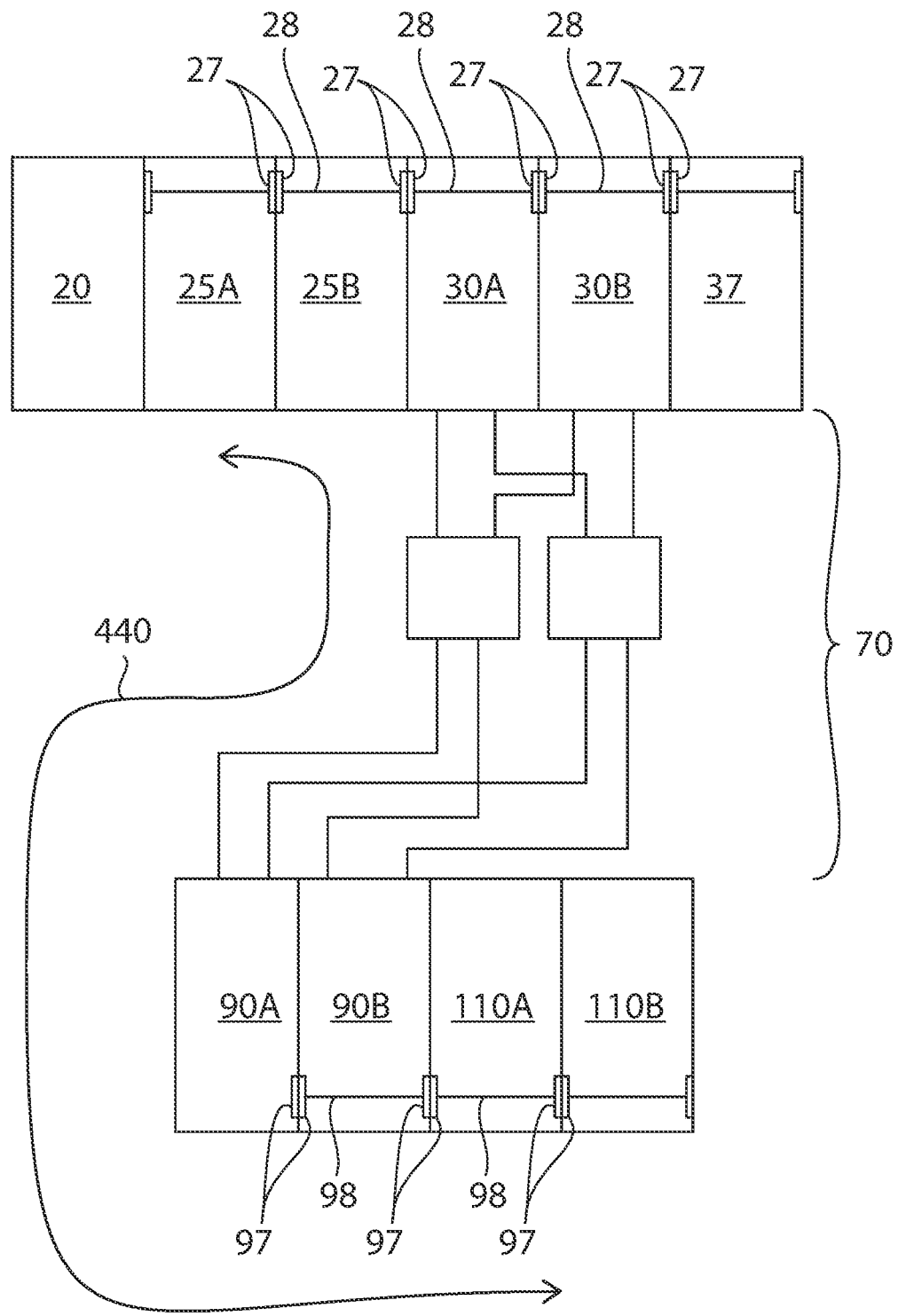
FIG. 52 is a block diagram representation of a redundant industrial control system configured to incorporate embodiments of the present invention.

With reference to FIGS. 51 and 52, two exemplary applications of communication via a safety industrial control system are illustrated. FIG. 51 illustrates communication within an industrial controller. A connection may be established, for example, between a processor module 25 and an IO module 37 mounted on the same rail and connected via a backplane. A bidirectional communication path 440 is shown where data flows over a concurrent connection established on a backplane or other communication bus extending between modules in both directions between the processor module 25 and the IO modules 37. FIG. 52 illustrates communication via an industrial network 70 to a remote device. A connection is established between redundant processor modules 25A, 25B and a pair of remote, redundant IO modules 110A, 110B. The bidirectional communication path 440 is shown where data flows over a concurrent connection in both directions between the processor module 25 and network modules 30A, 30B via a backplane 28 and backplane connectors 27 local to the processor module 25. The bidirectional communication path 440 continues from the network modules 30 via the industrial network 70 to adapter modules 90 and then from the adapter modules 90 to each of the IO modules 37A, 37B via a backplane 98 and backplane connectors 97 located on the remote IO. Safety-related communications occur between two modules and may occur locally on a common DIN rail mounted controller or remotely via a first set of modules and a second set of modules with an industrial network located between.

For discussion herein, it will be assumed that the concurrent connection type is cyclical, meaning data will be produced by both the IO modules 410 and the controllers 400 at periodical intervals for transmission in both directions. It should be noted that in the following description for the data flow model discussed with respect to runtime operation the terms upstream and downstream are used with respect to the direction of data flow from a producer to a consumer and will not always match with use of those terms in the concurrent connection open process from an originator to a target as discussed above.

Figure 50:
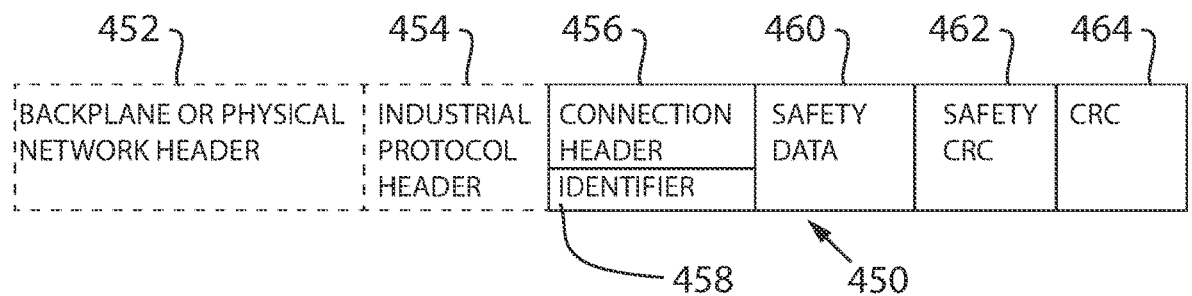
FIG. 50 is a block diagram representation of a safety related concurrent connection data packet according to one embodiment of the invention.

When a producer is ready to send safety related data over a concurrent data connection, the producer generates a safety related concurrent connection data packet 450 as illustrated, for example, in FIG. 50. Similar to the concurrent connection data packet 350 discussed above for high-availability systems, the safety related concurrent connection data packet 450 includes one or more backplane or network specific header(s) 452, as required for the communication medium on which the data packet 450 is to be transmitted, followed by an industrial protocol header 454, which includes information such as the packet type, a hop connection identifier, and the like. The network specific header 452 and the industrial protocol header 454 are shown in dashed lines as they may be optionally included for communication between two modules directly coupled via a backplane and not connected via an industrial network 70. The protocol header 454 is followed by a concurrent connection header 456, which includes information such as the connection identifier 458. The concurrent connection header 456 is followed by safety data 460 and a safety-related CRC 462, which will be discussed in more detail below. The data packet 450 concludes with a data packet CRC 464, where the data packet CRC 464 is determined as a function of the rest of the contents of the data packet 450.

For safety control systems, it is common to include redundant producers of data. Thus, a first processor module 25A and a second processor module 25B may be a first producer and a second producer, respectively. Each processor module 25A, 25B may be monitoring inputs and outputs and running the same control program independently. The two processor modules 25A, 25B take steps as is understood for safety related systems to synchronize operation and to verify that data in each module is the same. Thus, when each module 25 generates a safety-related data packet 450, the safety data 460, as generated by each module, to be included in the data packet 450 should be identical. However, the potential exists that an error has occurred or synchronization is slightly off such that the safety data 460 generated by each module 25 as a producer is not identical.

Prior to transmitting a safety related concurrent connection data packet 450, each producer verifies that they are including the same safety data 460 within the data packet 450. Under normal operating conditions, each producer will generate identical safety data 460 and each producer may include the safety data it produced in its respective data packet 405. When the safety data 460 on a first producer does not match the safety data on a second producer, one of the producers may cause the safety control system to enter a safe operating state. According to a first aspect of the invention, the safe operating state may bring the controlled system, or a portion thereof, to a stop. Optionally, the controlled system may operate at a reduced speed or with limited functionality.

According to another aspect of the invention, it may be desirable to balance safe operation with high availability. Thus, the safe operating state may be selected such that operation may continue, at least for a short term, until maintenance may be performed. An alternate safe operating state may include designating one of the two producers as a primary module and the second of the two producers as a backup module. The safety data 460 generated by the primary module may be used for the safety related data packet 450. The first producer transmits the safety data it generated to the second producer and both producers generate data packets 450 using the safety data 460 from the first producer. According to still another alternate safe operating state, the first producer may again be presumed to be the primary controller. The concurrent connection with the second producer may be closed and a single data packet 450 is generated by the first producer for transmission to each consumer. The system will continue operation by transmitting safety related data packets 450 only from the first producer for a short duration while the second producer attempts to reestablish the concurrent connection. Reestablishing the concurrent connection may operate to resynchronize the first and second producers, such that the safety data 460 generated by each producer is again identical. According to yet another alternate safe operating state, the safety data from one producer is selected and transmitted by itself. During the next transmission interval, both producers again generate safety data 460 and the data is compared. If the two producers are again generating identical safety data 460 normal operation resumes with each producer loading its respective safety data 460 into a data packet 450. If another difference between the safety data 460 is found, the safety control system may be configured to enter a different safe operating state or continue in the present safe operating state for a predefined number of transmission intervals. A warning message may be generated to alert a technician that the safety data 460 does not match and to allow for further corrective action to be taken.

Once safety data 460 has been identified for inclusion in the respective safety related concurrent connection data packet 450, each producer must generate the data packet 450 for the given concurrent connection and send it to the next downstream module. A safety CRC 462 is generated that corresponds to the safety data 460. The safety CRC 462 provides a secondary check, in addition to the CRC 464 for the data packet 450, for each consumer to verify that the safety data 460 received is the expected data.

With reference again to FIGS. 54-55, a safety related concurrent connection data packet 450 may be generated and transmitted bidirectionally in a manner similar to that discussed above with respect to the HA control systems. The data packet 450 may be transmitted from the controllers 400, as producers, to the IO Modules 410, as consumers, or the data packet 450 may be transmitted from the IO Modules 410, as producers, to the controllers 400, as consumers, according to the required direction of transmission.

Once the safety related concurrent connection data packet 450 arrives at each consumer, the consumers must verify that the safety data 460 is received correctly. As an initial step, each consumer verifies that they received the same safety data 460 as the other consumer. Under normal operating conditions, each consumer will receive identical safety data 460 from the producers, and each consumer may utilize the safety data it received in subsequent processing. However, when the safety data 460 received by the first consumer does not match the safety data received by the second consumer, an error during transmission may have occurred. Still other errors in transmission may cause a delay for one of the consumers receiving the data packet 450. As a result, one consumer may indicate receipt while the other consumer may indicate that no packet has been received. If the consumers detect a problem with data integrity, timeliness of transmission, or authenticity of the data, one of the consumers may cause the safety control system to enter a safe operating state. According to a first aspect of the invention, the safe operating state may bring the controlled system, or a portion thereof, to a stop. Optionally, the controlled system may operate at a reduced speed or with limited functionality.

According to another aspect of the invention, it may be desirable to balance safe operation with high availability. Thus, the safe operating state may be selected such that operation may continue at each consumer, at least for a short term, until maintenance may be performed. An alternate safe operating state may include designating one of the two consumers as a primary module and the second of the two consumers as a backup module. The safety data 460 received by the primary module may be used by each consumer. The first consumer transmits the safety data it received to the second consumer and both consumers perform subsequent processing utilizing the safety data 460 received by the first consumer. According to still another alternate safe operating state, the first consumer may again be presumed to be the primary controller. The concurrent connection with the second consumer may be closed and the first consumer may perform the subsequent processing utilizing the received safety data. The system will continue operation with safety related data packets 450 received by only the first consumer for a short duration while the second consumer attempts to reestablish the concurrent connection. Reestablishing the concurrent connection may operate to resynchronize the first and second consumers, such that the safety data 460 received by each consumer is again identical. According to yet another alternate safe operating state, safety data received at a prior transmission interval by both consumers and which did match may be utilized. During the next transmission interval, both consumers again receive safety data 460 and the data is compared. If the two consumers are again receiving identical safety data 460 normal operation resumes with each consumer using its respective safety data 460 for subsequent processing. If another difference between the safety data 460 is found, the safety control system may be configured to enter a different safe operating state or continue in the present safe operating state for a predefined number of transmission intervals. A warning message may be generated to alert a technician that the safety data 460 does not match and to allow for further corrective action to be taken.

Concurrent connection diagnostics are provided to help pinpoint problem location to user. When a per hop connection is closed on a module while the concurrent connection associated with that per hop connection is still open, a diagnostic bit will be set on the module status information. This module status information and hence the diagnostic bit is readily available to a user control program executing in the controller and to raise an alarm on an HMI when a fault is detected. Additional information about closed hop connections of concurrent connections can be obtained from a module programmatically through messages from the controller and via the HMI. Alternatively, this diagnostic information will also be available on module web pages.

Concurrent connections are fully compatible with functional safety such as those used in safety instrumented systems (SIS). Concurrent connections can carry safety data as data payload in black channel mode of operation for functional safety systems.

In yet another embodiment of communicating data over an industrial control system, each controller in a redundant pair of controllers opens a connection using a set of rules to ensure that at least two open connections exist between a redundant target and source and that the two connections (or three connections for triple redundancy) between the redundant originators and the redundant targets use as divergent paths as possible. In the case of the system shown in FIG. 22, two controllers may attempt the connection open using the following paths listed in Table 2.

TABLE 2

Exemplary connection paths in the industrial control system of FIG. 22

| Controller 1 | Controller 2 |
|---|---|
| 1. C1 -> A1 -> IO1 | 1. C2 -> A2 -> IO2 |
| 2. C1 -> A1 -> IO2 | 2. C2 -> A2 -> IO1 |
| 3. C1 -> A2 -> IO1 | 3. C2 -> A1 -> IO2 |
| 4. C1 -> A2 -> IO2 | 4. C2 -> A1 -> IO1 |

If there is a single fault on one of the path segments or devices, only one of the controllers will encounter the fault and the other one of the controllers, therefore, will successfully complete the connection open on the first try. Examples of a single fault occurring in different modules for the embodiment of FIG. 22 are illustrated in FIGS. 23 and 24. In FIG. 23, the adapter module in the first connection path is faulted, and in FIG. 24, the IO module in the second connection path is faulted. In FIG. 23, the second controller is successful in establishing a connection on the first try, and in FIG. 24, the first controller is successful in establishing a connection on the first try. If a controller is unsuccessful in establishing a connection on the first try, it may automatically retry to establish the connection. Operation may proceed in different manners if the industrial control system is configured as a HA control system or as a safety control system. When the industrial control system is configured as a HA control system, it is desirable to proceed with operation as quickly as possible. While each of the controllers that failed on the first attempt are able to establish a redundant communication path in a subsequent connection open, a HA control system may experience no delay in the initial connection open because one of the controllers was successful in establishing a connection, resulting in no performance loss at startup. When the industrial control system is configured as a safety control system, it may be desirable to wait until each redundant controller has established a connection. Thus, if one attempt fails, the system may experience a slight delay during startup as the controller which experienced a failure establishes a redundant communication path in a subsequent connection open.

If the controller is not part of redundant pair (or if its partner controller has faulted as shown in FIG. 25) the active controller will attempt to open two connections. A first connection open attempt is selected starting from the top of the connection list for that controller and the second connection open attempt is selected starting from the bottom of the list for that controller. With reference again to Table 2, the second controller in FIG. 25 establishes connections along the first and last connections in the connection list. As with the other embodiments of communicating data over a high availability industrial control system, this method allows communications to continue after multiple faults, provided faults do not occur on each component of a redundant pair.

When a controller detects a fault on its open connection, it will attempt to reopen the connection moving down its list of possible paths to find a working path. Provided this is the first fault, while the faulted controller is reopening its connection, the other controller's connection will remain open since they share no common components in their two paths. And while a controller is operating with a path other than its first choice, it will periodically retry the paths higher on its list to detect when a fault on the initial path is cleared.

Figure 28:
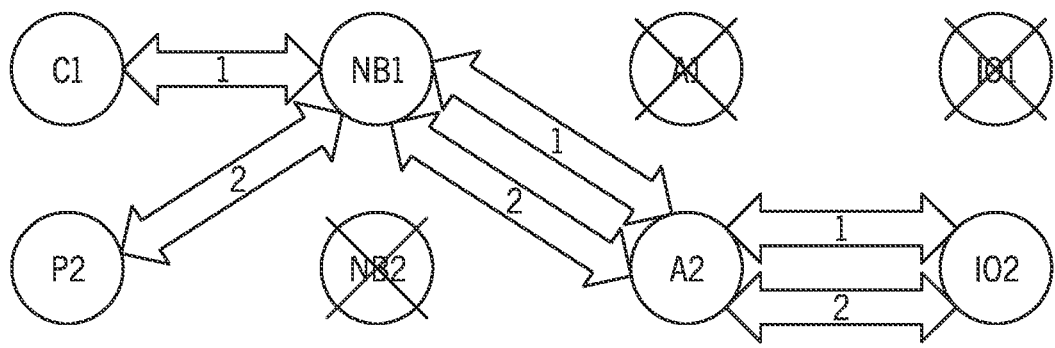
FIG. 28 is a block diagram representing the dual redundancy system of FIG. 26 with multiple modules faulted.
Figure 29:
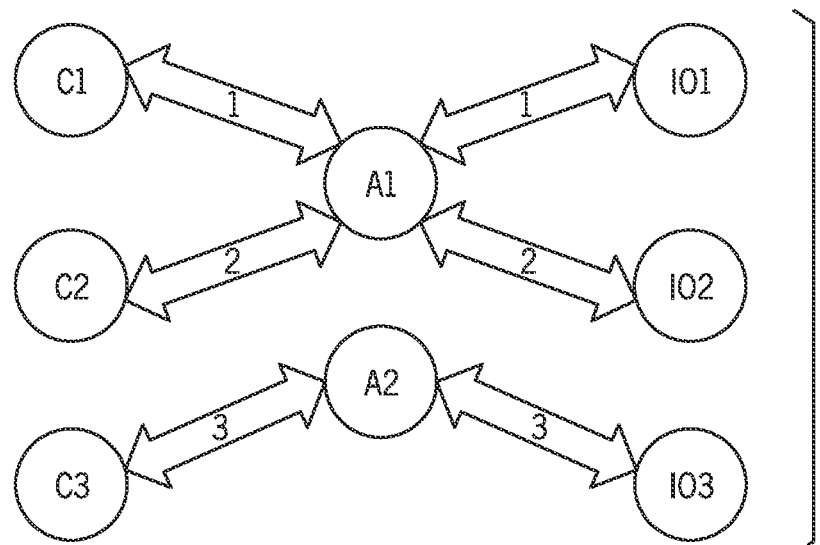
FIG. 29 is a block diagram representation of one embodiment of a partial triple redundancy system communicating data over an industrial control network in a high availability industrial control system according to another embodiment of the invention.

As with the other embodiments of communicating data over a high availability industrial control system, this method is extendable to additional layers of redundancy. FIGS. 26-28 show a system with redundant controllers, redundant network bridge modules, redundant adapters and redundant IO modules. In the case of the system illustrated in FIG. 26, each of the two controllers would attempt the connection open using the following table of potential connection paths. FIGS. 27 and 28 illustrate exemplary fault conditions that may occur in the system.

TABLE 3

Exemplary connection paths in the HA control system of FIG. 26

| Controller 1 | Controller 2 |
|---|---|
| 1. C1 -> NB1 -> A1 -> IO1 | 1. C2 -> NB2 -> A2 -> IO2 |
| 2. C1 -> NB1 -> A1 -> IO2 | 2. C2 -> NB2 -> A2 -> IO1 |

TABLE 3-continued

Exemplary connection paths in the
HA control system of FIG. 26

| Controller 1 | Controller 2 |
|---|---|
| 3. C1 -> NB1 -> A2 -> IO1 | 3. C2 -> NB2 -> A1 -> IO2 |
| 4. C1 -> NB1 -> A2 -> IO2 | 4. C2 -> NB2 -> A1 -> IO1 |
| 5. C1 -> NB2 -> A1 -> IO1 | 5. C2 -> NB1 -> A2 -> IO2 |
| 6. C1 -> NB2 -> A1 -> IO2 | 6. C2 -> NB1 -> A2 -> IO1 |
| 7. C1 -> NB2 -> A2 -> IO1 | 7. C2 -> NB1 -> A1 -> IO2 |
| 8. C1 -> NB2 -> A2 -> IO2 | 8. C2 -> NB1 -> A1 -> IO1 |

Turning next to FIGS. 29-34, a HA control system with partial triple redundancy is illustrated. The controllers and IO modules each exhibit triple redundancy (i.e., three modules) while the adapter modules only utilize parallel redundancy (i.e., two modules). Because the number of controllers and IO modules at each end of the connection exceeds the number of adapters at an intermediate point in the connection, at least two controllers and at least two IO modules must pass through one adapter, while the other controller and adapter may pass through the other adapter.

Figure 30:
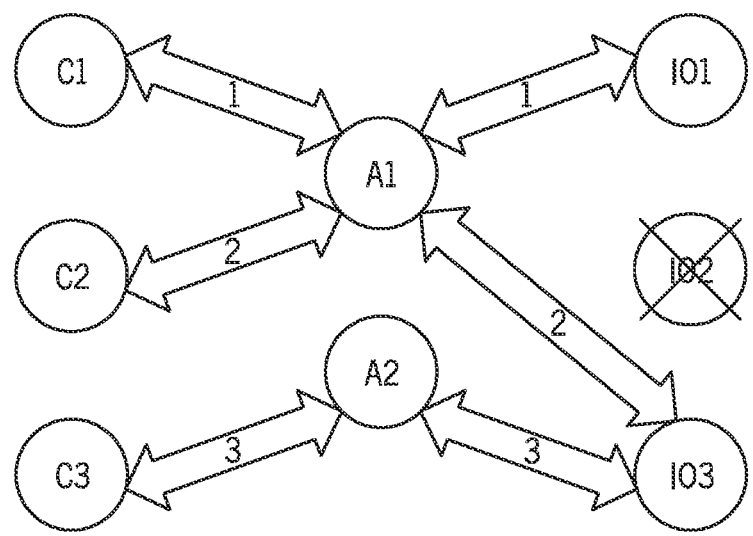
FIG. 30 is a block diagram representing the partial triple redundancy system of FIG. 29 with a single IO module faulted.
Figure 31:
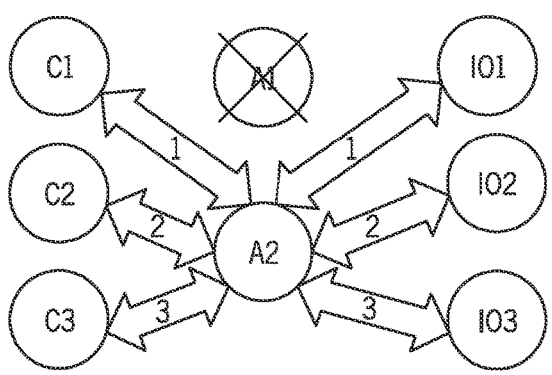
FIG. 31 is a block diagram representing the partial triple redundancy system of FIG. 29 with a single adapter module faulted.

In FIGS. 30 and 31 one of the redundant downstream modules in each path has failed. In FIG. 30, the second IO module has failed. Controller 2, therefore, fails in its first open connection, but Controllers 1 and 3 are successful. Controller 2 selects another path from its list and opens a new path to IO Module 3. In FIG. 31, the first adapter has failed. Controller 3 is still able to successfully open its initial path. Controllers 1 and 2 must select an alternate path. Because this stage of the system has only parallel redundancy, each of the controllers ends up establishing a path through Adapter 2.

Figure 32:
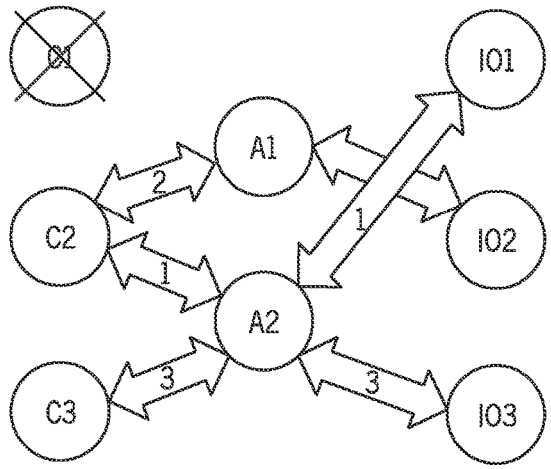
FIG. 32 is a block diagram representing the partial triple redundancy system of FIG. 29 with a first controller faulted.
Figure 33:
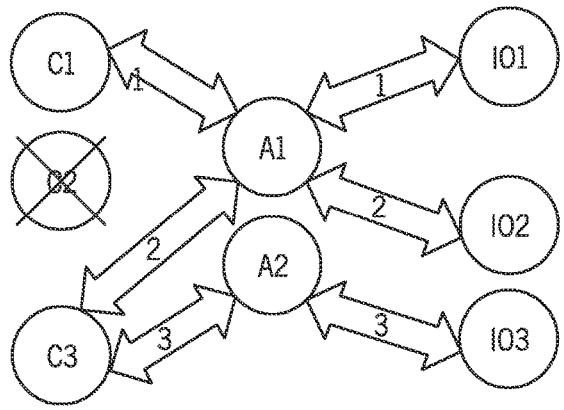
FIG. 33 is a block diagram representing the partial triple redundancy system of FIG. 29 with a second controller faulted.
Figure 34:
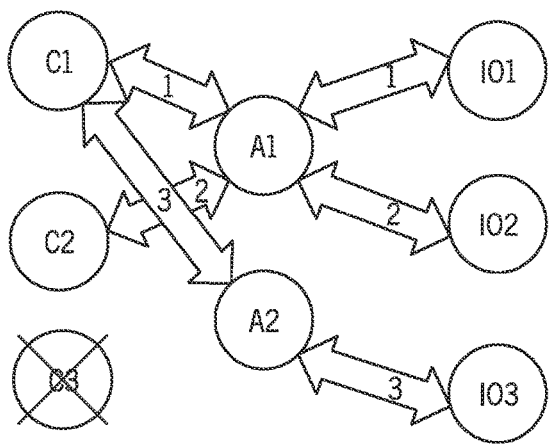
FIG. 34 is a block diagram representing the partial triple redundancy system of FIG. 29 with a third controller faulted.

Referring next to FIGS. 32-34, one of the controllers in the system has failed. If controller 1 fails, controller 2 opens a second connection starting at the bottom its list. If controller 2 fails, controller 3 opens a second connection starting at the bottom its list. And if controller 3 fails, controller 1 opens a second connection starting at the bottom its list. If two controllers fail, the remaining controller will open three connections.

Figure 35:
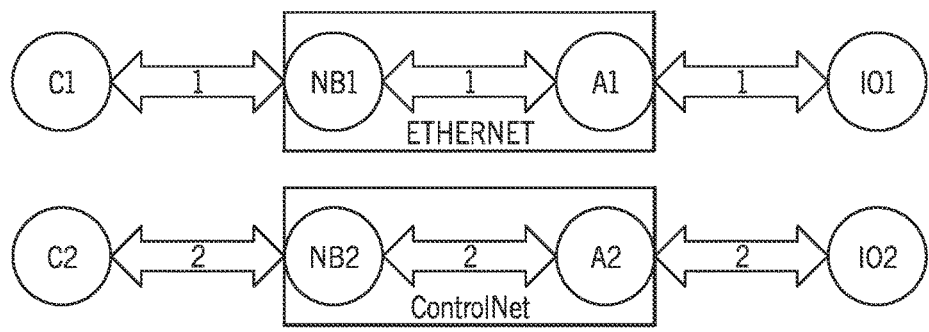
FIG. 35 is a block diagram representation of one embodiment of a system with redundant networks communicating data over an industrial control network in a high availability industrial control system according to another embodiment of the invention.
Figure 36:
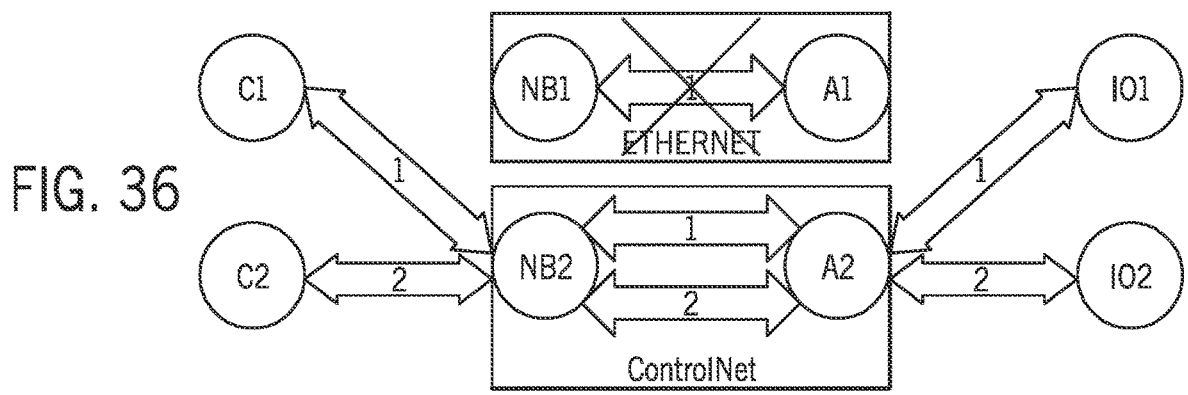
FIG. 36 is a block diagram representing the system with redundant networks of FIG. 35 with one network faulted.
Figure 37:
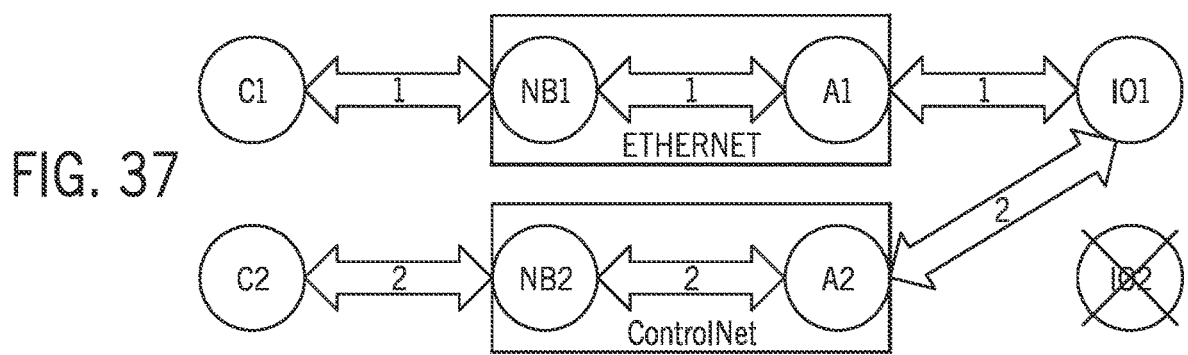
FIG. 37 is a block diagram representing the system with redundant networks of FIG. 35 with a single IO module faulted.
Figure 38:
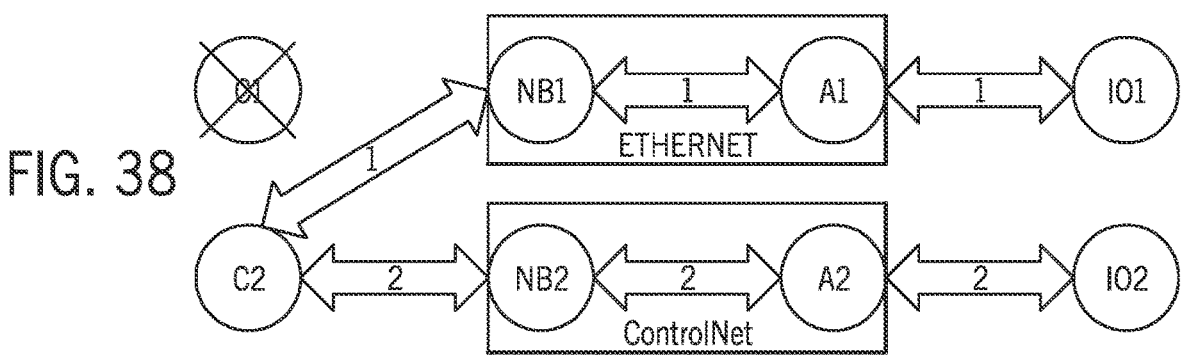
FIG. 38 is a block diagram representing the system with redundant networks of FIG. 35 with a single controller faulted.

It is also possible to setup a system using two totally independent networks. With reference next to FIG. 35, a HA control system using both an Ethernet network and a ControlNet network is illustrated. This system provides diversity while still maintaining the no-single-point-of-failure feature. FIGS. 36-38 illustrate the system of FIG. 35 in operation with redundant communication paths with a single fault in different modules. In the case of this HA control system, the controllers would attempt the connection open using the following table of connection paths.

TABLE 4

Exemplary connection paths in the HA
control system of FIG. 35

| Controller 1 | Controller 2 |
|---|---|
| 1. C1 -> NB1 -> A1 -> IO1 | 1. C2 -> NB2 -> A2 -> IO2 |
| 2. C1 -> NB1 -> A1 -> IO2 | 2. C2 -> NB2 -> A2 -> IO1 |
| 3. C1 -> NB2 -> A2 -> IO1 | 3. C2 -> NB1 -> A1 -> IO2 |
| 4. C1 -> NB2 -> A2 -> IO2 | 4. C2 -> NB1 -> A1 -> IO1 |

Figure 39:
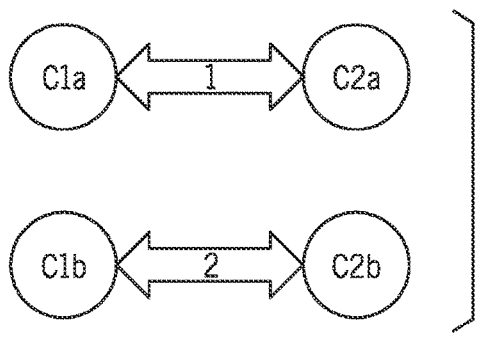
FIG. 39 is a block diagram illustrating redundant controllers for use in a high availability industrial control system.
Figure 40:
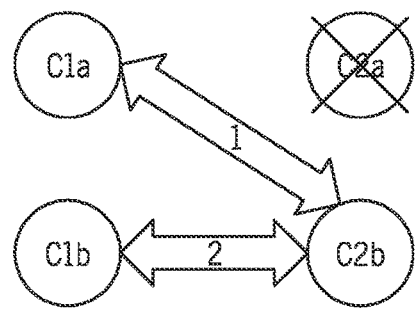
FIG. 40 is a block diagram representing the redundant controllers of FIG. 39 with a controller in one pair of controllers faulted.
Figure 41:
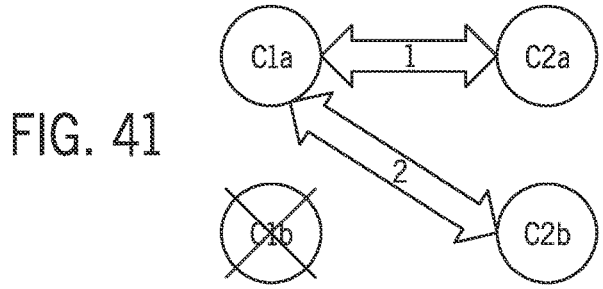
FIG. 41 is a block diagram representing the redundant controllers of FIG. 39 with a controller in the other pair of controllers faulted.
Figure 42:
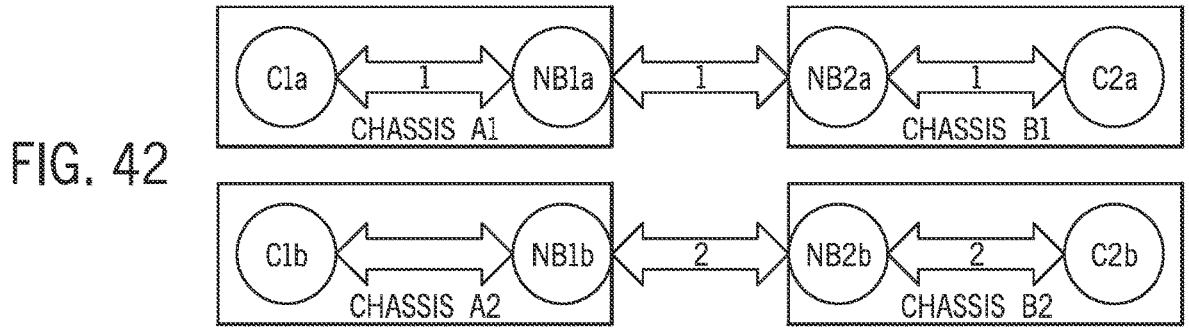
FIG. 42 is a block diagram illustrating redundant chassis for use in a high availability control system.
Figure 43:
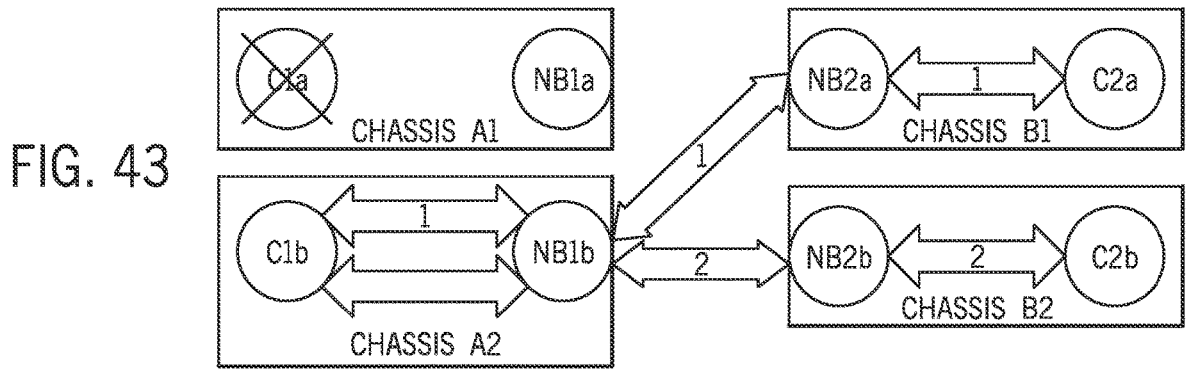
FIG. 43 is a block diagram representing the redundant chassis of FIG. 42 with one controller faulted.
Figure 44:
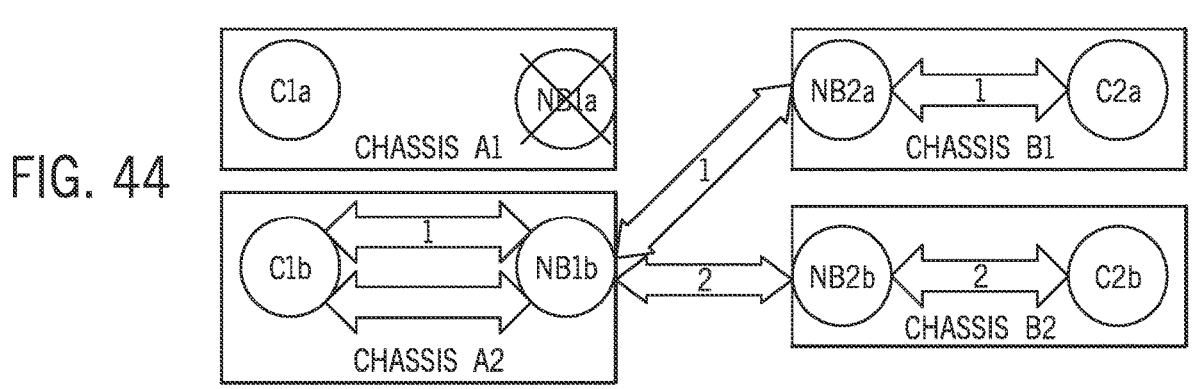
FIG. 44 is a block diagram representing the redundant chassis of FIG. 42 with one bridge module faulted.
Figure 45:
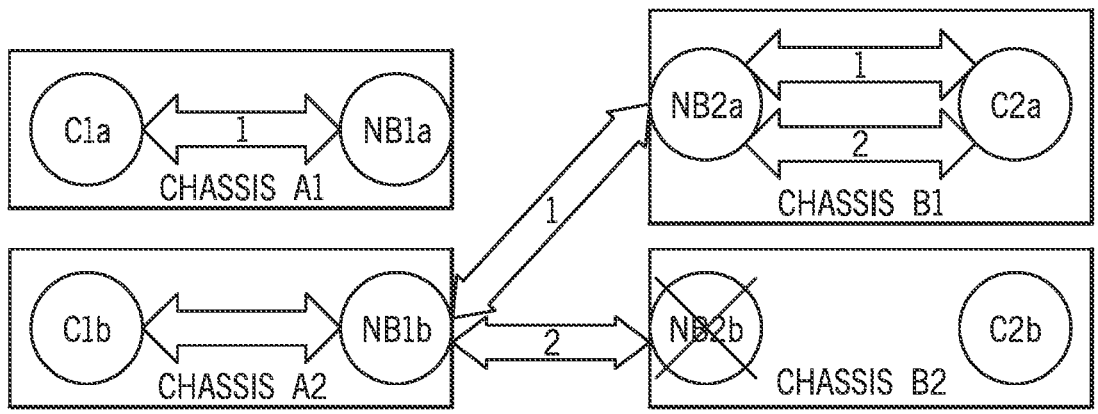
FIG. 45 is a block diagram representing the redundant chassis of FIG. 42 with a different controller faulted.
Figure 46:
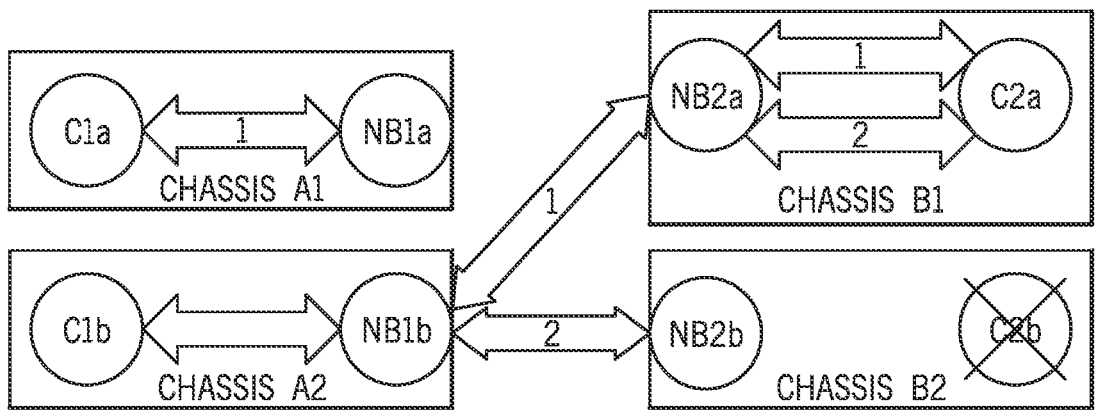
FIG. 46 is a block diagram representing the redundant chassis of FIG. 42 with a different bridge module faulted.
Figure 47:
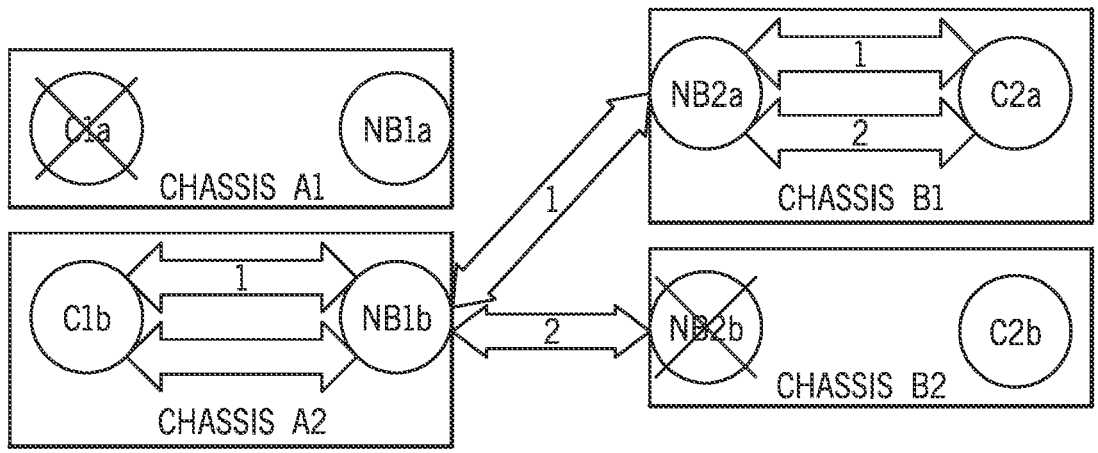
FIG. 47 is a block diagram representing the redundant chassis of FIG. 42 with a controller on one pair of controllers faulted and a bridge module on the other pair of controllers faulted.

While all the previous examples have been a controller (or set of controllers) communicating with IO modules, concurrent connections can also be used for controller to controller communications. Also, previous examples, which included network bridge modules, showed the controller redundancy and network bridge redundancy as independent (module level redundancy). FIGS. 39-41 show a pair of redundant Controllers (C1a & C1b) communicating with another pair of redundant Controllers (C2a & C2b). A similar system could be built using any combination of triple redundancy controllers, dual redundant controllers, and simplex controllers. In the case of this system, controllers would attempt the connection open using the following table of connection paths.

TABLE 5

Exemplary connection paths between
the redundant controllers of FIG. 39

| Controller 1a | Controller 1b |
|---|---|
| 1. C1a -> C2a | 1. C1b -> C2b |
| 2. C1a -> C2b | 2. C1b -> C2a |

Redundancy is not always done at the device level. Redundancy, especially controller redundancy, is often done at the chassis level. In this type of system, the controller is paired with the network bridge modules as shown in FIGS. 42-47. In the case of this system, controllers would attempt the connection open using the following table of connection paths.

TABLE 6

Exemplary connection paths between the
redundant controllers of FIG. 39

| Controller 1a | Controller 1b |
|---|---|
| 1. C1a -> NB1a -> NB2a -> C2a | 1. C1b -> NB1b -> NB2b -> C2b |
| 2. C1a -> NB1a - >NB2b -> C2b | 2. C1b -> NB1b -> NB2a -> C2a |

Pairing a network bridge module with a controller has certain advantages. No special connection handling is required between the bridge and adapter modules. Only the end points are involved in the generating the two active paths and in handling the reception of two packets. As a result, the number of communication packets on the networks is reduced.

Many of the prior examples of faults detected by concurrent messages discuss physical failures within the industrial network. It may also be desirable, and in particular for a safety control system, to detect delays in transmission between a producer and a consumer even when the physical connection path is still active. With reference again to FIG. 2, each of the modules includes a clock circuit 155. As previously discussed, each clock circuit 155 within the industrial control system may be synchronized such that each module has a common time signal. According to another aspect of the invention, it may not be practical to synchronize all modules within the industrial control system. Instead, groups of modules may be synchronized. For example, each module connected adjacent to a controller 10, 15 may be synchronized to one clock signal and each module connected adjacent to a remote adapter 90 may be synchronized to another clock signal. An offset signal may be provided to indicate a difference in time domains between different clock signals.

In order to detect excessive transmission delays, each producer may include a timestamp and an offset value, if needed, within the data packet 450 prior to transmission. Although initially synchronized, some variation in frequency of clock circuits 155 and drift over time will cause some difference in the time stamp generated by each producer. Similar to including identical safety data 460 within the data packet 450, each producer should include an identical time stamp within the data packet 450. Before inserting a time stamp within the safety related concurrent connection data packet 450, each producer must agree on which timestamp to use. Typically, one of the producers will be identified as a primary producer and the timestamp from that producer may be selected. The primary producer transmits the timestamp to each of the other producers for insertion in the data packet. Each secondary producer may perform an initial verification of the time stamp received from the primary producer and confirm that the time stamp received from the primary producer is within an acceptable range of the time stamp generated by the secondary producer. This initial verification check confirms that the clock circuit 155 in the primary producer does not have an excessive amount of drift.

When the data packet 450 is received at each consumer, the consumer extracts the time stamp and offset value, if present, and compares the time stamp to the current time within the consumer. Each consumer may have a parameter setting for an acceptable transmission delay from a producer. Optionally, a table may be stored within the consumer with different transmission delays from different producers because the length of the transmission delay varies according to a number of factors, such as the number of hops between a producer and consumer, the bandwidth of the transmission medium over which the data packet is being transmitted, or a priority level of the connected message. When the present time in a consumer is greater than the time stamp plus the acceptable transmission delay, the consumer may be configured to enter a safe operating state.

As an initial step, the consumer experiencing the transmission delay may compare operation with the other consumer. If only a single consumer is experiencing an excessive transmission delay, one safe operating state may allow operation to continue for a short duration utilizing the safety data 460 received by the other consumer. The consumer experiencing the transmission delay may disconnect and reconnect itself to the concurrent connection in an attempt to reset the connection and resume normal communication. Optionally, the consumer experiencing the transmission delay may immediately enter a safe state according to any of the safe operating states previously discussed.

Because there may be some drift or variation between clock circuits 155 in different modules, even in a synchronized system, it may be desirable to periodically transmit a time coordination data packet between producers and consumers. The producer generates the time coordination data packet at a rate less than the rate for safety data 460 being transmitted such that the time coordination data packet does not require as much communication bandwidth. It is contemplated, for example, that the time coordination data packet may be transmitted at multiples of the safety data packets ranging between twenty and one thousand. In one embodiment of the invention, the safety data packets are transmitted at a ten millisecond (10 ms) interval and the time coordination data packets are transmitted at a two hundred (200 ms) interval.

The time coordination request data packet includes a time update request for each consumer to transmit a return packet with an indication of the present time domain in the consumers. According to one aspect of the invention, the consumers may be configured to maintain an offset value between the time domain of the producers and the consumers. Each consumer may generate a new offset value as a function of the timestamp received in the time coordination data packet and from the clock circuit 155 local to the consumer to the producer. According to another aspect of the invention, the producers may be configured to maintain an offset value between the time domain of the producers and the consumers. Each consumer may insert a timestamp generated from the clock circuit 155 local to the consumer in the time coordination response packet. The producer may, in turn, determine the offset value when time stamp is received as a function of the time signal in the producer and of the timestamp in the response packet. When each consumer receives the time coordination request data packet, the consumer generates a time coordination response data packet. The time coordination response data packet includes the offset or the timestamp from the consumer and is transmitted back to the producers.

For purposes of discussion herein, the producer will maintain an offset value. When the producer receives the time coordination response data packet from a consumer, the producer determines a time offset value between the present value of the time signal in the producer and the timestamp in the time coordination response data packet. Thus, each producer determines a difference between the clock signal in the producer's domain and the clock signal in the consumer's domain. This difference incorporates any transmission delay between the producer and consumer as well as any difference in the synchronized values of the clock signals. When the offset is added to a timestamp on the producer prior to transmitting a data packet, the timestamp extracted from the data packet by a consumer should match the current timestamp in the consumer.

When there are synchronized producers, as in a safety control system, the offset value used by each producer should match, such that when the offset is added to the timestamp, the time signal transmitted from each producer is the same. The producers compare the offset value determined by each producer and select the offset value which is more favorable to the transmission delay check performed by the consumers. If the greater offset value is selected, the time signal appears to be later and gives the greatest amount of time for data to be transmitted between the producers and consumers without experiencing a transmission delay.

As previously discussed, the use of concurrent connections reduces the processing and network overhead in the industrial control system. A connection path is defined on a per-hop basis and a connection identifier is assigned to the connection. The connection path, or, optionally, just adjacent connections may be stored within each device along the connection path, and when a message is received, the device may read the connection identifier to determine whether the device is the intended target or an intermediate hop and take appropriate action.

However, some messages are not well-suited for connected messaging. For example, the connection open service request sent from a source device to a target device and the connection open service response from the target device to the source device to establish the connected message cannot utilize the connected message. Other messages may be sent infrequently or only upon an operator request, such as a request to display information on the operator interface 40 or on another Human Machine Interface (HMI). Data may only be sent based on a particular screen being viewed or upon the selection of a pushbutton, touch screen button, or the like. Because these messages are sent infrequently or at a slow update rate, such as one to ten seconds (1-10 sec) or longer, it may be inefficient to establish and maintain a connection and these messages may be better managed as unconnected messages.

Other messages may utilize a request-response format. Such messages may include, for example, a request for a data value or a parameter change, where a confirmation response is desired. Such messages may be transmitted according to an industrial network and an associated industrial network protocol, such as DeviceNet®, ControlNet®, EtherNetIP® or the like. The industrial protocol includes an associated header and format and expects, at a minimum, an acknowledgement, if not a full response message. Such messages are also referred to as Class 3 messages.

Even if a message is transmitted as an unconnected message or as a Class 3 message, the messages are still being communicated over the high-availability network described herein. As previously indicated, establishing standard communication connections between a source and a target device and communicating via every potential combination of end-to-end paths requires excessive processing and network bandwidth resources. The system illustrated in FIG. 8 would require sixteen standard connections and transmit sixteen standard messages between redundant controllers 25 and redundant IO modules 110. The inventors have determined, however, that the system disclosed herein for connected messaging may be utilized, at least in part, to reduce the number of messages required for unconnected and Class 3 messages. This reduction in messages may be observed in FIGS. 48 and 49.

Figure 48:
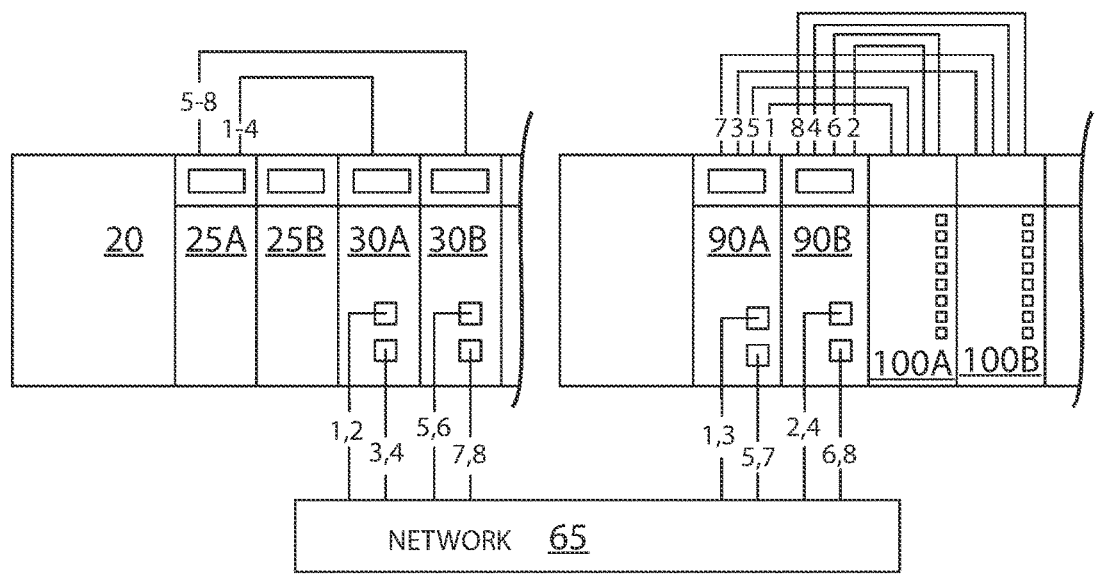
FIG. 48 is a schematic representation of redundant controllers communicating with redundant input modules via individual communication paths.
Figure 49:
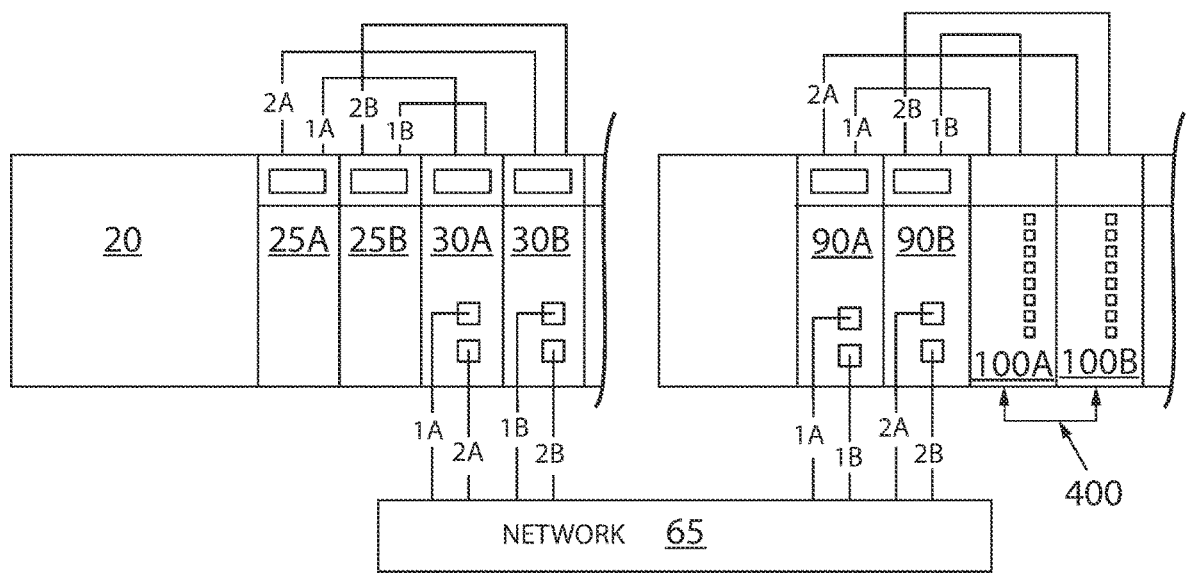
FIG. 49 is a schematic representation of redundant controllers communicating with redundant input modules utilizing at least a portion of the disclosed communication system and method.

FIGS. 48 and 49 illustrate an exemplary application in which a first controller module 25A and a second controller module 25B are included in a first chassis. Similarly, a first bridge module 30A and a second bridge module 30B are also included in this first chassis. The first chassis may include still additional components, but the controller modules 25 and the bridge modules 30 are the relevant modules for this discussion. A remote chassis includes a first adapter module 90A and a second adapter module 90B. Also illustrated in the remote chassis is a first input module 100A and a second input module 100B. The remote chassis may include still additional components, but the adapter modules 90 and the input modules 100 are the relevant modules for this discussion. An industrial network 65 connects the bridge modules 30 from the first chassis to the remote chassis. All components are illustrated as redundant components for the high availability system. As previously discussed, network communications may be bidirectional. For ease of discussion, communication will be from the controller modules 25 to the input modules 100. As a result, the first controller module 25A will be a first source device, the second controller module 25B will be a second source device, the first input module 100A will be a first target device, and the second input module 100B will be a second target device.

FIG. 48 illustrates an application in which unconnected or Class 3 messages are sent as separate messages and transmitted from each source device to each target device via each of the redundant paths. Each path between the first controller module 25A and the input modules 100 is identified. Eight separate paths and eight separate messages would be required to be transmitted from the first controller module 25A to the input modules in order to transmit via every potential redundant path. For ease of illustration, the paths between the second controller module 25B and the input modules were not shown, but an additional eight paths would exist. Connection paths one through four (1-4) extend between the first controller module 25A and the first bridge module 30A. Connection paths five through eight (5-8) extend between the first controller module 25A and the second bridge module 30B. Although illustrated as paths outside the modules, the connection paths between the controller modules 25 and the bridge modules 30 would be established via a backplane or a redundant backplane within the first chassis to which both the controller modules and the bridge modules are connected. The first bridge module 30A then establishes connection paths one and two (1, 2) with the first adapter module 90A and connection paths three and four (3, 4) with the second adapter module 90B. The second bridge module 30B establishes connection paths five and six (5, 6) with the first adapter module 90A and connection paths seven and eight (7, 8) with the second adapter module 90B. The connections between the bridge modules 30 and the adapter modules 90 are established via the network infrastructure 65 which may include redundant network paths and still additional redundant network infrastructure, such as bridges, routers, gateways, and the like. The first adapter module 90A establishes connection paths one and five (1, 5) with the first input module 100A and connection paths two and six (2, 6) with the second input module 100B. The second adapter module 90B establishes connection paths three and seven (3, 7) with the first input module 100A and connection paths four and eight (4, 8) with the second input module 100B. Although illustrated as paths outside the modules, the connection paths between the adapter modules 90 and input modules 100 would be established via a backplane or a redundant backplane within the remote chassis to which both the adapter modules and the input modules are connected. As shown, each hop between adjacent devices in the connection path requires eight connections and eight messages to be transmitted (four are illustrated from the first processor module 25A and an additional four would be generated from the second processor module 25B).

Turning next to FIG. 49, the same application as shown in FIG. 48 is illustrated, except the unconnected or Class 3 messages are illustrate as being transmitted using connection path information. The connection path data, defining a per hop connection between the source device and the target device, reduces the total number of messages required to be sent even though a connection has not been established. The connection path data is defined in one of the source devices and identifies each device between the source device and the target device. The connection path data is shared between the two source devices such that each source device may transmit a redundant message along an identical connection path. According to one embodiment of the invention, the connection path data is transmitted from the first source device to the second source device. As an exemplary application, the active controller module 25A may receive a data read request from an HMI. The active controller module 25A generates a Class 3 message to an input module 100 to retrieve the status of an input. The active controller module 25A transmits the connection data path to the backup controller module 25B which, in turn, generates a redundant Class 3 message.

According to another embodiment of the invention, each controller module 25A, 25B may have a table stored in memory defining Class 3 messages that may be required by the application. The same HMI device may generate a request for data and both controller modules 25 receive the request via redundant inputs. Each controller module 25 generates a Class 3 message to request the data from the input module 100. The first controller module 25 may synchronize transmission of the messages such that the two messages are sent in tandem. Each controller module 25 may, for example, set a status bit when the message is ready to send. The second controller module 25B may transmit its status bit to the first controller module 25A when the second controller module is ready to transmit. The first controller module 25A may initiate transmission when it detects both its own status bit and the received status bit from the second controller module 25B indicating the messages are ready for transmission. Still other methods of synchronizing the transmission of the messages from the two controller modules 25 may be utilized without deviating from the scope of the invention.

For the illustrated example, a direct network connection between the bridge modules and the adapter modules is assumed such that the connection path includes the first and second bridge modules 30A, 30B, the first and second adapter modules 90A, 90B, and the first and second input modules 100A, 100B. Each controller module 25A, 25B sends two messages, with a first message 1A, 1B transmitted to the first bridge module 30A and a second message 2A, 2B transmitted to the second bridge module 30B. Although illustrated as paths outside the modules, the connection paths between the controller modules 25 and the bridge modules 30 would be established via a backplane within the first chassis to which both the controller modules and the bridge modules are connected. If a redundant backplane is present, the messages could be sent between the modules via each backplane. After receiving one of the messages from the controller modules 25, each bridge module 30A, 30B sends two messages, with a first message 1A, 1B transmitted to the first adapter module 90A and a second message 2A, 2B sent to the second adapter module 90B. After receiving one of the messages from the bridge modules 30, each adapter module 90A, 90B sends two messages, with a first message 1A, 1B transmitted to the first input module 100A and a second message 2A, 2B transmitted to the second input module 100B. Although illustrated as paths outside the modules, the connection paths between the adapter modules 90 and the input modules 100 would be established via a backplane within the remote chassis to which both the adapter modules and the input modules are connected. If a redundant backplane is present, the messages could be sent between the modules via each backplane. In comparison to the process illustrated in FIG. 48, the process illustrated in FIG. 49 requires one-quarter the number of data messages to be transmitted, significantly reducing the processing and network bandwidth requirements.

Along each hop in the connection path, each intermediate device and each target utilizes just one of the redundant messages transmitted. Similar to the process described above, each device accepts the message received soonest and rejects, or ignores, the message received last. Upon receiving the first message, each device may start a timer. The timer has a duration within which the second message is expected to arrive. If the second message arrives while the timer is running, the device resets the timer and discards the later arrived message. If, however, a second message does not arrive within the duration of the timer, the device may be configured to generate a fault message. The fault message indicates a failure along the path on which the second message was expected to arrive. Because a first message was successfully transmitted, the controlled process remains active. The fault message is reported back to the controller modules 25, which, in turn, may generate a message to a technician such that the failed path may be repaired. Preferably, the failed path is able to be repaired before the redundant path also fails, such that the controlled process may continue operation without interruption.

With connected messaging, each message packet may include just a connection identifier and the data being transmitted. During the connection open process, each device receives the connection path data and the associated connection identifier and stores the information in memory. During subsequent connected messages, the connection path may be retrieved from memory and used to either forward a connected message, if the device is not the intended recipient, or extract the data from the connected message, if the device is the intended recipient. Each device reads an incoming message and extracts the connection identifier. The first of the two redundant messages is processed, either by passing the message along or extracting data. The second of the two redundant messages is dropped. For unconnected messages or Class 3 messages, the information for each message is not stored within the memory of a device, but rather is contained entirely within the message. A message may contain a unique identifier and the devices may read the identifier from the messages. Optionally, the type of message such as a connection open request between two devices may similarly be unique and may be used to detect a first and a second identical message. A device along the connection path may extract the data from each received message, whether an identifier or some other data from within the message, and process the first received message, while dropping the second received message.

Unlike connected messaging, which is used, for example, to transmit input data from input modules 100 to a controller module 25 and to transmit output data from a controller module 25 to an output module 105 and which is unidirectional, requiring no response message, unconnected messages and Class 3 messages typically require a response message to be sent from the target device back to the source device. The target devices must synchronize generation and transmission of the redundant response messages. As illustrated in FIG. 49, synchronization steps 400 occur between the two target devices. In FIG. 49, the two target devices are the first input module 100A and the second input module 100B.

Although illustrated as a single bi-directional arrow, the synchronization steps 400 may include multiple steps and a back-and-forth between the two target devices. Similar to synchronizing transmission of the initial message in the source devices, each target device may set a status flag indicating it has received the initial message. The second target device 100B may transmit its target flag to the first target device 100A indicating it is ready to respond. The first target device 100A may monitor both its status flag and the received status flag from the second target device 100B to initiate transmission of the response message after both target devices 100 have received the initial request message.

The synchronization steps may also include steps to ensure that the data returned from both target devices to the source devices is identical. Although a redundant system may have paired input signals from a device in the controlled machine or process provided as inputs to both the first and second input module 100A, 100B, the actual value may vary within an accepted range or for an accepted duration of time as input values are updated. For example, an analog input value is converted to a digital value within each input module. Due to manufacturing tolerances, offset voltages, and the like, a digital value in one input module may not be identical to the digital value in the other input module. Resolution methods, such as creating an acceptable band within which the two values must reside, averaging the two values, using the value in the primary input module, or a combination thereof may generate the actual value to be sent back to the source device. The active input module 100A may be used to resolve the differences between the target modules. The active input module may then transmit the resolved value to the backup input module 100B before each input module creates its own response message. Optionally, the active input module 100A may generate a response message and transmit the response message to the backup input module 100B for transmission. Communication between input modules 100A, 100B will typically occur via the backplane extending between the two modules. Still other methods of synchronizing data between the two modules 100 may be utilized without deviating from the scope of the invention.

In the event one of the target devices is disabled, has failed, or is otherwise unable to communicate with the source device, the remaining target device is still able to generate a response to the source devices. During synchronization of the response message, the active device may have a predefined time within which it expects to receive a response from the backup device, indicating it has received the initial request message. If the active device does not receive a response within the predefined time, the active device may transmit the response message in a reverse direction along the connection path. The first intermediate devices, which in FIGS. 48 and 49 correspond to the adapter modules 90 would receive only a first response message. However, each adapter module 90 would only act on the first response message and would drop a second received response message. Thus, each adapter module 90 acts on this first response message and, in turn, generates its own message to pass along the connection path. As a result, the bridge modules 30 would each receive a pair of response messages. Thus, the system can continue operation even if one of the target devices has failed or otherwise become inoperative.

In some instances, it may be desirable to communicate with just one of the target devices. A source device may establish a connection path through each redundant intermediate module in the same manner as that discussed above; however, the final hop may define just one of the target devices rather than each of the redundant pair of target devices. This may be desirable, for example, if a target device needs to be configured, firmware updated, or the like. Such an operation may be performed via the redundant network yet affect only the desired target device.

One exemplary application for which transmitting unconnected messages over a high availability network is to reduce blind time in an HMI. An HMI is typically a low priority device within an industrial control system. While it is used to display data to an operator, it may update, for example, at time intervals in the hundreds of milliseconds or into the seconds. The HMI is not typically displaying real-time information, but rather providing status updates, temperatures, pressures, and the like. In order to reduce the network bandwidth requirements of an HMI, they are often connected via a single communication path to the primary controller even when multiple paths are available in a high availability system. The HMI may be configured to automatically detect an available path upon startup and communicate via that single communication path. Should a connection or device along the path fail or if control of the system switches between the primary controller and the backup controller, the HMI automatically detects a new communication path and resumes communication along the new path. However, during this time interval in which the HMI is detecting the new communication path, the data on the HMI is not being updated. This is referred to as blind time. By utilizing the above-disclosed system and method for communicating unconnected messages over the high-availability network, the HMI is able to continue normal operations even in the event of the failure of a single device or in the event control of the system switches from the primary controller to the backup controller.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A system of communicating data over an industrial control network, the system comprising:

a first producer configured to generate a first data packet for transmission over a connection in the industrial control network, wherein the first data packet includes safety data and a connection identifier defining the connection for communication in the system;

a second producer configured to generate a second data packet for transmission over the connection in the industrial control network, wherein the second data packet includes the safety data and the connection identifier and wherein the connection identifier is generated by either the first producer or the second producer and the connection identifier is used by both the first producer and the second producer;

a first consumer configured to receive the first data packet and the second data packet via the industrial control network; and a second consumer configured to receive the first data packet and the second data packet via the industrial control network, wherein:

the first consumer and the second consumer both receive one of the first data packet and the second data packet, the first consumer extracts first safety data from either the first data packet or the second data packet which was received, the second consumer extracts second safety data from either the first data packet or the second data packet which was received, the first safety data and the second safety data are identical during a successful transmission, and when the first safety data and the second safety data are different, at least one of the first consumer and the second consumer cause the system to enter a safe operating state.

2. The system of claim 1 wherein, the first producer and the second producer agree on the safety data before generating the first data packet and the second data packet.

3. The system of claim 2 wherein, when the first producer and the second producer cannot agree on the safety data to generate, at least one of the first producer and the second producer cause the system to enter a safe operating state.

4. The system of claim 3 wherein, the safe operating state entered by either the first or second producer is selected from one of:
- disqualifying either the first producer or the second producer and generating only the first data packet or the second data packet from either the first producer or the second producer which was not disqualified;
- closing the connection between either the first producer or the second producer and the first and second consumers;
- the first and second producers select a prior safety data which was agreed upon; and
- selecting the safety data from either the first producer or the second producer to be transmitted by both the first producer and the second producer.

5. The system of claim 1 wherein, the safe operating state includes the first consumer and the second consumer agreeing to use either the first safety data or the second safety data for subsequent processing.

6. The system of claim 1 wherein, the safe operating state is selected from one of:
- disqualifying either the first safety data or the second safety data and using only the first safety data or the second safety data which was not disqualified for subsequent processing;
- closing the connection between either the first consumer and the second consumer and the first and second producers; and
- the first and second consumers select a prior safety data which was agreed upon.

7. The system of claim 1 wherein:
- the first producer and the second producer agree on a timestamp prior to generating the first data packet and the second data packet,
- the first producer includes the timestamp in the first data packet, and
- the second producer includes the timestamp in the second data packet.

8. The system of claim 7 wherein:
- the first consumer and the second consumer each extract the timestamp from either the first data packet or the second data packet;
- the first consumer and the second consumer each compare the timestamp to an expected time; and
- when a difference between the timestamp and the expected time exceeds a predefined threshold, either the first consumer or the second consumer cause the system to enter a safe operating state.

9. A method for communicating data over an industrial control network, the method comprising the steps of:
- generating a first data packet for transmission over a connection in the industrial control network with a first producer, wherein the first data packet includes safety data and a connection identifier defining the connection for communication over the industrial control network;
- generating a second data packet for transmission over the connection in the industrial control network with a second producer, wherein the second data packet includes the safety data and the connection identifier and wherein the connection identifier is generated by either the first producer or the second producer and the connection identifier is used by both the first producer and the second producer;
- receiving at least one of the first data packet and the second data packet with a first consumer via the industrial control network;
- extracting first safety data from either the first data packet or the second data packet received at the first consumer;
- receiving at least one of the first data packet and the second data packet with a second consumer via the industrial control network,
- extracting second safety data from either the first data packet or the second data packet received at the second consumer, wherein the first safety data and the second safety data are identical during a successful transmission; and
- when the first safety data and the second safety data are different, entering a safe operating state with either the first consumer or the second consumer.

10. The method of claim 9 further comprising an initial step of agreeing on the safety data by the first producer and the second producer before generating the first data packet and the second data packet.

11. The method of claim 10 wherein, when the first producer and the second producer cannot agree on the safety data to generate, entering a safe operating state with either the first producer or the second producer.

12. The method of claim 11 wherein, the safe operating state entered by either the first or second producer is selected from one of:
- disqualifying either the first producer or the second producer and generating only the first data packet or the second data packet from either the first producer or the second producer which was not disqualified;
- closing the connection between either the first producer or the second producer and the first and second consumers;
- selecting a prior safety data which was agreed upon with the first and second producers; and
- selecting safety data from either the first producer or the second producer to be transmitted by both the first producer and the second producer.

13. The method of claim 9 wherein, the safe operating state includes agreeing to use either the first safety data or the second safety data for subsequent processing by both the first consumer and the second consumer.

14. The method of claim 13 wherein, the safe operating state is selected from one of:
- disqualifying either the first safety data or the second safety data and using only the first safety data or the second safety data which was not disqualified for subsequent processing;
- closing the connection between either the first consumer and the second consumer and the first and second producers; and
- the first and second consumers select a prior safety data which was agreed upon.

15. The method of claim 9 further comprising the steps of:
agreeing on a timestamp between the first producer and the second producer prior to generating the first data packet and the second data packet, and
including the timestamp in the first data packet and the second data packet.

16. The method of claim 15 further comprising the steps of:
extracting the timestamp from either the first data packet or the second data packet with each of the first consumer and the second consumer;
comparing the timestamp to an expected time with each of the first consumer and the second consumer; and
when a difference between the timestamp and the expected time exceeds a predefined threshold, causing the system to enter a safe operating state with either the first consumer or the second consumer.

17. A method for communicating data over an industrial control network, the method comprising the steps of:
generating a safety data packet for transmission over a connection in the industrial control network with a first producer and a second producer at a first time interval, wherein the safety data packet includes a connection identifier and safety data, the connection identifier defines the connection for communication over the industrial control network, and the connection identifier is generated by either the first producer or the second producer and the connection identifier is used by both the first producer and the second producer;
generating a time coordination data packet for transmission over the connection in the industrial control network with the first producer and the second producer at a second time interval, wherein the second time interval is greater than the first time interval and wherein the time coordination data packet includes the connection identifier and a time update request;
receiving the safety data packet with a first consumer and a second consumer via the industrial control network at the first time interval;
extracting the safety data from the safety data packet with the first consumer and the second consumer at the first time interval;
receiving the time update request with the first consumer and the second consumer via the industrial control network at the second time interval;
generating a time coordination response data packet for transmission over the connection in the industrial control network with the first consumer and the second consumer at the second time interval; and
transmitting the time coordination response data packet from the first consumer and the second consumer to the first producer and the second producer.

18. The method of claim 17 further comprising the steps of:
receiving the time coordination response data packet at each of the first producer and the second producer;
generating a first time offset in the first producer as a function of the time coordination response packet;
generating a second time offset in the second producer as a function of the time coordination response packet; and
agreeing on either the first or second time offset for use by both the first producer and the second producer.

19. The method of claim 18 further comprising the steps of:
agreeing on a timestamp between the first producer and the second producer prior to generating the safety data packet, and
including the timestamp in the safety data packet.

20. The method of claim 19 wherein the timestamp uses either the first or second time offset to translate the timestamp to a time domain for the first and second consumer.

* * * * *